(12) United States Patent
Yanagisawa et al.

(10) Patent No.: US 8,285,508 B2
(45) Date of Patent: Oct. 9, 2012

(54) SIGNAL PROCESSING APPARATUS AND SIGNAL PROCESSING METHOD

(75) Inventors: Kiyoshi Yanagisawa, Tokyo (JP); Noriaki Matsuno, Tokyo (JP)

(73) Assignee: NEC Corporation, Tokyo (JP)

( * ) Notice: Subject to any disclaimer, the term of this patent is extended or adjusted under 35 U.S.C. 154(b) by 342 days.

(21) Appl. No.: 12/668,626

(22) PCT Filed: Jul. 9, 2008

(86) PCT No.: PCT/JP2008/062396
§ 371 (c)(1),
(2), (4) Date: Jan. 11, 2010

(87) PCT Pub. No.: WO2009/008445
PCT Pub. Date: Jan. 15, 2009

(65) Prior Publication Data
US 2010/0198540 A1 Aug. 5, 2010

(30) Foreign Application Priority Data
Jul. 10, 2007 (JP) .................................. 2007-181019

(51) Int. Cl.
*G01R 35/00* (2006.01)
(52) U.S. Cl. ..... 702/106; 702/71; 324/76.77; 324/76.78
(58) Field of Classification Search .............. 702/69–76, 702/106; 324/76.77–76.91
See application file for complete search history.

(56) References Cited

U.S. PATENT DOCUMENTS
7,203,614 B2 * 4/2007 Chang .......................... 702/106
2008/0291987 A1 * 11/2008 Kumaki et al. ............... 375/224

FOREIGN PATENT DOCUMENTS
| JP | H05-022356 A | 1/1993 |
| JP | H08-213846 A | 8/1996 |
| JP | H09-504673 A | 5/1997 |
| JP | H11-136302 A | 5/1999 |
| JP | 3037025 B | 4/2000 |
| JP | 2002-252663 A | 9/2002 |
| JP | 2004-007083 A | 1/2004 |
| JP | 2004-509555 A | 3/2004 |
| JP | 2004-274288 A | 9/2004 |
| JP | 2004-363757 A | 12/2004 |
| WO | 2003/101061 A | 12/2003 |

* cited by examiner

*Primary Examiner* — Sujoy Kundu

(57) ABSTRACT

An apparatus includes a test signal generation unit supplying test signals to an orthogonal modulator and a control unit that based on a result of decision by comparison and decision of detection results of a detector detecting envelopes of modulated signals output from the orthogonal modulator responsive to the test signals, derives adjustment values and a compensation value. An estimation means estimates a DC offset and an IQ mismatch of the orthogonal modulator, based on the derived compensation value. The test signals includes a first set including a first test signal $(I_1, Q_1)$ and a second test signal $(I_2, Q_2)$ having a predetermined relationship with the first test signal, and a second set of which in-phase and quadrature components have predetermined relationships respectively with in-phase and quadrature components of the first set.

15 Claims, 33 Drawing Sheets

FIG.9

| TYPE OF TEST SIGNAL | FIRST | SECOND |
|---|---|---|
| I-SIDE DC OFFSET COMPENSATING FIRST TEST SIGNAL | (+,0) | (-,0) |
| I-SIDE DC OFFSET COMPENSATING SECOND TEST SIGNAL | (-,0) | (+,0) |
| Q-SIDE DC OFFSET COMPENSATING FIRST TEST SIGNAL | (0,+) | (0,-) |
| Q-SIDE DC OFFSET COMPENSATING SECOND TEST SIGNAL | (0,-) | (0,+) |
| IQ AMPLITUDE MISMATCH COMPENSATING FIRST TEST SIGNAL | (+,0) | (0,+) |
| IQ AMPLITUDE MISMATCH COMPENSATING SECOND TEST SIGNAL | (+,0) | (0,-) |
| IQ AMPLITUDE MISMATCH COMPENSATING THIRD TEST SIGNAL | (-,0) | (0,+) |
| IQ AMPLITUDE MISMATCH COMPENSATING FOURTH TEST SIGNAL | (-,0) | (0,-) |
| IQ AMPLITUDE MISMATCH COMPENSATING FIFTH TEST SIGNAL | (0,+) | (+,0) |
| IQ AMPLITUDE MISMATCH COMPENSATING SIXTH TEST SIGNAL | (0,+) | (-,0) |
| IQ AMPLITUDE MISMATCH COMPENSATING SEVENTH TEST SIGNAL | (0,-) | (+,0) |
| IQ AMPLITUDE MISMATCH COMPENSATING EIGHTH TEST SIGNAL | (0,-) | (-,0) |
| IQ PHASE MISMATCH COMPENSATING FIRST TEST SIGNAL | (+,+) | (+,-) |
| IQ PHASE MISMATCH COMPENSATING SECOND TEST SIGNAL | (+,+) | (-,+) |
| IQ PHASE MISMATCH COMPENSATING THIRD TEST SIGNAL | (-,-) | (+,-) |
| IQ PHASE MISMATCH COMPENSATING FOURTH TEST SIGNAL | (-,-) | (-,+) |
| IQ PHASE MISMATCH COMPENSATING FIFTH TEST SIGNAL | (+,-) | (+,+) |
| IQ PHASE MISMATCH COMPENSATING SIXTH TEST SIGNAL | (+,-) | (-,-) |
| IQ PHASE MISMATCH COMPENSATING SEVENTH TEST SIGNAL | (-,+) | (+,+) |
| IQ PHASE MISMATCH COMPENSATING EIGHTH TEST SIGNAL | (-,+) | (-,-) |

FIG.27

| IQ AMPLITUDE MISMATCH COMPENSATING ADJUSTMENT VALUE 1 | IQ PHASE MISMATCH COMPENSATING ADJUSTMENT VALUE 1 | I-SIDE DC OFFSET COMPENSATING ADJUSTMENT VALUE 1 |
|---|---|---|
| IQ AMPLITUDE MISMATCH COMPENSATING ADJUSTMENT VALUE 2 | IQ PHASE MISMATCH COMPENSATING ADJUSTMENT VALUE 2 | I-SIDE DC OFFSET COMPENSATING ADJUSTMENT VALUE 2 |
| IQ AMPLITUDE MISMATCH COMPENSATING ADJUSTMENT VALUE 3 | IQ PHASE MISMATCH COMPENSATING ADJUSTMENT VALUE 3 | Q-SIDE DC OFFSET COMPENSATING ADJUSTMENT VALUE 1 |
| IQ AMPLITUDE MISMATCH COMPENSATING ADJUSTMENT VALUE 4 | IQ PHASE MISMATCH COMPENSATING ADJUSTMENT VALUE 4 | Q-SIDE DC OFFSET COMPENSATING ADJUSTMENT VALUE 2 |
| IQ AMPLITUDE MISMATCH COMPENSATING ADJUSTMENT VALUE 5 | IQ PHASE MISMATCH COMPENSATING ADJUSTMENT VALUE 5 | |
| IQ AMPLITUDE MISMATCH COMPENSATING ADJUSTMENT VALUE 6 | IQ PHASE MISMATCH COMPENSATING ADJUSTMENT VALUE 6 | |
| IQ AMPLITUDE MISMATCH COMPENSATING ADJUSTMENT VALUE 7 | IQ PHASE MISMATCH COMPENSATING ADJUSTMENT VALUE 7 | |
| IQ AMPLITUDE MISMATCH COMPENSATING ADJUSTMENT VALUE 8 | IQ PHASE MISMATCH COMPENSATING ADJUSTMENT VALUE 8 | |

SIGNAL PROCESSING APPARATUS AND SIGNAL PROCESSING METHOD

This application is the National Phase of PCT/JP2008/062396, filed Jul. 9, 2008 which is based upon and claims the benefit of the priority of Japanese patent application No. 2007-181019 (filed on Jul. 10, 2007), the disclosure of which is incorporated herein in its entirety by reference.

TECHNICAL FIELD

The present invention relates to a frequency conversion apparatus or a communication transmitting unit that involves frequency conversion.

BACKGROUND ART

Carrier leakage suppression and prevention of modulation accuracy deterioration are essential items for ensuring communication quality and for regulatory compliance in an orthogonal demodulator and a radio transmitter that use the orthogonal modulator. In recent years, with an increase in the speed of communication, a demanded performance level has got higher. However, due to circuit configuration constraints caused by a direct conversion architecture and a lower voltage of a process, the performance items described at the beginning of this paragraph rather tend to deteriorate. Accordingly, a certain compensation system needs to be included in an orthogonal modulator in order to satisfy performance requirement. Though a lot of compensation systems have been proposed so far, it is one of ideals not to add unnecessary hardware or the like so as to perform compensation. The conventional systems have a lot of improvements to be made in that respect.

A carrier leakage corresponds to a direct-current offset (DC offset) normalized by input level to the modulator. Among elements that affect modulation accuracy are the carrier leakage, a variation of levels between quadrature components (a type of IQ mismatch) normalized by input level to the modulator, and orthogonality of local signals input to the demodulator, or a variation of an amplitude and a variation of a phase difference (a type of IQ mismatch).

FIG. 28 is a diagram showing an example of a typical configuration of a signal compensation system of a related art.

When a compensating operation is performed, a test signal from a test signal generation unit is selected by a switch (SW). The test signal is supplied to a baseband port of an orthogonal modulator. An envelope detector detects the amplitude of an output of the orthogonal modulator. Then, the detected amplitude of the output is converted to a digital signal by an AD converter and is then supplied to a control unit. The orthogonal modulator includes mixers (MIXs) and an adder. The mixers (MIXs) multiply output signals of DA converters (D/A) by locally oscillated signals LO(I) and LO(Q) (with a phase difference of 90 degrees between the locally oscillated signals LO(Q) and LO(I)), respectively. The DA converters (D/A) convert I and Q components (of the digital signal) to analog signals, respectively. The adder adds the multiplied signals of the I and Q components.

FIG. 29 shows a test signal typically used in the configuration of FIG. 28 or the like. A cosine wave is supplied to an I side, while a sine wave is supplied to a Q side.

FIG. 30 shows a constellation when an RF/analog section of the modulator is ideal. A perfect circle having its center located at the point of origin is drawn. In a time domain of an output of the modulator, a sine wave having a constant envelope is obtained. FIG. 31 is a constellation when there is a DC offset. The center of the circle is shifted from the point of origin. For this reason, the envelope of an output of the modulator increases or decreases with time.

FIGS. 32 and 33 show constellations in respective cases where there is an IQ amplitude mismatch and where there is an IQ phase mismatch. As is expected, the envelope of an output of the modulator increases or decreases with time in each case. By comparing the cycle and phase of each of these envelopes that increases and decreases with the phase and frequency of the test signal, it is known which offset/mismatch is present in what amount. Then, a control signal for compensating for the offset/mismatch can be generated. The signal thus generated is supplied to a DC offset/IQ mismatch compensation unit. In performing communication, a transmission baseband signal generation unit is selected by the switch. A signal sent out from the transmission baseband signal generation unit is supplied to the DC offset/IQ mismatch compensation unit in which compensation information has been already set. Then, a resulting signal is then subject to DA conversion and supplied to the baseband port of the orthogonal modulator.

Patent Document 1 describes a method of calibrating an IQ phase error using only two points in first to fourth quadrants in an orthogonal modulator, as the signal compensation technique described above. Thus, a test signal is simplified.

Patent Document 2 discloses a method in which a sinewave test signal is provided to a baseband input of a modulator, thereby performing calibration.

Patent Document 3 discloses a method of attempting to improve accuracy of a modulator, based on a signal obtained by frequency converting a transmission signal by an IQ orthogonal down-converter.

Patent Documents 4 to 9 are pointed out as other documents where techniques similar to those in Patent Document 1 to 3 are described.

Patent Document 10 discloses a modulator including comparison means for detecting a carrier leakage of an orthogonal modulator and comparing the detected carrier leakage and a carrier leakage value that has been held at an immediately preceding time.

Further, Patent Document 11 discloses a distortion compensation circuit in which data at four points of (I, Q)=a(1, 0), b(0, 1), c(−1, 0), and d(0, 1) are used as test signals. In this circuit, from detection levels when those data are used, an orthogonality error, where the influence of a DC offset is suppressed, is detected, and compensation is thereby performed.

Patent Document 1:
    JP Patent Kokai Publication No. JP-P-2002-252663A
Patent Document 2:
    JP Patent Kokai Publication No. JP-A-08-213846
Patent Document 3:
    JP Patent Kohyo Publication No. JP-A-09-504673
Patent Document 4:
    JP Patent Kokai Publication No. JP-P-2004-007083A
Patent Document 5:
    JP Patent Kohyou Publication No. JP-P-2004-509555A
Patent Document 6:
    International Publication No. WO2003/101061
Patent Document 7:
    JP Patent No. 3037025
Patent Document 8:
    JP Patent Kokai Publication No. JP-P-2004-274288A
Patent Document 9:
    JP Patent Kokai Publication No. JP-P-2004-363757A
Patent Document 10:
    JP Patent Kokai Publication No. JP-A-05-022356

Patent Document 11:

JP Patent Kokai Publication No. JP-A-11-136302

SUMMARY

Analyses of the related arts will be given below.

The above-mentioned related arts have some problems. First, in the technique described using FIGS. 28 to 33, the test signal is a sine wave. Thus, a ROM (Read-Only Memory) that stores waveform data (digital test pattern data) of the sine-wave test signal becomes necessary. Further, an operation at an appropriate clock speed is necessary so as to generate the test signal that is smooth. Further, an AD converter that performs AD conversion of an output of the envelope detector is necessary. That is, in the configuration described using FIGS. 28 to 33, there is a problem that an excess hardware must be added.

In the technique disclosed in Patent Document 1, the test signal is simplified. However, only calibration of an IQ phase error is performed, and calibration of an IQ amplitude error is not at all disclosed. It is necessary that a DC offset normalized by baseband input level to an orthogonal modulator or a carrier leakage normalized by output level of an orthogonal modulator be sufficiently suppressed and that I and Q gain errors be sufficiently suppressed in order to calibrate the IQ phase error using the approach disclosed in Patent Document 1.

In the technique disclosed in Patent Document 2, a sine-wave test signal generation unit and an AD converter are provided, thereby complicating the configuration.

The technique disclosed in Patent Document 3 has another problem that IQ accuracy of the IQ orthogonal down-converter used at a time of calibration leads to a calibration error, in addition to a problem that the configuration becomes complex. Accordingly, the IQ orthogonal down-converter having a sufficiently high IQ accuracy is needed in order to perform calibration with a sufficiently high accuracy.

Each of the techniques disclosed in Patent Documents 4 and also has the above-mentioned problem of a complex configuration caused by provision of a test signal generation unit and an AD converter.

Patent Document 6 discloses an approach in which four points on a phase plane having an equal RF signal strength are determined to simultaneously obtain compensation amounts of an IQ phase error and a DC offset. In this related art as well, an AD converter is provided in a level detector that receives an output of a high-frequency circuit so as to supply a digital signal (having a level M) to a control unit. Further, it is necessary to solve four simultaneous equations using 12 variables described as Expression (6) in Patent Document 6, based on data obtained with a limited resolution of the AD converter. For that reason, the size of hardware, a computation processing amount, and the like increase. Then, there arises a problem of accuracy of obtained correction parameters in terms of the resolution of the AD converter and precision in solving the simultaneous equations. Further, a method of solving the need for obtaining an IQ gain error in advance is not disclosed.

Patent Document 7 discloses an approach in which a correction amount of an IQ gain error is determined based on three pieces of information on strengths of baseband signals supplied to I and Q sides and a modulator output strength. In this technique as well, however, the configuration becomes complex. Further, the influences of a DC offset and an IQ phase error on the modulator output strength are not taken into consideration. Thus, the approach does not accurately operate only when there are no DC offset and no IQ gain error.

In the related-art technique on compensation for an IQ phase error and an IQ gain error disclosed in each of Patent Documents 8 and 9, an orthogonal demodulator is employed as a detection system at a time of calibration. Thus, the accuracy of the orthogonal demodulator leads to a calibration error.

The technique disclosed in Patent Document 10 includes the comparison means for detecting the carrier leakage of the orthogonal modulator and comparing the detected carrier leakage and the carrier leakage value held at the immediately preceding time. However, there is no configuration of suppressing an error of the comparison means. Thus, the error of the comparison means cannot be suppressed.

In the technique disclosed in Patent Document 11, though signal compensation using the test data at the four points is performed, an orthogonal demodulator and AD converters are used. Thus, the configuration becomes complex.

An object of the present invention is to provide a signal processing apparatus, a signal processing method, and a transmission apparatus in which influence of a DC offset of an orthogonal modulator and influence of an error of a comparison unit can be suppressed, and an IQ mismatch can be compensated for while the configuration can be prevented from becoming complex.

A signal processing apparatus according to a first aspect of the present invention comprises:

a test signal generation unit that generates a test signal;

a detector that detects an envelope of an output obtained by orthogonally modulating the test signal by an orthogonal modulator;

a comparison-decision unit that carries out comparison and decision about a detection signal obtained by detection of the detector;

a control unit that derives an adjustment value from a result of the comparison and decision by the comparison-decision unit;

an adjustment value holding unit that holds the adjustment value derived by the control unit; and a compensation value derivation unit that derives a compensation value from the adjustment value held in the adjustment value holding unit. The test signal generation unit generates a first test signal $(I_1, Q_1)$ and a second test signal $(I_2, Q_2)$ having a predetermined relationship with the first test signal and supplies the first and second test signals to the orthogonal modulator. The detector detects envelopes of the first and second test signals obtained by orthogonal modulation by the orthogonal modulator. The comparison-decision unit compares a first detection signal corresponding to the first test signal and a second detection signal corresponding to the second test signal and makes determination about the first and second detection signals. The first and second detection signals are obtained by detection of the detector. The control unit derives a first adjustment value from a result of the comparison and decision by the comparison-decision unit. The adjustment value holding unit holds the first adjustment value. The test signal generation unit generates a second set of test signals and supplying the second set of test signals to the orthogonal modulator. The second set of test signals comprises in-phase components (I) having a predetermined relationship with in-phase components (I) of a first set of test signals and quadrature components(Q) having a predetermined relationship with quadrature components (Q) of the first set of test signals. The first set of test signals comprises the first test signal and the second test signal. The detector detects an envelope of an output of the orthogonal modulator corresponding to the first test signal of the second set and an envelope of an output of the orthogonal modulator corresponding to the second test signal of the second set. The comparison-decision unit compares the first detection signal corresponding to the first test signal of the second set and the second detection signal corresponding to the second test signal of the second set and makes determination about the first and second detection signals. The first and second detection signals are obtained by detection of the detector. The control unit derives a second adjustment value from a result of the comparison and decision by the comparison-decision unit. The adjustment value holding unit holds the second adjustment value. The compensation value derivation unit derives a compensation value from the first adjustment value and the second adjustment value held in the adjustment value holding unit. The signal processing apparatus further comprises a means that estimates a DC offset and an IQ mismatch of the orthogonal modulator based on the compensation value.

In the first aspect, the control unit may adjust at least one of DC offsets, amplitudes, and phases of one or more inputs to the orthogonal modulator so that the first and second detection signals corresponding to the first set of test signals obtained by detection of the detector are equal, thereby deriving the first adjustment value, and may adjust at least one of DC offsets, amplitudes, and phases of one or more inputs to the orthogonal modulator so that the first and second detection signals corresponding to the second set of test signals obtained by detection of the detector are equal, thereby deriving the second adjustment value.

In the present invention, there are provided: a test signal generation unit that generates a baseband test signal comprising an in-phase component and a quadrature component and supplies the test signal to an orthogonal modulator; and a detector that receives an output of the orthogonal modulator and detects an envelope of the output of the orthogonal modulator. The test signal generation unit generates a first set including first and second test signals having a predetermined phase relationship to each other, and supplies the first signal and the second signal to the orthogonal modulator in this stated order. Then, the test signal generation unit generates a second set including first and second test signals and supplies the first test signal and the second test signal to the orthogonal modulator in this stated order. In-phase and reverse-phase components of the first and second test signals of the second set respectively have predetermined relationships with in-phase and reverse-phase components of the first and second test signals of the first set. In the present invention, the is also provided a comparison means that compares detection results of outputs of the orthogonal modulator for the first and second test signals obtained by detection of the detector. An adjustment value is obtained, based on a result of comparison of detection results of outputs of the orthogonal modulator for the first and second test signals of the first set. An adjustment value is obtained based on a result of comparison of detection results of outputs of the orthogonal modulator for the first and second test signals of the second set. A compensation value for compensating for at least one of a DC offset, an IQ amplitude mismatch, and an IQ phase mismatch of the orthogonal modulator is derived from the adjustment values respectively obtained for the first and second sets. In the present invention, the first test signal and the second test signal are orthogonal to each other or have phases that are opposite to each other, and at least one of the first and second test signals of the second set has an in-phase and/or a quadrature component having a different value and/or polarity with respect to the first set. Alternatively, in the present invention, at least one of offsets, amplitudes, and phases of one or more inputs to the orthogonal modulator may be adjusted so that the detection results of the orthogonal modulation outputs of the first and second test signals after comparison are equal, thereby obtaining the respective adjustment value.

A signal processing apparatus according to a second aspect of the present invention comprises:

a first circuit that sequentially supplies a first test signal ($I_1$, $Q_1$) and a second test signal ($I_2$, $Q_2$) having a predetermined relationship with the first test signal to an orthogonal modulator; and a second circuit that detects an output of the orthogonal modulator and then makes comparison about a first set of a first detection signal and a second detection signal, the first detection signal corresponding to the first test signal and the second detection signal corresponding to the second test signal. The first circuit supplies to the orthogonal modulator a second set of test signals obtained by changing at least one of values and polarities of in-phase components and quadrature components of a first set of test signals comprising the first test signal and the second signals.

The second circuit detects an output of the orthogonal modulator and makes comparison about a second set of a first detection signal and a second detection signal corresponding to the second set of test signals. Then, the signal processing circuit further comprises:

a third circuit that derives a first compensation value for the orthogonal modulator from the first detection signal and the second detection signal of the first set, derives a second compensation value for the orthogonal modulator from the first detection signal and the second detection signal of the second set, and derives a third compensation value from the first and second compensation values; and a fourth circuit that compensates for at least one of a DC offset, an amplitude mismatch, and a phase mismatch of the orthogonal modulator, using the third compensation value.

A signal processing method according to a third aspect of the present invention includes the steps of:

generating a first test signal ($I_1$, $Q_1$) and a second signal ($I_2$, $Q_2$) having a predetermined relationship with the first test signal and sequentially supplying the first test signal and the second test signal to an orthogonal modulator;

detecting envelopes of the first and second test signals obtained by orthogonal modulation by the orthogonal modulator;

comparing a first detection signal corresponding to the first test signal and a second detection signal corresponding to the second test signal and making determination about the first and second detection signals, the first and second detection signals being obtained by detection by the detection step;

deriving a first adjustment value from a result of the comparison and decision by the comparison and decision step;

generating a second set of test signals and supplying the second set of test signals to the orthogonal modulator, the second set of test signals comprising in-phase components (I) having a predetermined relationship with in-phase components (I) of a first set of test signals and quadrature components (Q) having a predetermined relationship with quadrature components (Q) of the first set of test signals, the first set of test signals comprising the first test signal and the second test signal;

detecting an envelope of an output of the orthogonal modulator corresponding to the first test signal of the second set and an envelope of an output of the orthogonal modulator corresponding to the second test signal of the second set;

comparing the first detection signal corresponding to the first test signal of the second set and the second detection signal corresponding to the second test signal of the second set, the first and second detection signal being obtained by detection by the detection step;

deriving a second adjustment value from a result of the comparison and decision by the comparison and decision step;

deriving a compensation value from the first adjustment value and the second adjustment value; and estimating a DC offset and an IQ mismatch of the orthogonal modulator based on the compensation value.

A signal processing method according to the present invention includes the steps of:

a) generating a first set including first and second test signals as baseband test signals each comprising an in-phase component and a quadrature component and supplying the first test signal and the second test signal to an orthogonal modulator in this stated order, the first and second test signals having a predetermined phase relationship to each other;

b) obtaining an adjustment value based on a result of comparison of detection results of orthogonal modulation outputs of the first and second test signals of the first set;

c) generating a second set including first and second test signals and supplying the first test signal and the second test signal to the orthogonal modulator in this stated order, in-phase components of the first and second test signals of the second set having a predetermined relationship with in-phase components of the first and second test signals of the first set and reverse-phase components of the first and second test signals of the second set having a predetermined relationship with reverse-phase components of the first and second test signals of the first set;

d) obtaining an adjustment value based on a comparison result of detection results of orthogonal modulation outputs of the first and second test signals of the second test; and e) deriving a compensation value for compensating for at least one of a DC offset, an IQ amplitude mismatch, and an IQ phase mismatch of the orthogonal modulator from the adjustment values respectively obtained for the first and second sets.

In the first to third aspects, it is preferable that the second test signal ($I_2, Q_2$) be orthogonal to the first test signal ($I_1, Q_1$), or have a phase reversed to a phase of the first test signal ($I_1, Q_1$).

In the first to third aspects, the second set of the test signals may be obtained by changing at least one of values and polarities of the in-phase components (I) and the quadrature components (Q) of the first set of the test signals.

According to the present invention, the influence of a DC offset that remains in the modulator and the influence of an error of the comparison unit can be suppressed, and deterioration of the effects of IQ amplitude mismatch compensation and IQ phase mismatch compensation can be prevented. Further, the problem of complication of the configuration can be avoided.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 9 is a table about test signals in the example of the present invention;

FIG. 27 includes tables showing an example of a list of adjustment values in an example of the present invention;

PREFERRED MODES

Preferred modes for carrying out the present invention will be described below in detail with reference to drawings.

[First Exemplary Embodiment]

Figure 1:
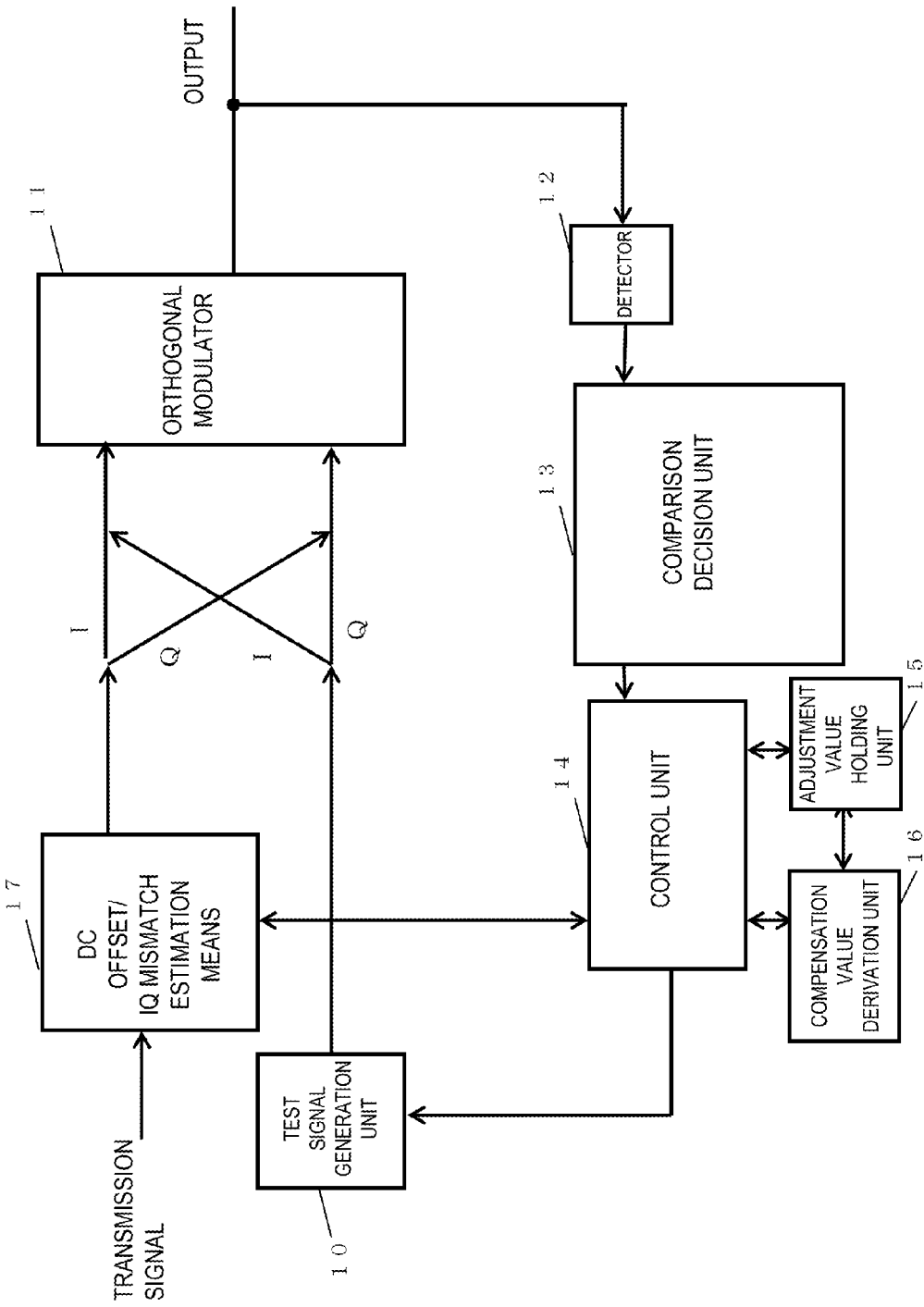
FIG. 1 is a block diagram showing a configuration example of a signal processing apparatus in a first exemplary embodiment of the present invention.

FIG. 1 is a diagram showing a configuration of a signal processing apparatus according to a first exemplary embodiment of the present invention. Referring to FIG. 1, the signal processing apparatus according to an exemplary embodiment of the present invention includes a test signal generation unit 10, a DC offset/IQ mismatch estimation means 17, an orthogonal modulator 11, a detector 12, a comparison-decision unit 13, a control unit 14, an adjustment value holding unit, and a compensation value derivation unit 16. Each of the units described above generally performs the following processing and operation.

The test signal generation unit 10 generates a first test signal $(I_1, Q_1)$ (in which I of (I, Q) indicates an in-phase component signal, while Q of (I, Q) indicates a quadrature component signal) and a second test signal $(I_2, Q_2)$ that is in a predetermined relationship with the first test signal, and supplies the first and second test signals to the orthogonal modulator 11. The orthogonal modulator 11 orthogonally modulates the first test signal $(I_1, Q_1)$ and the second test signal $(I_2, Q_2)$ and outputs resulting signals. The detector 12 detects the envelope of an output of the orthogonal modulator 11 corresponding to the first test signal $(I_1, Q_1)$ and the envelope of an output of the orthogonal modulator 11 corresponding to the second test signal $(I_2, Q_2)$. The comparison-decision unit 13 performs comparison and decision of a first detection signal corresponding to the first test signal $(I_1, Q_1)$ obtained by detection of the detector 12 and a second detection signal corresponding to the second test signal $(I_2, Q_2)$ obtained by detection of the detector 12. The control unit 14 derives a first adjustment value from a result of the comparison and decision by the comparison-decision unit 13. The adjustment value holding unit 15 holds the first adjustment value derived by the control unit 14. Further, the test signal generation unit 10 generates a second set of test signals (set of first and second test signals) where in-phase components (I) and quadrature components (Q) are in a predetermined relationship with a first test signal set constituted from the first test signal $(I_1, Q_1)$ and the second test signal $(I_2, Q_2)$ and supplies the generated second set of test signals to the orthogonal modulator 11. The orthogonal modulator 11 orthogonally modulates a first test signal $(I'_1, Q'_1)$ and a second test signal $(I'_2, Q'_2)$ of the second set and outputs resulting signals. The detector 12 detects the envelope of an output of the orthogonal modulator 11 corresponding to the first test signal $(I'_1, Q'_1)$ of the second set and the envelope of an output of the orthogonal modulator 11 corresponding to the second test signal $(I'_2, Q'_2)$ of the second set. The comparison-decision unit 13 performs comparison and decision of a first detection signal corresponding to the first test signal $(I'_1, Q'_1)$ of the second set obtained by detection of the detector 12 and a second detection signal corresponding to the second test signal $(I'_2, Q'_2)$ of the second set obtained by detection of the detector 12. The control unit 14 derives a second adjustment value from a result of the comparison and decision by the comparison-decision unit 13. The adjustment value holding unit 15 holds the second adjustment value derived by the control unit 14. The compensation value derivation unit 16 derives a compensation value from the first and second adjustment values held in the adjustment value holding unit 15. Typically, the first adjustment value and the second adjustment value may be averaged to determine the compensation value. Then, the DC offset/IQ mismatch estimation means 17 estimates a DC offset and an IQ mismatch of the orthogonal modulator 11 based on the compensation value. The DC offset/IQ mismatch estimation means 17 compensates for a received transmission signal and outputs the compensated signal to the orthogonal modulator 11 (in this case, the test signal generation unit 10 is inactivated, and an output of the test signal generation unit 10 is turned off).

Figure 2:
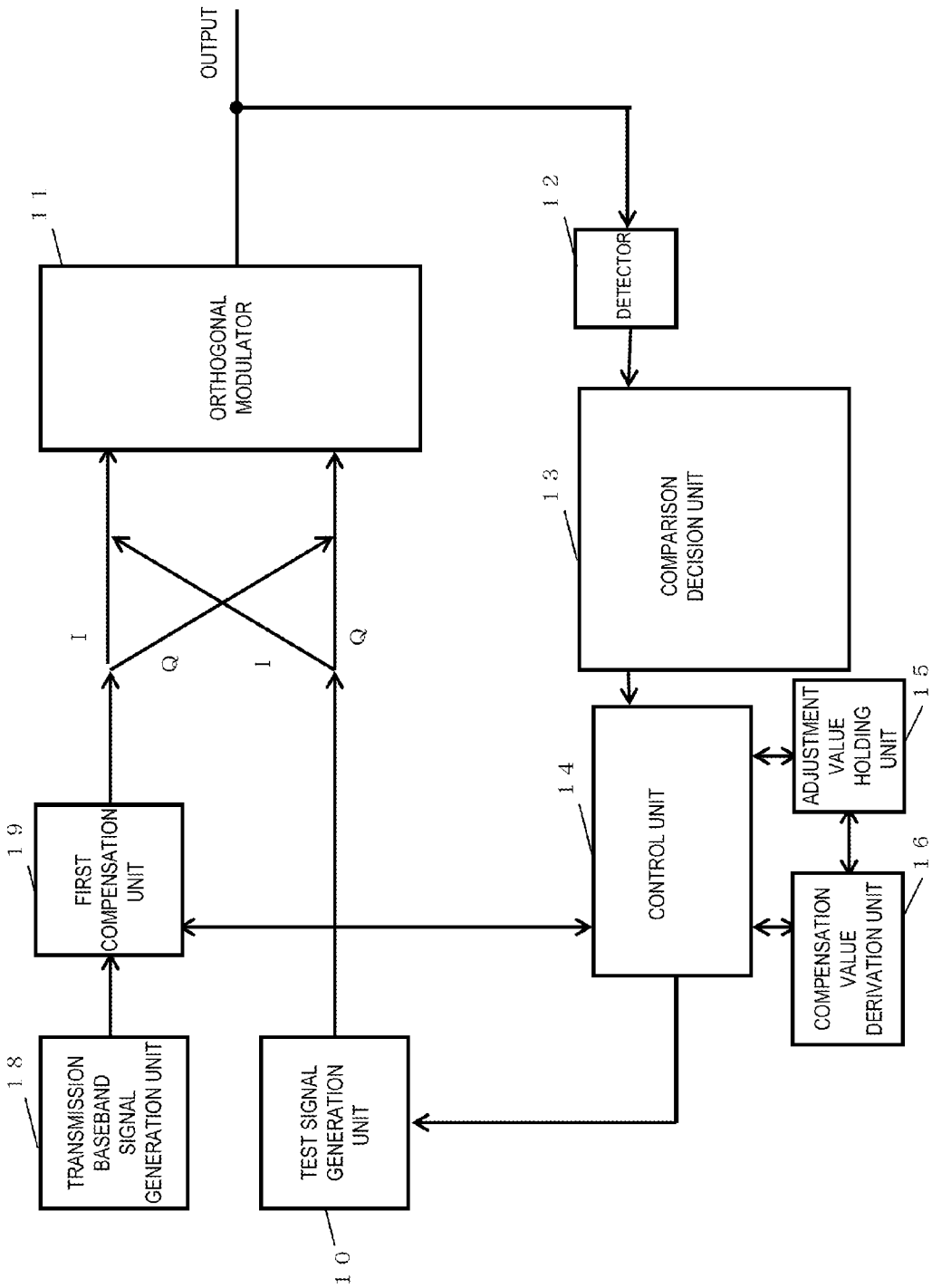
FIG. 2 is a block diagram showing a configuration example of the signal processing apparatus in the first exemplary embodiment of the present invention.

A signal processing apparatus shown in FIG. 2 includes a transmission baseband signal generation unit 18 that generates an I-channel signal component and a Q-channel signal component from a transmission signal, and a first compensation unit 19 that receives and compensates for a transmission baseband signal, and supplies the compensated signal to the orthogonal modulator 11, as the means 17 for estimating a DC offset and an IQ mismatch. The first compensation unit 19 receives the compensation value derived by the compensation value derivation unit 16 and compensates for the transmission baseband signal.

Preferably, the second test signal is orthogonal to the first test signal or has a phase reversed to that of the first test signal. The control unit 14 may derive the first adjustment value by adjusting at least one of DC offsets, amplitudes, and phases of one or more inputs to the orthogonal modulator 11 so that the first detection signal and the second detection signal corresponding to the first set of the test signals and obtained by detection of the detector 12 are equal. The control unit 14 may derive the second adjustment value by adjusting at least one of DC offsets, amplitudes, and phases of one or more inputs to the orthogonal modulator 11 so that the first detection signal and the second detection signal corresponding to the second set of the test signals and obtained by detection of the detector 12 are equal. Further, preferably, at least one of values and polarities of in-phase components (I) and the quadrature components (Q) of the second set of the test signals may be changed with respect to the first set of the test signals.

Preferably, the detector 12 is designed so that detection sensitivity of the detector 12 is maximized in case no DC offset and no IQ mismatch of the orthogonal modulator 11 are present when the test signal is received by the orthogonal modulator 11.

With this arrangement, there can be provided a transmission apparatus, in which the influence of a DC offset that remains in the modulator and the influence of an error of the comparison unit are suppressed and deterioration of an IQ amplitude mismatch compensation effect and an IQ phase mismatch compensation effect is prevented.

[Second Exemplary Embodiment]

Figure 3:
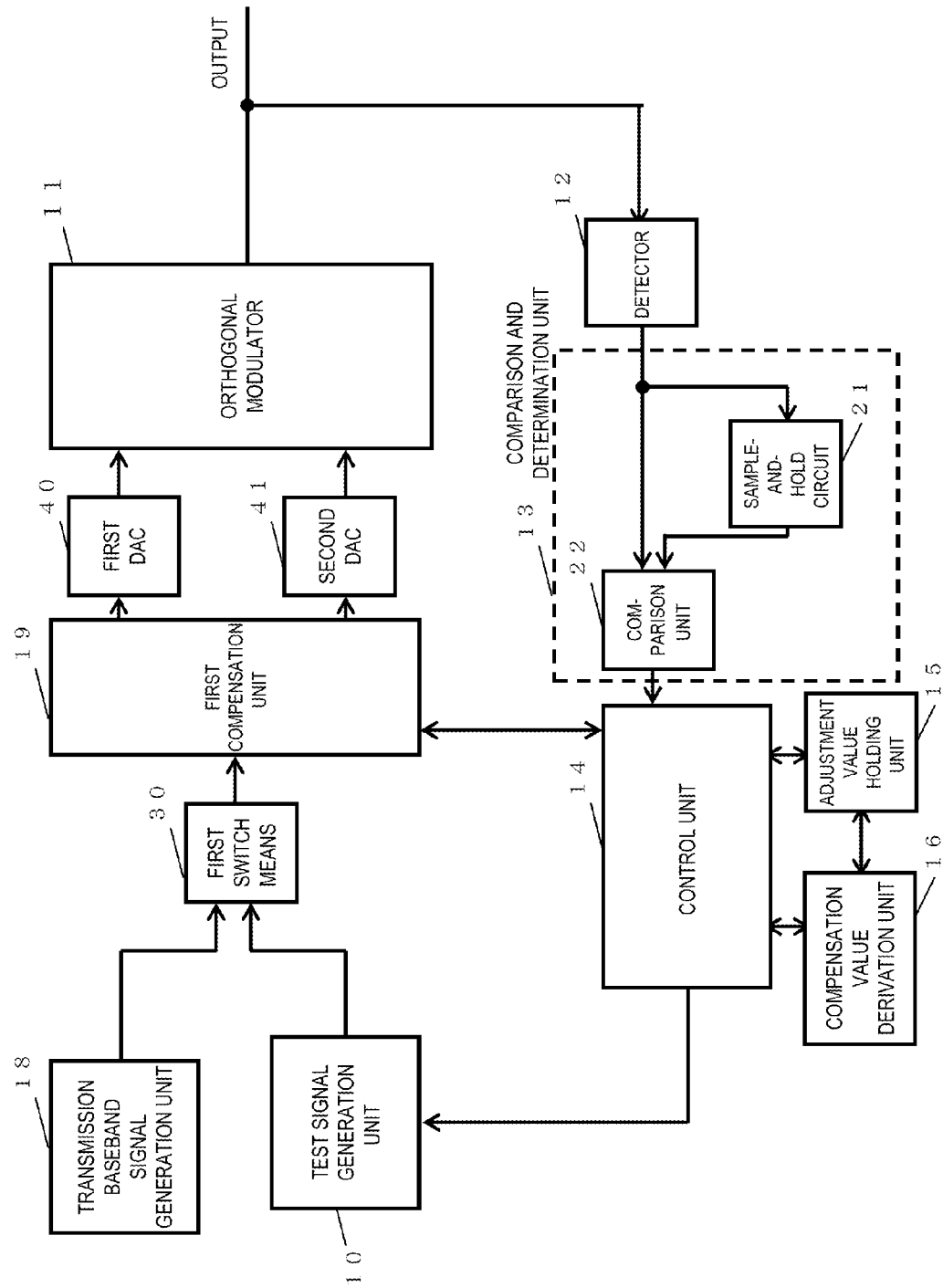
FIG. 3 is a block diagram showing a configuration example of a signal processing apparatus in a second exemplary embodiment of the present invention.

FIG. 3 is a diagram showing a signal processing apparatus according to a second exemplary embodiment of the present invention. In addition to the configuration of the signal processing apparatus in FIG. 1, this exemplary embodiment further includes a transmission baseband signal generation unit 18 that generates an I-channel signal component and a Q-channel signal component from a transmission signal, and a first compensation unit 19 that receives and compensates for a transmission baseband signal, and supplies the compensated signal to the orthogonal modulator 11, as the first compensation unit 19 form as the means 17 for estimating a DC offset and an IQ mismatch. A test signal generated by the test signal generation unit 10 is indirectly supplied to the orthogonal modulator 11 through the first compensation unit 19. This exemplary embodiment further includes a first switch means 30 that selects one of the transmission baseband signal and the test signal and outputs the selected signal to the first compensation unit 19, a first digital-to-analog converter (hereinafter referred to as a DAC) 40 that converts an in-phase component (I) from the first compensation unit 19 to an analog signal and outputs the analog signal to the orthogonal modulator 11 and a second DAC 41 that converts a quadrature component (Q) from the first compensation unit 19 to an analog signal and outputs the analog signal to the orthogonal modulator 11.

In this exemplary embodiment, the comparison-decision unit 13 in the first exemplary embodiment is formed of a sample-and-hold circuit 21 and a comparison unit 22. The sample-and-hold circuit 21 holds a first detection signal obtained by detection of the detector 12. The comparison unit 22 compares a second detection signal obtained by detection of the detector 12 and the first detection signal held by the sample-and-hold circuit 21. As a specific example of the comparison unit 22, a comparator circuit may be employed which compares a voltage value of the first detection signal and a voltage value of the second detection signal in a time series manner and decides which one of the voltage values of the first and second detection signals is higher.

In this exemplary embodiment, the control unit 14 derives first and second adjustment values from comparison results by the comparison unit 22. The first adjustment value and the second adjustment value are held in the adjustment value holding unit 15. The compensation value derivation unit 16 derives a compensation value from the first adjustment value and the second adjustment value held in the adjustment value holding unit 15. Typically, the first adjustment value and the second adjustment value may be averaged to determine the compensation value. Then, the first compensation unit 19 receives the compensation value derived by the compensation value derivation unit 16 and then compensates for the transmission baseband signal.

In this exemplary embodiment as well, preferably, a second test signal described above is orthogonal to a first test signal described above, or has a phase reversed to that of the first test signal, as in the first exemplary embodiment. The control unit 14 may derive the first adjustment value by adjusting at least one of DC offsets, amplitudes, and phases of one or more inputs to the orthogonal modulator 11 so that the first detection signal and the second detection signal corresponding to the first set of the test signals and obtained by detection of the detector 12 are equal. Then, the control unit 14 may derive the second adjustment value by adjusting at least one of DC offsets, amplitudes, and phases of one or more inputs to the orthogonal modulator 11 so that the first detection signal and the second detection signal corresponding to the second set of the test signals and obtained by detection of the detector 12 are equal. Further, preferably, at least one of values and polarities of in-phase components (I) and quadrature components (Q) of the second set of the test signals may be changed with respect to the first set of the test signals.

With this arrangement, there can be provided a transmission apparatus, in which the influence of a DC offset that remains in the modulator and the influence of an error of the comparison unit are suppressed and deterioration of an IQ amplitude mismatch compensation effect and an IQ phase mismatch compensation effect is prevented.

[Third Exemplary Embodiment]

Figure 4:
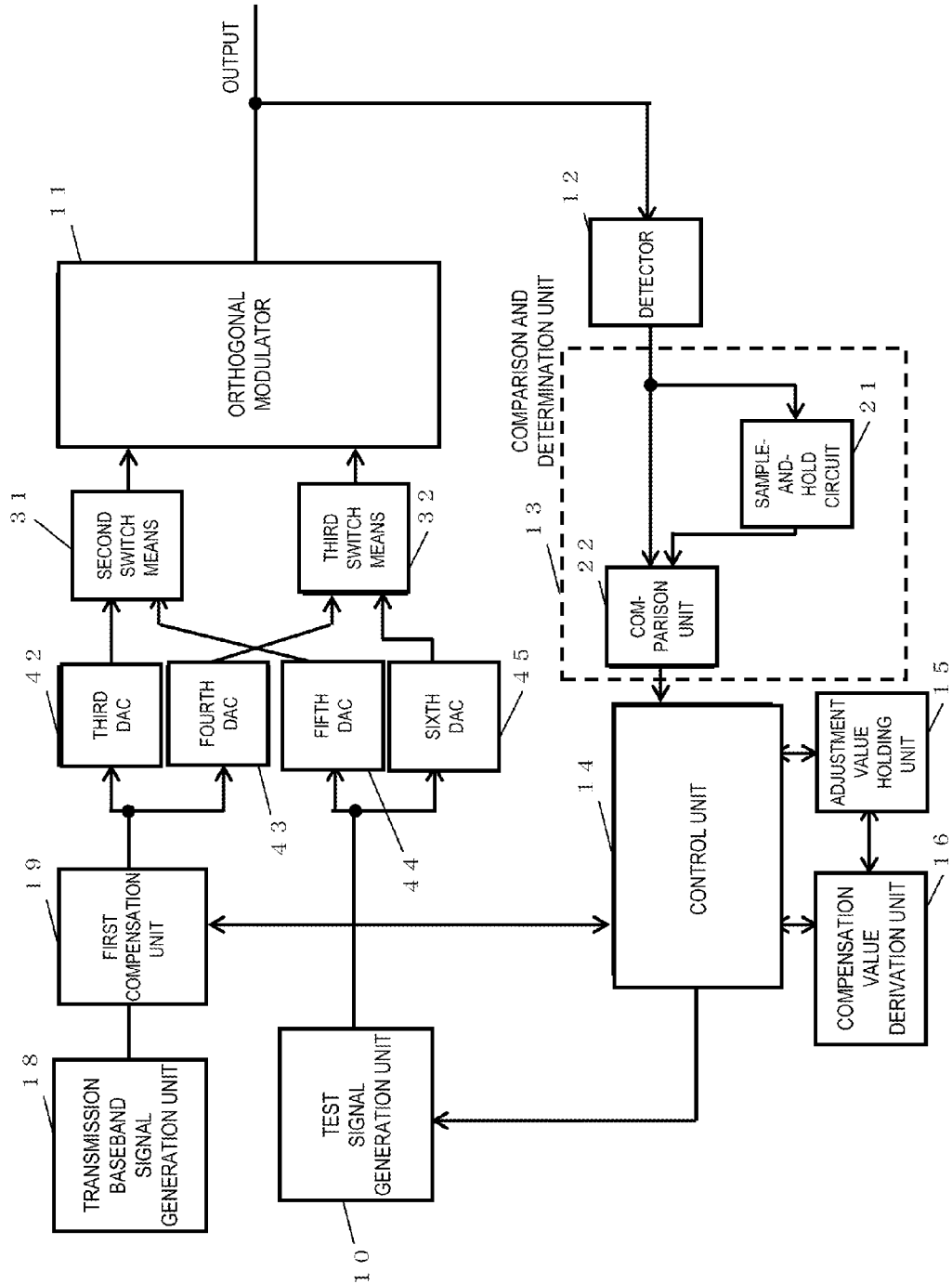
FIG. 4 is a block diagram showing a configuration example of a signal processing apparatus in a third exemplary embodiment of the present invention.

FIG. 4 is a diagram showing a signal processing apparatus according to a third exemplary embodiment of the present invention. In addition to the configuration of the signal processing apparatus in FIG. 1, this exemplary embodiment further includes a transmission baseband signal generation unit 18 that generates a signal component of an I channel and a signal component of a Q-channel from a transmission signal, and a first compensation unit 19 that receives and compensates for a transmission baseband signal, and supplies the compensated signal to the orthogonal modulator 11, as the means 17 for estimating a DC offset and an IQ mismatch. The signal processing apparatus includes a third DAC 42 and a fourth DAC 43 each of which converts an output of the first compensation unit 19 to an analog signal, a fifth DAC 44 and a sixth DAC 45 each of which converts a test signal generated by the test signal generator 10 to an analog signal, second switch means 31 that selects one of outputs of the third DAC 42 and the fifth DAC 44 and outputs the selected one of the outputs to an input of an in-phase component (I) of the orthogonal modulator 11, and third switch means 32 that selects one of outputs of the fourth DAC 43 and the sixth DAC 45 and outputs the selected one of the outputs to the input of the in-phase component (I) of the orthogonal modulator 11.

In this exemplary embodiment, the comparison-decision unit 13 in the first exemplary embodiment is formed of a sample-and-hold circuit 21 and a comparator 22, as in the second exemplary embodiment. The sample-and-hold circuit 21 holds a first detection signal obtained by detection of by the detector 12. The comparison unit 22 compares a second detection signal obtained by detection of the detector 12 and the first detection signal held in the sample-and-hold circuit 21. As a specific example of the comparison unit 22, a comparator circuit may be employed which compares a voltage value of the first detection signal and a voltage value of the second detection signal in a time series manner, decides which one of levels of the voltage values is higher, and outputs a result of the comparison to the control unit 14.

In this exemplary embodiment, the control unit 14 derives first and second adjustment values from the result of comparison by the comparison unit 22, as in the second exemplary embodiment. The first and second adjustment values are held in the adjustment value holding unit 15, and the compensation value derivation unit 16 derives a compensation value from the first and second adjustment values held in the adjustment value holding unit 15. Typically, the first adjustment value and the second adjustment value may be averaged to determine the compensation value. Then, the first compensation unit 19 receives the compensation value derived by the compensation value derivation unit 16 and then compensates for the transmission baseband signal.

In this exemplary embodiment as well, preferably, a second test signal described above is orthogonal to a first test signal described above, or has a phase reversed to that of the first test signal, as in the first and second exemplary embodiments. The control unit 14 may derive the first adjustment value by adjusting at least one of DC offsets, amplitudes, and phases of one or more inputs to the orthogonal modulator 11 so that the first detection signal and the second detection signal corresponding to the first set of the test signals obtained by detection of the detector 12 are equal. Then, the control unit 14 may derive the second adjustment value by adjusting at least one of DC offsets, amplitudes, and phases of one or more inputs to the orthogonal modulator 11 so that the first detection signal and the second detection signal corresponding to the second set of the test signals obtained by detection of the detector 12 are equal. Further, preferably, at least one of values and polarities of in-phase components (I) and quadrature components (Q) of the second set of the test signals may be changed with respect to the first set of the test signals.

In this exemplary embodiment, the DACs connected to the test signal generation unit 10 and the DACs connected to the first compensation unit 19 are provided independently. For this reason, when a requirement for the speed and resolution of the DACs at a time of transmission is greatly different from a requirement for the speed and resolution of the DACs at a time of calibration, both of the requirements can be made compatible. Specifically, when the DACs with a high speed but a low resolution are needed at the time of transmission but the DACs with a low speed but a high resolution are needed at the time of calibration, the DACs dedicated to each of the requirements are assigned, as a result of which difficulty in implementation can be avoided.

With this arrangement, there can be provided a transmission apparatus, in which the influence of a DC offset that remains in the modulator and the influence of an error of the comparison unit are suppressed and deterioration of an IQ amplitude mismatch compensation effect and an IQ phase mismatch compensation effect is prevented.

[Fourth Exemplary Embodiment]

Figure 5:
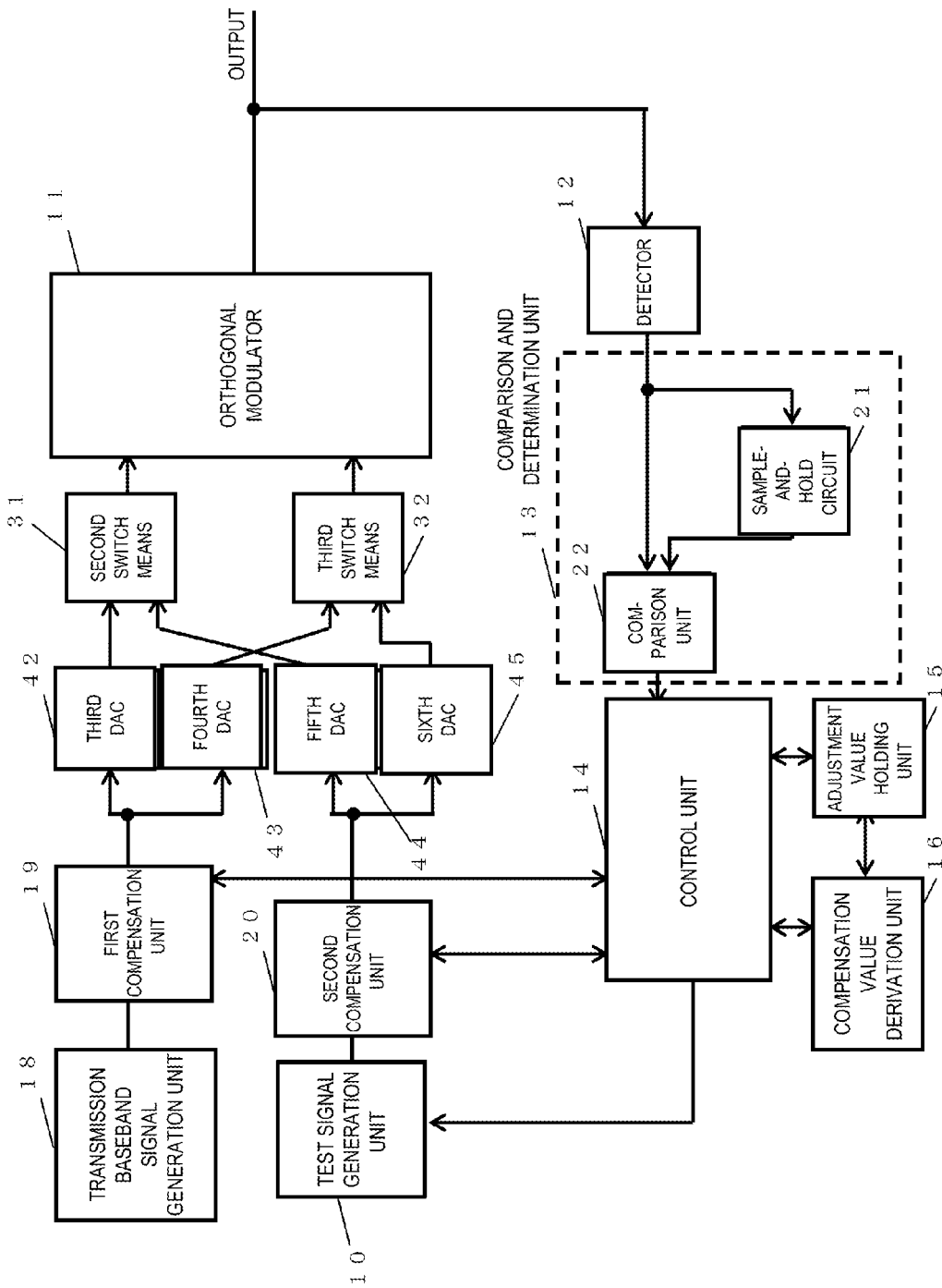
FIG. 5 is a block diagram showing a configuration example of a signal processing apparatus in a fourth exemplary embodiment of the present invention.

FIG. 5 is a diagram showing a signal processing apparatus according to a fourth exemplary embodiment of the present invention. In addition to the configuration of the signal processing apparatus in FIG. 1, this exemplary embodiment further includes a transmission baseband signal generation unit 18 that generates an I-channel signal component and a Q-channel signal component from a transmission signal, a first compensation unit 19 that receives and compensates for a transmission baseband signal, and supplies the compensated signal to the orthogonal modulator 11, as the means 17 for estimating a DC offset and an IQ mismatch, and a second compensation unit 20 that receives and compensates for a test signal generated by the test signal generation unit 10, and supplies the compensated signal to the orthogonal modulator 11. The signal processing apparatus includes a third DAC 42 and a fourth DAC 43 each of which converts an output of the first compensation unit 19 to an analog signal, a fifth DAC 44 and a sixth DAC 45 each of which converts a test signal passed through the second compensation unit 20 to an analog signal, second switch means 31 that selects one of outputs of the third DAC 42 and the fifth DAC 44 and outputs the selected one of the outputs to an input of an in-phase component (I) of the orthogonal modulator 11, and a third switch means 32 that selects one of outputs of the fourth DAC 43 and the sixth DAC 45 and outputs the selected one of the outputs to the input of the in-phase component (I) of the orthogonal modulator 11.

In this exemplary embodiment, the comparison-decision unit 13 in the first exemplary embodiment is formed of a sample-and-hold circuit 21 and a comparison unit 22, as in the second and third exemplary embodiment. The sample-and-hold circuit 21 holds a first detection signal obtained by detection of the detector 12. The comparison unit2 22 compares a second detection signal obtained by detection of the detector 12 and the first detection signal held in the sample-and-hold circuit 21. As a specific example of the comparison unit 22, a comparator circuit may be employed which compares a voltage value of the first detection signal and a voltage value of the second detection signal in a time series manner, and decides which one of levels of the voltage values of the first and second detection signals is higher.

In this exemplary embodiment, the control unit 14 derives first and second adjustment values from results of comparison by the comparison unit 22, as in the second and third exemplary embodiments. The first and second adjustment values are held in the adjustment value holding unit 15, and the compensation value derivation unit 16 derives a compensation value from the first and second adjustment values held in the adjustment value holding unit 15. Typically, the first adjustment value and the second adjustment value may be averaged to determine the compensation value. Then, the first compensation unit 19 receives the compensation value derived by the compensation value derivation unit 16, and compensates for the transmission baseband signal.

In this exemplary embodiment as well, preferably, a second test signal described above is orthogonal to a first test signal described above, or has a phase reversed to that of the first test signal, as in the first to third exemplary embodiments. The control unit 14 may derive the first adjustment value by adjusting at least one of DC offsets, amplitudes, and phases of one or more inputs to the orthogonal modulator 11 so that the first detection signal and the second detection signal corresponding to the first set of the test signals obtained by detection of the detector 12 are equal. Then, the control unit 14 may derive the second adjustment value by adjusting at least one of DC offsets, amplitudes, and phases of one or more inputs to the orthogonal modulator 11 so that the first detection signal and the second detection signal corresponding to the second set of the test signals obtained by detection of the detector 12 are equal. Further, preferably, at least one of values and polarities of in-phase components (I) and quadrature components (Q) of the second set of the test signals may be changed, with respect to the first set of the test signals.

In this exemplary embodiment, each test signal generated by the test signal generation unit 10 is supplied to the DACs through the second compensation unit 20 provided independently of the first compensation unit 19. For this reason, by using the compensation value determined through the use of the second compensation unit 20 connected to the test signal generation unit 10 for the first compensation unit 19 connected to the transmission baseband signal generation unit 18, the compensation value of the transmission baseband signal can be determined without using a complex computation.

With this arrangement, there can be provided a transmission apparatus, in which the influence of a DC offset that remains in the modulator and the influence of an error of the comparison unit are suppressed and deterioration of an IQ amplitude mismatch compensation effect and an IQ phase mismatch compensation effect is prevented.

[Fifth Exemplary Embodiment]

Figure 6:
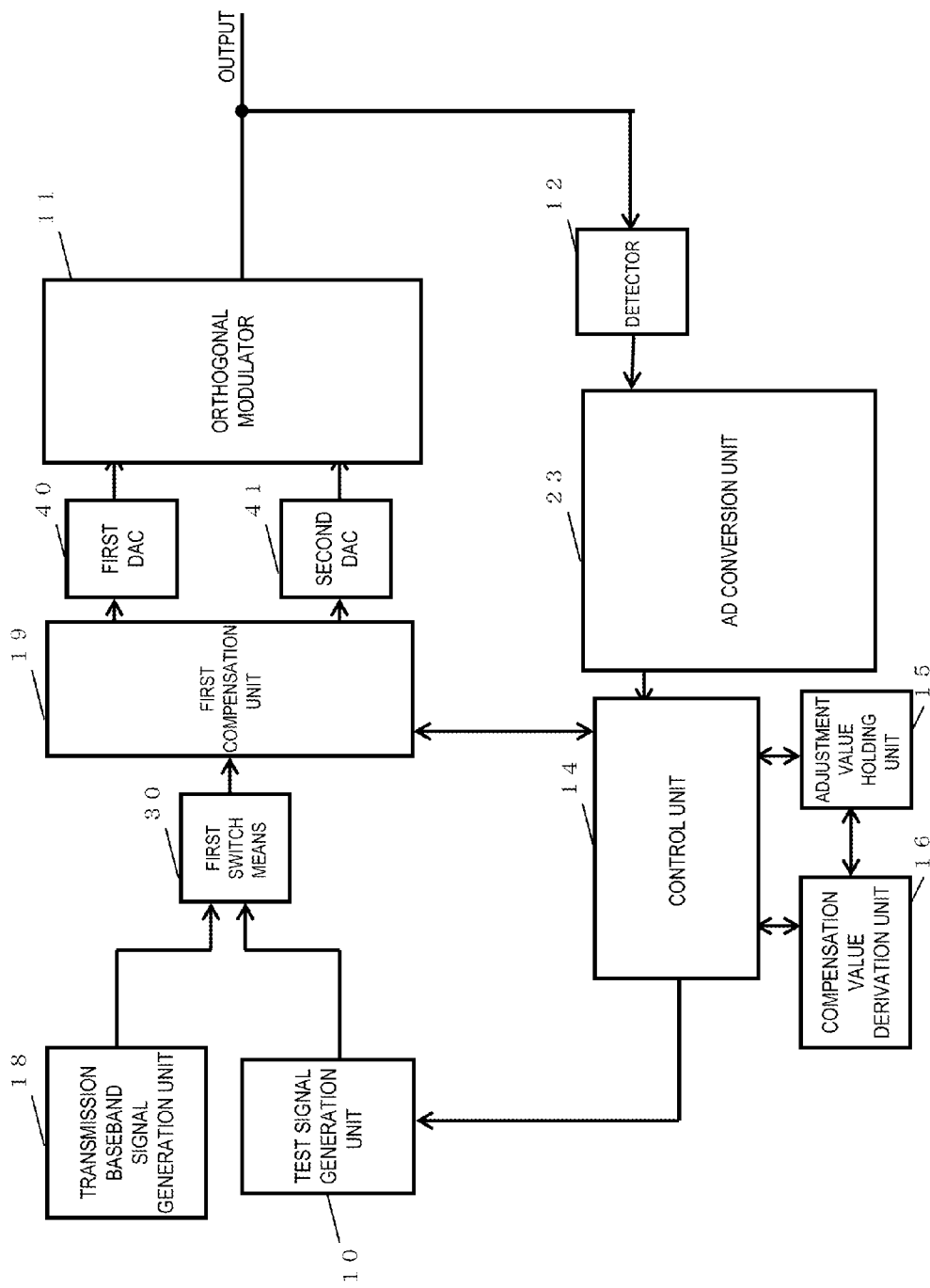
FIG. 6 is a block diagram showing a configuration example of a signal processing apparatus in a fifth exemplary embodiment of the present invention.
Figure 7:
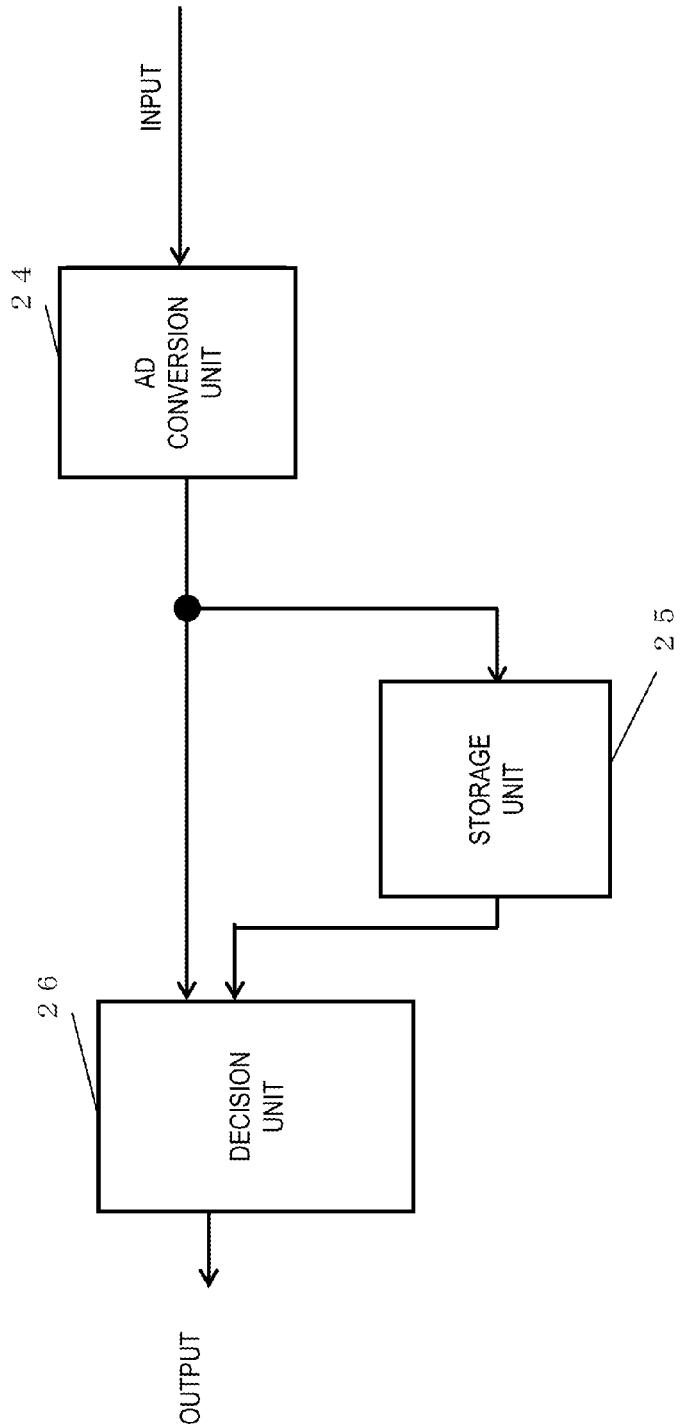
FIG. 7 is a block diagram showing a configuration example of an AD conversion unit in the fifth embodiment of the present invention.

FIG. 6 is a diagram showing a signal processing apparatus according to a fifth exemplary embodiment of the present invention. In this exemplary embodiment, the comparison-decision unit 13 in the first exemplary embodiment is constituted from an analog-to-digital conversion unit (hereinafter referred to as an AD conversion unit) 23 in the signal processing apparatus, in the second exemplary embodiment shown in FIG. 3. As shown in FIG. 7, the AD conversion unit 23 includes an analog-to-digital converter (hereinafter referred to as an AD converter) 24 that converts a first detection signal obtained by detection of the detector 12 to a digital signal, a storage unit 25 that stores the first detection signal that has been converted to the digital signal by the AD converter 24, and a decision unit 26 that compares and decides a second detection signal that has been converted to a digital signal by the AD converter 24 with the first detection signal stored in the storage unit 25.

In this exemplary embodiment, the control unit 14 derives first and second adjustment values from results of determination by the decision unit 26. The first and second adjustment values are held in the adjustment value holding unit 15. The compensation value derivation unit 16 derives a compensation value from the first and second adjustment values held in the adjustment value holding unit 15. Typically, the first adjustment value and the second adjustment value may be averaged to determine the compensation value. Then, the first compensation unit 19 receives the compensation value derived by the compensation value derivation unit 16 and then compensates for the transmission baseband signal.

In this exemplary embodiment as well, preferably, a second test signal described above is orthogonal to a first test signal described above, or has a phase reversed to that of the first test signal, as in the first to fourth exemplary embodiments. The control unit 14 may derive the first adjustment value by adjusting at least one of DC offsets, amplitudes, and phases of one or more inputs to the orthogonal modulator 11 so that the first detection signal and the second detection signal corresponding to the first set of the test signals obtained by detection of the detector 12 are equal. Then, the control unit 14 may derive the second adjustment value by adjusting at least one of DC offsets, amplitudes, and phases of one or more inputs to the orthogonal modulator 11 so that the first detection signal and the second detection signal corresponding to the second set of the test signals obtained by detection of the detector 12 are equal. Further, preferably, at least one of values and polarities of in-phase components (I) and quadrature components (Q) of the second set of the test signals may be changed with respect to the first set of the test signals.

In this exemplary embodiment, the comparison-decision unit 13 in the first exemplary embodiment is set to the AD converter 23. Thus, compared with a case where the sample-and-hold circuit 21 and a voltage converter as the comparison unit 22 are used, a time series error can be reduced.

With this arrangement, there can be provided a transmission apparatus in which the influence of a DC offset that remains in the modulator and the influence of an error of the comparison unit are suppressed and deterioration of an IQ amplitude mismatch compensation effect and an IQ phase mismatch compensation effect is prevented.

The configuration, where the comparison-decision unit 13 in the first exemplary embodiment is set to the AD conversion unit 23 as in this exemplary embodiment, can also be applied to any one of the signal processing apparatuses in the second exemplary embodiment shown in FIG. 3, in the third exemplary embodiment shown in FIG. 4, and in the fourth exemplary embodiment shown in FIG. 5.

EXAMPLES

In order to describe the above-mentioned exemplary embodiments of the present invention, examples of the present invention will be described below in detail with reference to drawings.

Figure 8:
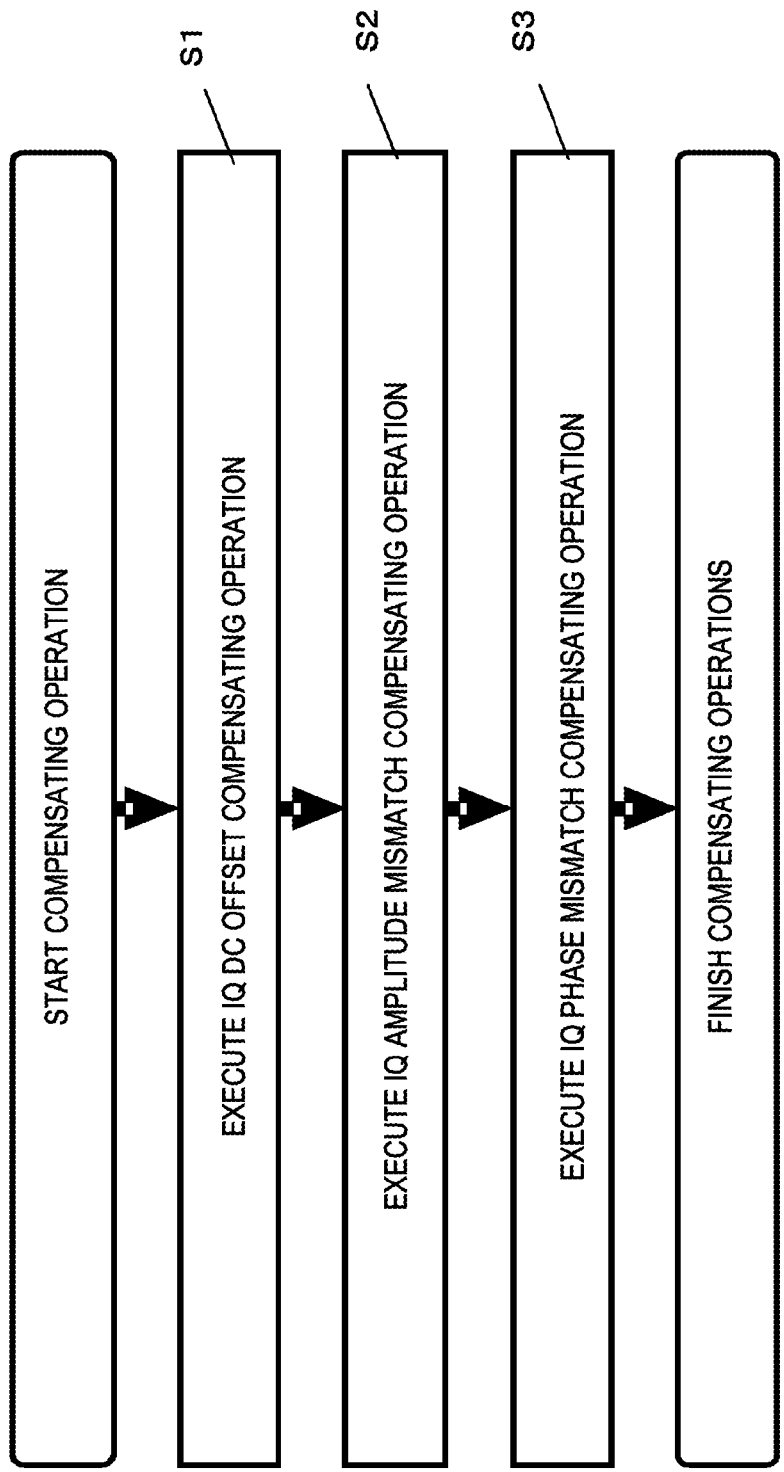
FIG. 8 is a diagram showing an example of a sequence of a signal processing method in an example of the present invention.
Figure 10:
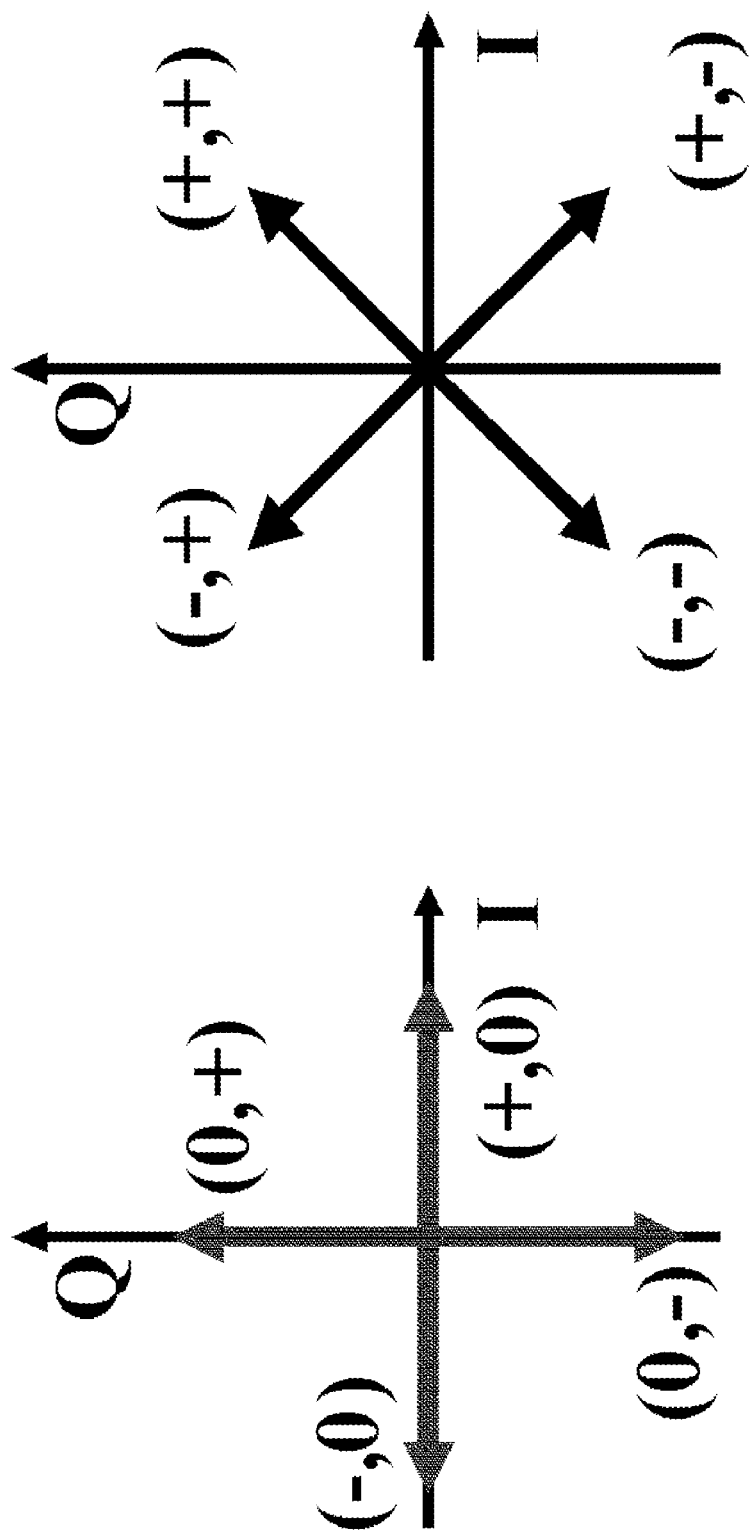
FIG. 10 includes diagrams about the test signals in the example of the present invention.

Typically, a signal compensating operation of a signal processing apparatus and a signal processing method of the present invention is performed by a sequence in FIG. 8. That is, a step (S1) of performing a DC offset compensating operation, a step (S2) of performing an IQ amplitude mismatch compensating operation, and a step (S3) of performing an IQ phase mismatch compensating operation are sequentially performed. Then, in each of the compensation steps of a DC offset, an IQ amplitude mismatch, and an IQ phase mismatch, signs and the order of test signals from a test signal generation unit 10 are typically changed as shown in FIG. 9, thereby performing the signal compensating operation. FIG. 10 includes diagrams showing components of the test signals in FIG. 9. A case of DC offset compensation, a case of IQ amplitude mismatch compensation, and a case of IQ phase mismatch compensation will be respectively described in first to third examples.

First Example

As the first example of the signal processing apparatus of the present invention, the case of DC offset compensation will be described with reference to FIG. 3.

A test signal generation unit 10 generates a first test signal in which an in-phase component (I) and a quadrature component (Q) are respectively ($V_{TST}$, 0) when a DC voltage value is indicated by $V_{TST}$. Then, the envelope of an output obtained by orthogonally modulating the first test signal by an orthogonal modulator 11 is detected by a detector 12, and a result of the detection is held in a sample-and-hold circuit 21. Next, the test signal generation unit 10 generates a second test signal in which an in-phase component (I) and a quadrature component (Q) are respectively ($-V_{TST}$, 0). Then, the envelope of an output obtained by orthogonally modulating the second test signal by the orthogonal modulator 11 is detected by the detector 12. Then, a result of the detection is compared with the result of the detection corresponding to the first test held in the sample-and-hole circuit 21 by a comparison unit 22.

Next, based on information on a magnitude relation obtained by the comparison unit 22, a control unit 14 determines whether to adjust a compensation value to increase a DC level on an in-phase component (I) side or whether to adjust the compensation value to reduce the DC level on the in-phase component (I) side so as to balance strengths of both of the first and second test signals. The control unit 14 adjusts a compensation amount of a first compensation unit, based on a result of the determination. Then, the operation proceeds to a next comparison operation. By repeating a plurality of comparison operations described above while gradually decreasing the compensation amount, the control unit 14 controls a difference between output amplitudes of the orthogonal modulator 11 to be within a certain error range assumed in advance. The difference between the output amplitudes is generated when the first test signal is received and when the second test signal is received. The control unit 14 thereby obtains a final first adjustment value.

Figure 11:
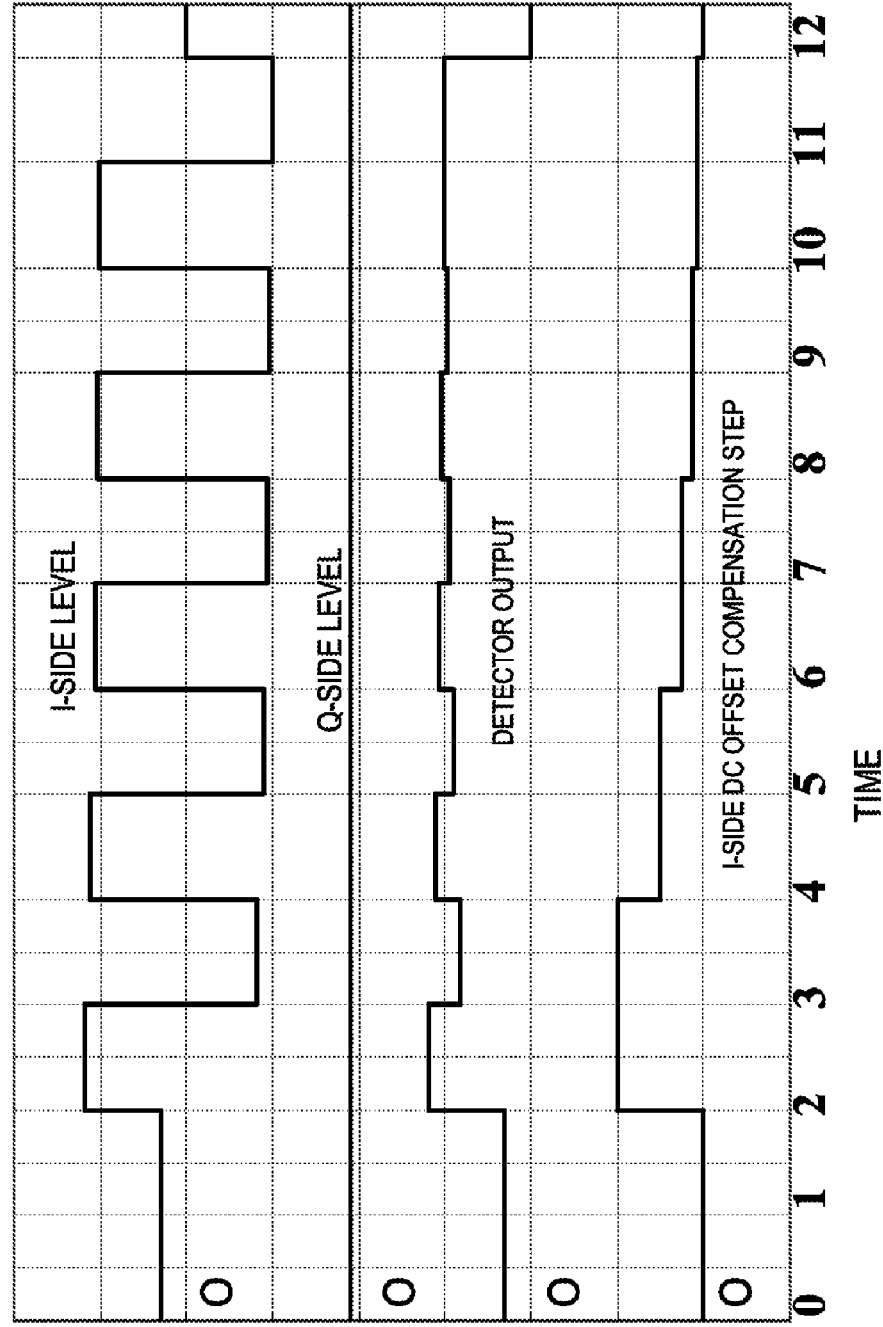
FIG. 11 is a diagram showing examples of signal waveforms in a first example of the present invention.
Figure 12:
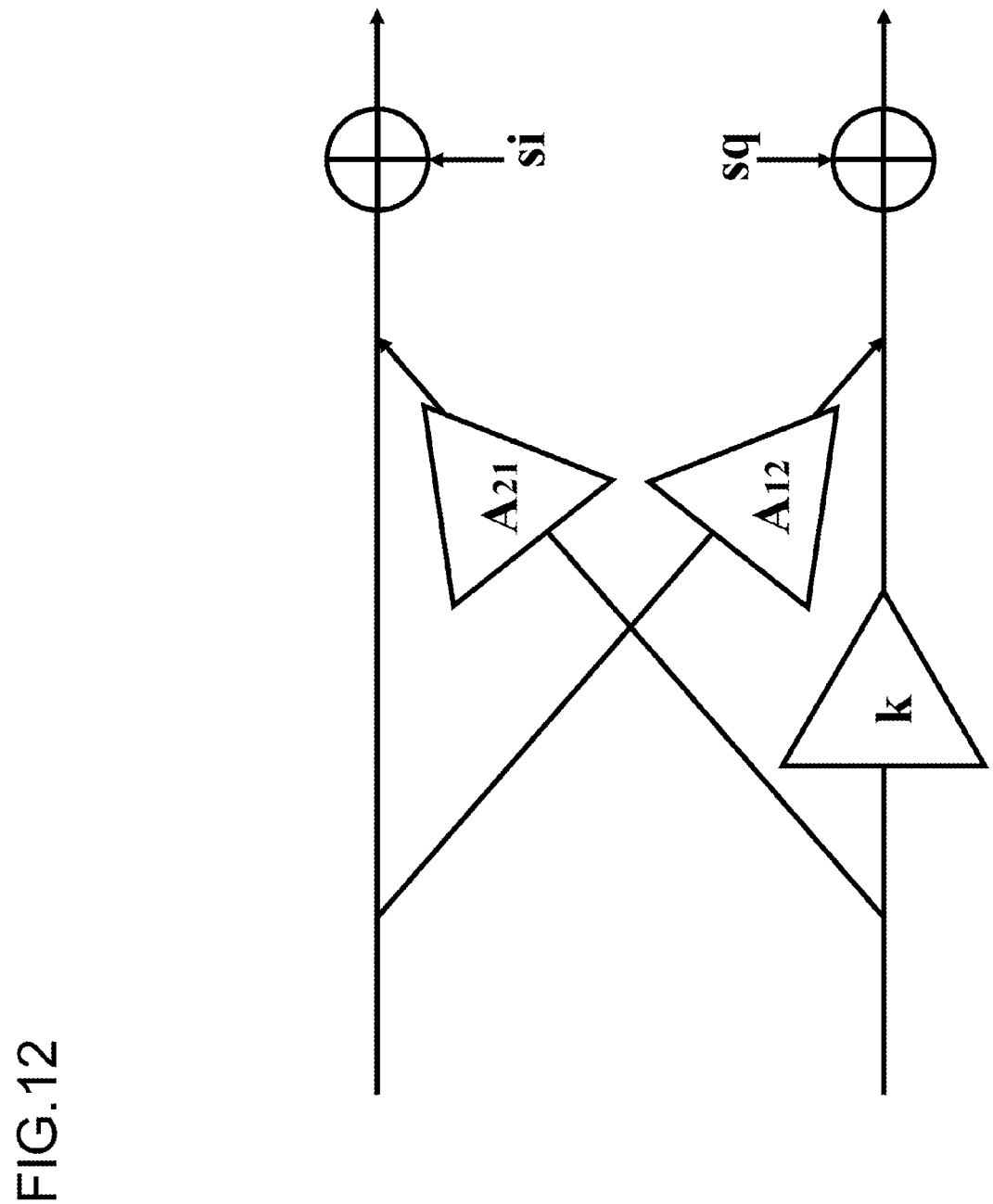
FIG. 12 is a diagram showing a configuration example in the first example of the present invention.

The above-mentioned series of operations will be shown in FIG. 11. FIG. 11 shows the test signal on the side of the in-phase component (I) and the test signal on the side of the quadrature component (Q), an output of the detector 12, and a compensation amount updating step. The comparison unit 22 compares an output of the detector 12 from timing 2 to 3 and an output of the detector 12 from timing 3 to 4, and makes a magnitude determination. Next, the comparison unit 22 compares an output from times 4 to 5 and an output from timing 5 to 6. Similar operations are then repeated. By adjusting the compensation amount of the first compensation unit 19 for each determination, a DC offset amount (indicated by reference character $s_1$ in FIG. 12) is adjusted. The compensation amount is gradually narrowed down. By repeating the above-mentioned operations a specified number of times, an output difference of the detector 12 is controlled to be within a certain error range. The adjustment value obtained at this point is held in the adjustment value holding unit 15. The adjustment value is set to the first adjustment value.

When the first adjustment value is obtained as described above, an offset of the comparison unit 22 must be sufficiently small. The reason for this small offset will be described below.

Figure 13:
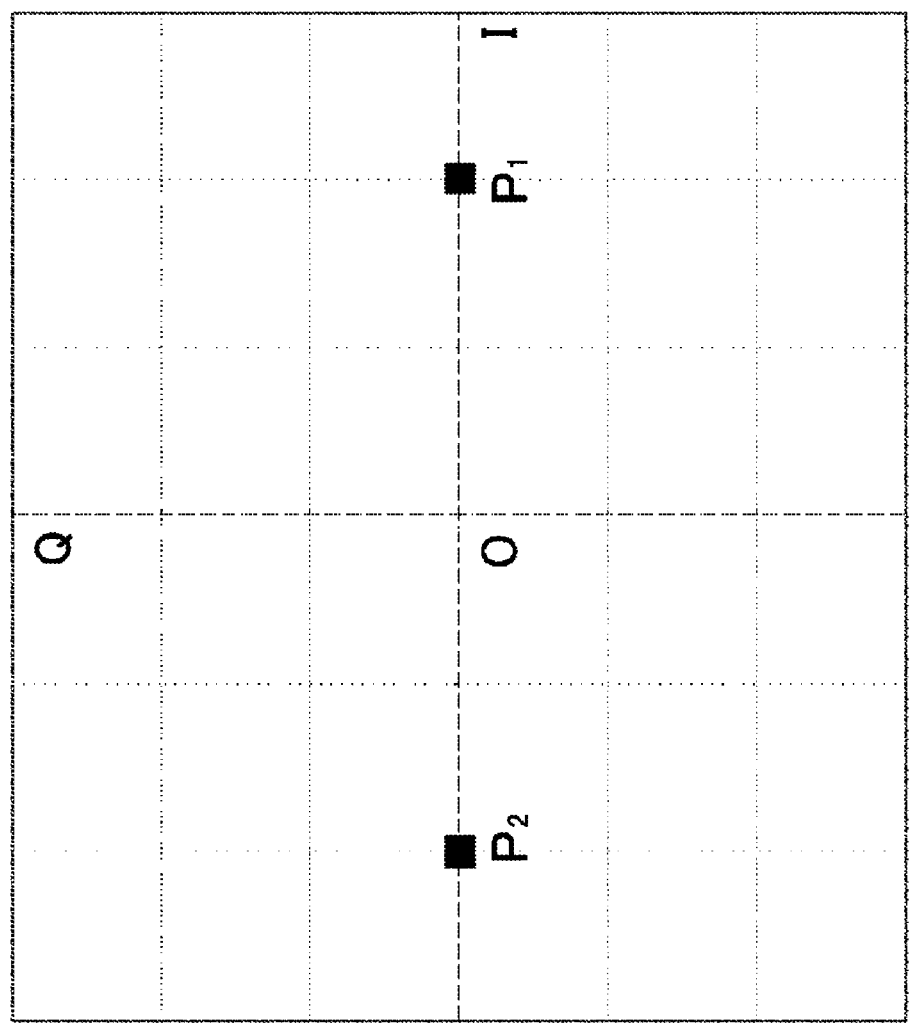
FIG. 13 is a diagram showing output examples of an orthogonal modulator in the first example of the present invention.
Figure 14:
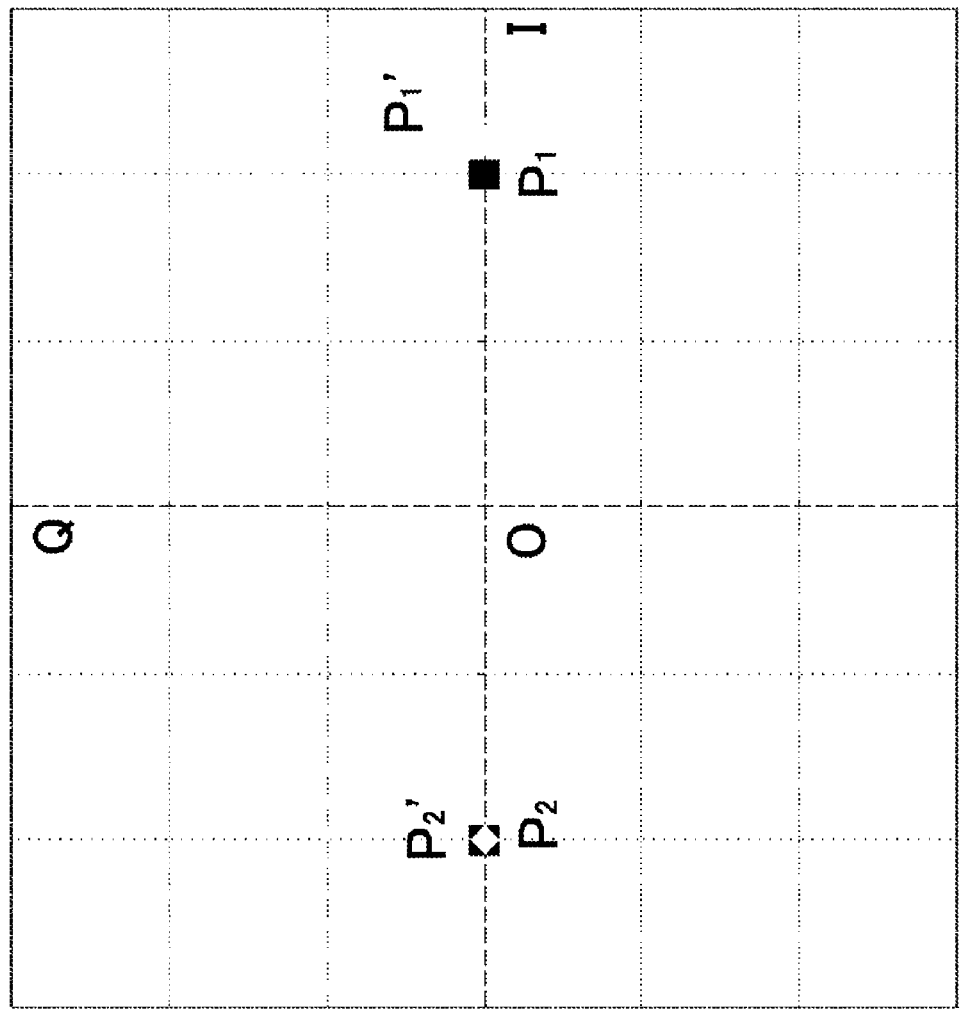
FIG. 14 is a diagram showing output examples of the orthogonal modulator in the first example of the present invention.

FIG. 13 shows two points for calibration. Further, it is assumed that there are no DC offset, no IQ phase error, no IQ amplitude error, and no offset of the comparison unit 22. A point $P_1$ in FIG. 13 is a point when the first test signal is received, while a point $P_2$ in FIG. 13 is a point when the second test signal is received. The distance from the point of origin to the point $P_1$ and the distance from the point of origin to the point $P_2$ are obtained by detecting envelopes of outputs of the orthogonal modulator 11. Based on a condition in which these distances are equal, a requirement where there is no DC offset is determined. In the example shown in FIG. 13, it is clear that this approach correctly functions. However, there is usually an offset in the comparison unit 22. FIG. 14 shows a state where the offset of this comparison unit 22 is present. In this case, it is assumed that there are no DC offset, no IQ phase error, and no IQ amplitude error. The example in FIG. 14 is different from the example in FIG. 13 in that a positive offset normalized by output level of the orthogonal modulator 11 is generated in an output when the first test signal is received. Then, the output of the orthogonal modulator is handled as if its amplitude has increased. The comparison unit 22 makes comparison using the value of the amplitude including this offset. For this reason, even if the outputs of the orthogonal modulator 11 are the same, an output of the comparison unit 22 indicates a judgment that the first test signal is larger. Due to the offset of the comparison unit 22, a point $P_1$ shown in FIG. 14 and used for calibration has been correspondingly shifted to a point $P_1'$ in a right direction. In this approach, a requirement where no DC offset is present is determined based on a condition where the distance from the point of origin to the point $P_1'$ is equal to the distance from the point of origin to the point $P_2'$. According to the example shown in FIG. 14, however, it is clear that the distance from the point of origin to the point $P_1'$ is longer than the distance from the point of origin to the point $P_2'$ though no DC offset is present. That is, when the DC offset is present in the comparison unit 22, an error corresponding to the magnitude of the DC offset occurs.

Figure 15:
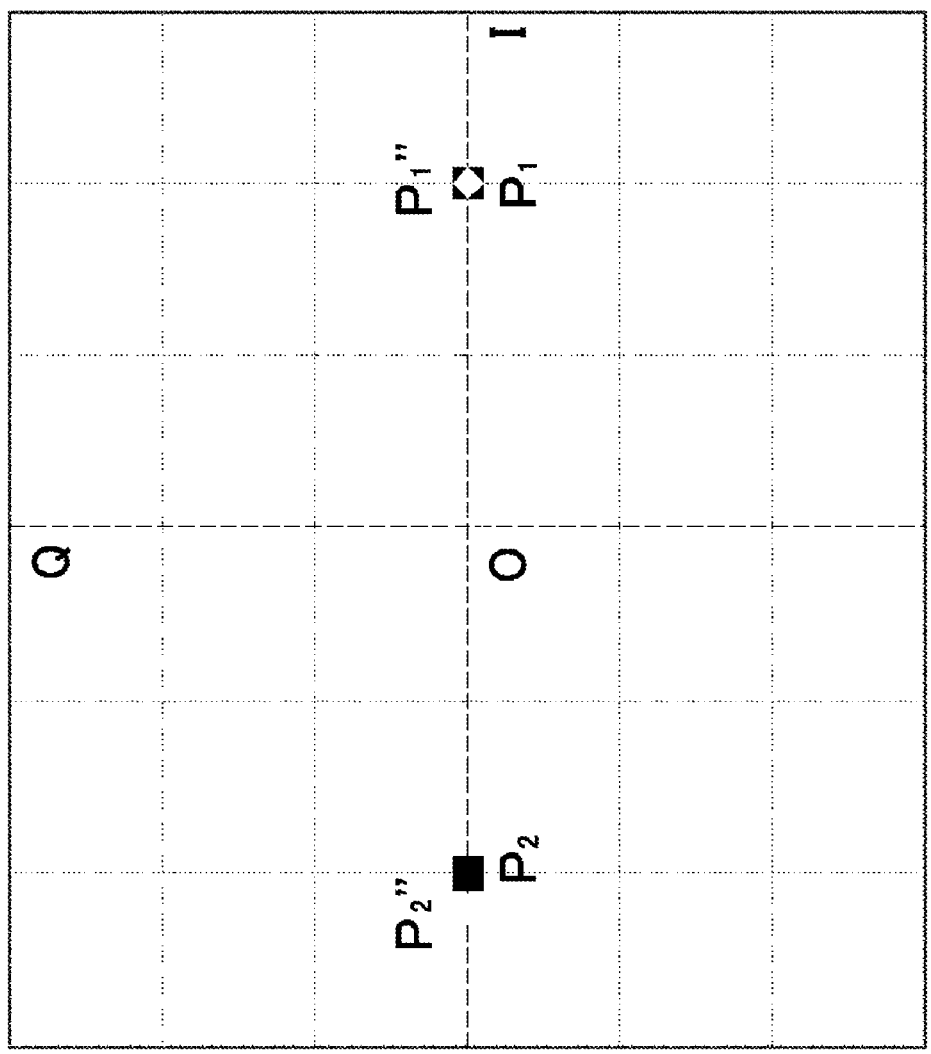
FIG. 15 is a diagram showing output examples of the orthogonal modulator in the first example of the present invention.

Then, consider a case where, when the offset of the same amount as in the example in FIG. 14 is present in the comparison unit 22, an adjustment value is determined by changing the order of the test signals. FIG. 15 shows a state where the order of the first and second test signal is changed. In this case as well, it is assumed that there are no DC offset, no IQ phase error, and no IQ amplitude error. This example is different from the example in FIG. 14 in that a point $P_2$ shown in FIG. 15 and used for calibration is shifted to a point $P_2''$ in a left direction due to the offset of the comparison unit 22. In this approach, based on a condition where the distance from the point of origin to a point $P_1''$ is equal to the distance from the point of origin to the point $P_2''$, a requirement where no DC offset is present is determined. According to the example shown in FIG. 15, the distance from the point of origin to the point $P_2''$ is longer than the distance from the point of origin to the point $P_1''$. That is, when there is the DC offset in the comparison unit 22, an error in a direction opposite to that in the case of FIG. 14, corresponding to the magnitude of the DC offset occurs. By changing the order of the test signals in this manner, the direction where the error appears can be changed. The adjustment value obtained by changing the order of the test signals as described above is set to a second adjustment value. The above adjustment will be described below by using expressions.

Figure 16:
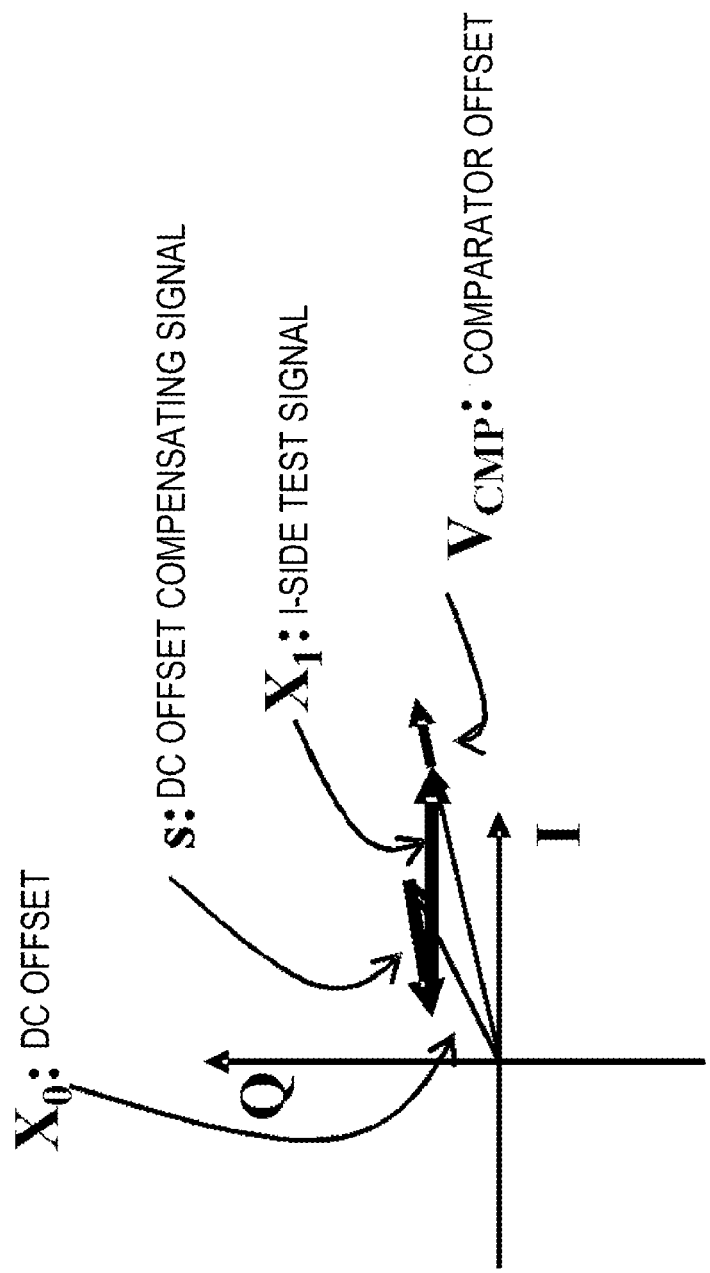
FIG. 16 is a diagram showing an example of a test signal in the first example of the present invention.

Assume that vectors of an output of the orthogonal modulator 11 at a time of receiving a test signal are illustrated as shown in FIG. 16. Then, compensation for a DC offset on an in-phase component (I) side is to determine $s=(s_i, s_q)$ that satisfies an expression of $$\|x_1+x_0+s\|=\|-x_1+x_0+s\|.$$

Herein, two sets of the test signals for DC offset compensation on the in-phase component (I) side are set to the following first and second test signals:

|     | First Signal        | Second Signal       |
| --- | ------------------- | ------------------- |
| (1) | $(V_{TST}, 0)$      | $(-V_{TST}, 0)$     |
| (2) | $(-V_{TST}, 0)$     | $(V_{TST}, 0)$      |

Values of s that have been converged using these signals are respectively set to $s_1$ (first adjustment value) and $s_2$ (second adjustment value), and the offset of the comparison unit 22 is indicated by $V_{cmp}$. Then, those values satisfy the following relationships:

$$\|x_1+x_0+s_1\|+V_{cmp}=\|-x_1+x_0+s_1\|$$

$$\|x_1+x_0+s_2\|+V_{cmp}=\|-x_1+x_0+s_2\|$$

where $s_1$ and $s_2$ are vectors each of which adjust a DC component on the I side.

By using the in-phase side component $s_i$ of the value s that satisfies an expression of $$s=(s_1+s_2)/2$$

based on these expressions, compensation that reduces the influence of an error in the offset of the comparison unit 22 can be performed.

The test signal on the Q-side is indicated by $x_2$. Then, by interchanging $x_1$ and $x_2$, the following two sets of the test signals for DC offset compensation on the Q side are set as follows. The order of the test signals is interchanged between the two sets of the test signals:

|     | First Signal        | Second Signal       |
| --- | ------------------- | ------------------- |
| (3) | $(0, V_{TST})$      | $(0, -V_{TST})$     |
| (4) | $(0, -V_{TST})$     | $(0, V_{TST})$      |

Then, values of s that have been converged by using these signals are respectively set to $s_3$ and $s_4$. By using the Q-side component $s_q$ of the value s that satisfies an expression of $$s=(s_3+s_4)/2$$

for DC offset compensation on the Q-side, compensation that reduces the influence of an error in the offset of the comparison unit 22 can be performed. By a sequence of operations described above, reduction can be performed to a proper DC offset compensation level of the system, with reliability.

Figure 17:
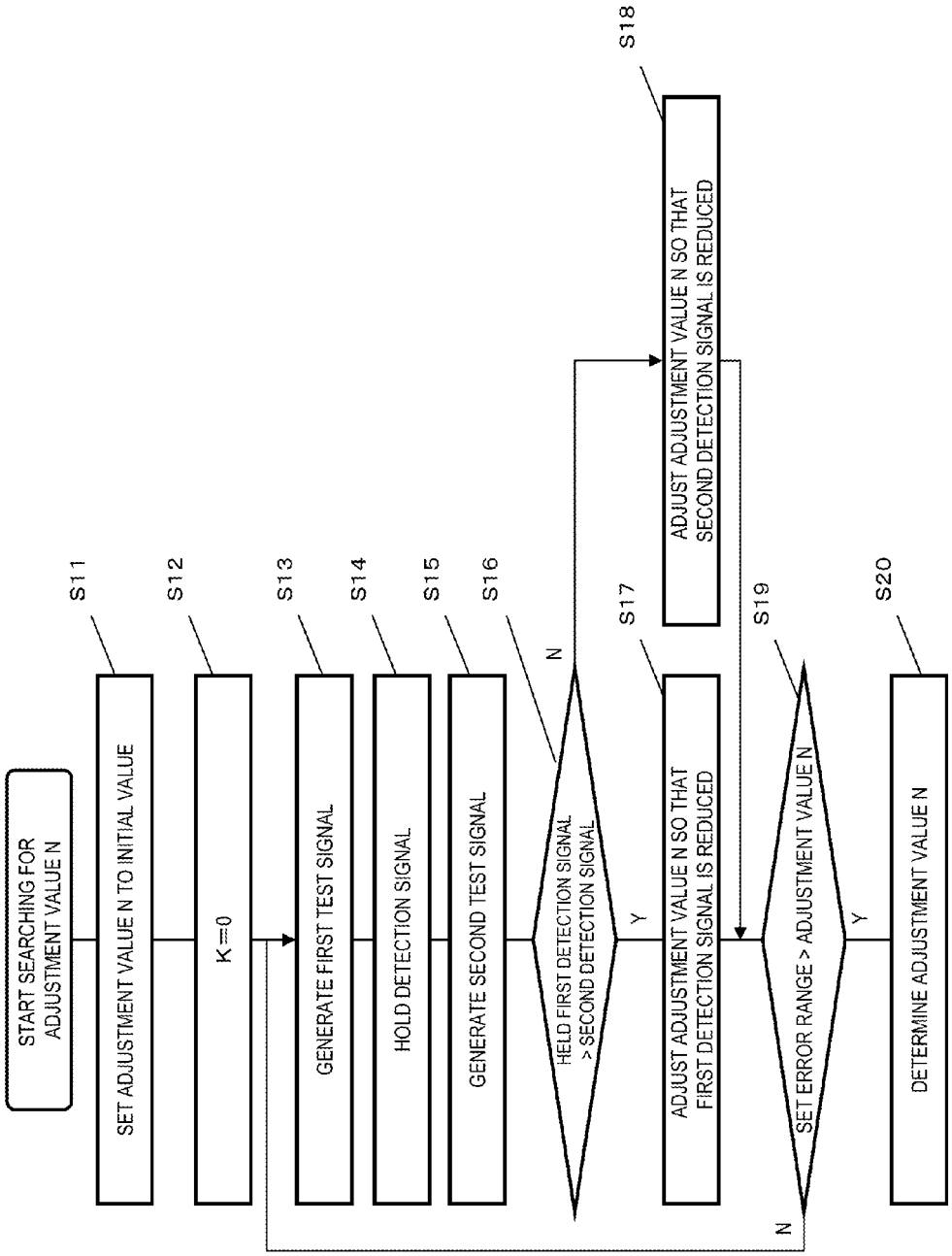
FIG. 17 is a diagram showing an example of the execution sequence in the first example of the present invention.
Figure 18:
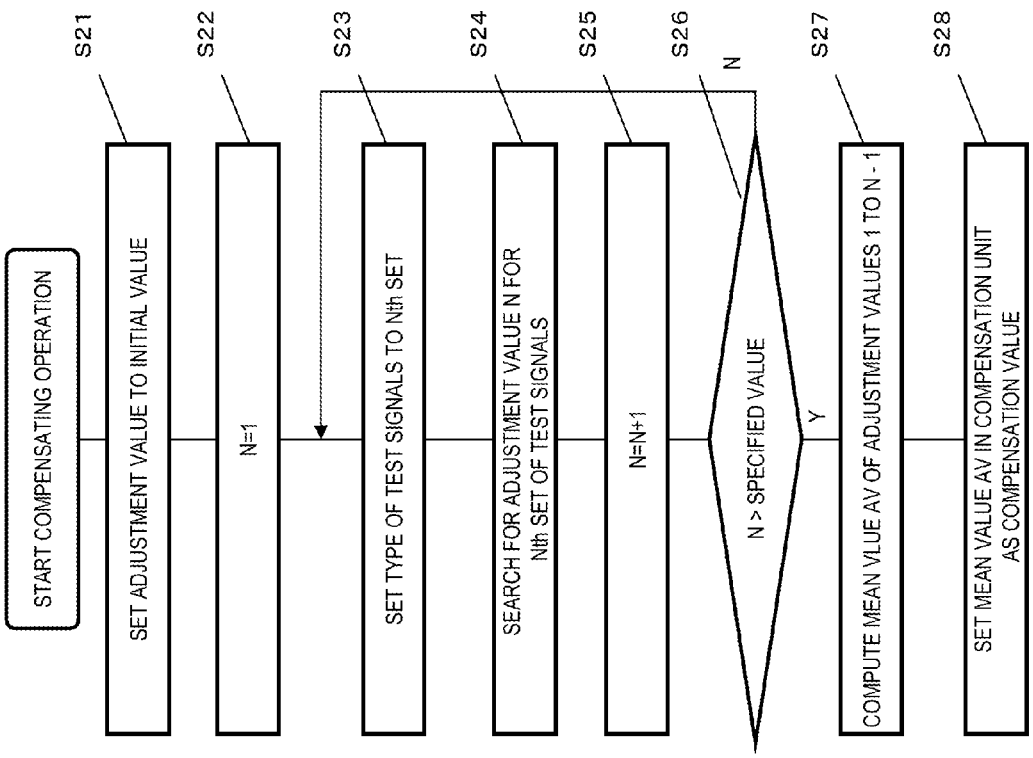
FIG. 18 is a diagram showing an example of the execution sequence in the first example of the present invention.

FIGS. 17 and 18 are flowcharts showing the above-mentioned sequence of operations. FIG. 17 is a flowchart showing derivation of each adjustment value from each set of the test signals. FIG. 18 is a flowchart showing derivation of a compensation value from each adjustment value. As shown in FIG. 17, an adjustment value N is first set to an initial value (in step S11). A number K of an adjustment value determination cycle is set to an initial value of 0 (in step S12). Then, the first test signal is generated (in step S13). A detection signal resulting from detection of an output obtained by orthogonally modulating the first test signal is held (in step S14). Next, the second test signal is generated (in step S15). The held detection signal (hereinafter referred to as a first detection signal) corresponding to the first test signal is compared with a detection signal (hereinafter referred to as a second detection signal) corresponding to the second test signal, for determination (in step S16). When the first detection signal is greater than the second detection signal, the adjustment value is adjusted so that the first detection signal is reduced (in step S17). When the second detection signal is greater than the first detection signal, the adjustment value is adjusted so that the second detection signal is reduced (in step S18). Then, the adjustment value obtained by the above-mentioned processes is compared with an error range assumed in advance (in step S19). When the adjustment value is within the error range, the adjustment value is set to the adjustment value N (in step S20). When the adjustment value is outside the error range, the above-mentioned steps S13 to S19 are repeated until the adjustment value is held within the error range, thereby determining the adjustment value N (in step S20). As shown in FIG. 18, the compensation value is first set to an initial value (in step S21). A test signal set number N is set to one (in step S22). Then, test signals having the test signal set number of one are set (in step S23). The adjustment value N for the test signals is searched for (in step S24). Next, the test signal set number N is incremented by one (in step S25), and is then compared with a specified value set in advance (in step S26). When the test signal set number N is equal to or less than the specified value, the above-mentioned steps S23 to S25 are repeated. When the test signal set number N reaches the specified value, a mean value of the respective values N obtained for the respective numbers N is computed (in step S27). The mean value is set in the compensation unit as the compensation value (in step S28). The processes shown in FIG. 17 are performed between the steps S23 and S24.

In the sequence shown in FIGS. 17 and 18, the compensation value is derived by the compensation value derivation unit 16 after all the adjustment values are held in the adjustment value holding unit 15. Whenever each adjustment value is derived, the adjustment value held so far may be updated, without deriving the compensation value after all the adjustment values have been held. A sequence in this case will be shown in FIG. 19. That is, the compensation value is first set to an initial value (in step S31). The test signal set number N is set to one, and a mean value AV is set to 0 (in step S32). Then, test signals having the test signal set number N of one are set (in step S33). The adjustment value N for the test signals is searched for (in step S34). Next, the test signal set number N is incremented by one (in step S35). Using the mean value AV and the adjustment value N, a mean value AV is computed, for updating (in step S36). The adjustment value N is compared with the specified value set in advance (in step S37). When the adjustment value N is equal to or less than the specified value, the above-mentioned steps S33 to S36 are repeated. When the adjustment value N reaches the specified value, the mean value AV is set in the compensation unit as the compensation value (in step S38). The processes shown in FIG. 17 are performed between the above-mentioned steps S33 and 34.

Second Example

As a second example of a signal processing apparatus of the present invention, the case of IQ amplitude mismatch compensation will be described, with reference to FIG. 3.

A test signal generation unit 10 generates a first test signal in which an in-phase component (I) and a quadrature component (Q) are respectively ($V_{TST}$, 0), where $V_{TST}$ is a DC voltage value. Then, the envelope of an output obtained by orthogonally modulating the first test signal by an orthogonal modulator 11 is detected by a detector 12, and a result of the detection is held in a sample-and-hold circuit 21. Next, the test signal generation unit 10 generates a second test signal in which an in-phase component (I) and a quadrature component (Q) are respectively (0, $V_{TST}$). Then, the envelope of an output obtained by orthogonally modulating the second test signal by the orthogonal modulator 11 is detected by the detector 12. Then, a result of the detection is compared with the result of the detection corresponding to the first test signal held in the sample-and-hole circuit 21 by a comparison unit 22.

Next, based on information on a magnitude relation obtained by the comparison unit 22, a control unit 14 determines whether to adjust a compensation value to increase a DC level on an in-phase component (I) side or whether to adjust the compensation value to reduce the DC level on the in-phase component (I) side so as to balance strengths of both of the first and second test signals. The control unit 14 adjusts a compensation amount of a first compensation unit 19, based on a result of the determination. Then, the operation proceeds to a next comparison operation. By repeating a plurality of comparison operations described above, while gradually decreasing the compensation amount, the control unit 14 controls a difference between an output amplitude of the orthogonal modulator 11 at the time of reception of the first test signal is received and an output amplitude of the orthogonal modulator 11 at the time of reception of the second test signal to be within a certain error range assumed in advance and thereby obtains a final first adjustment value.

Figure 20:
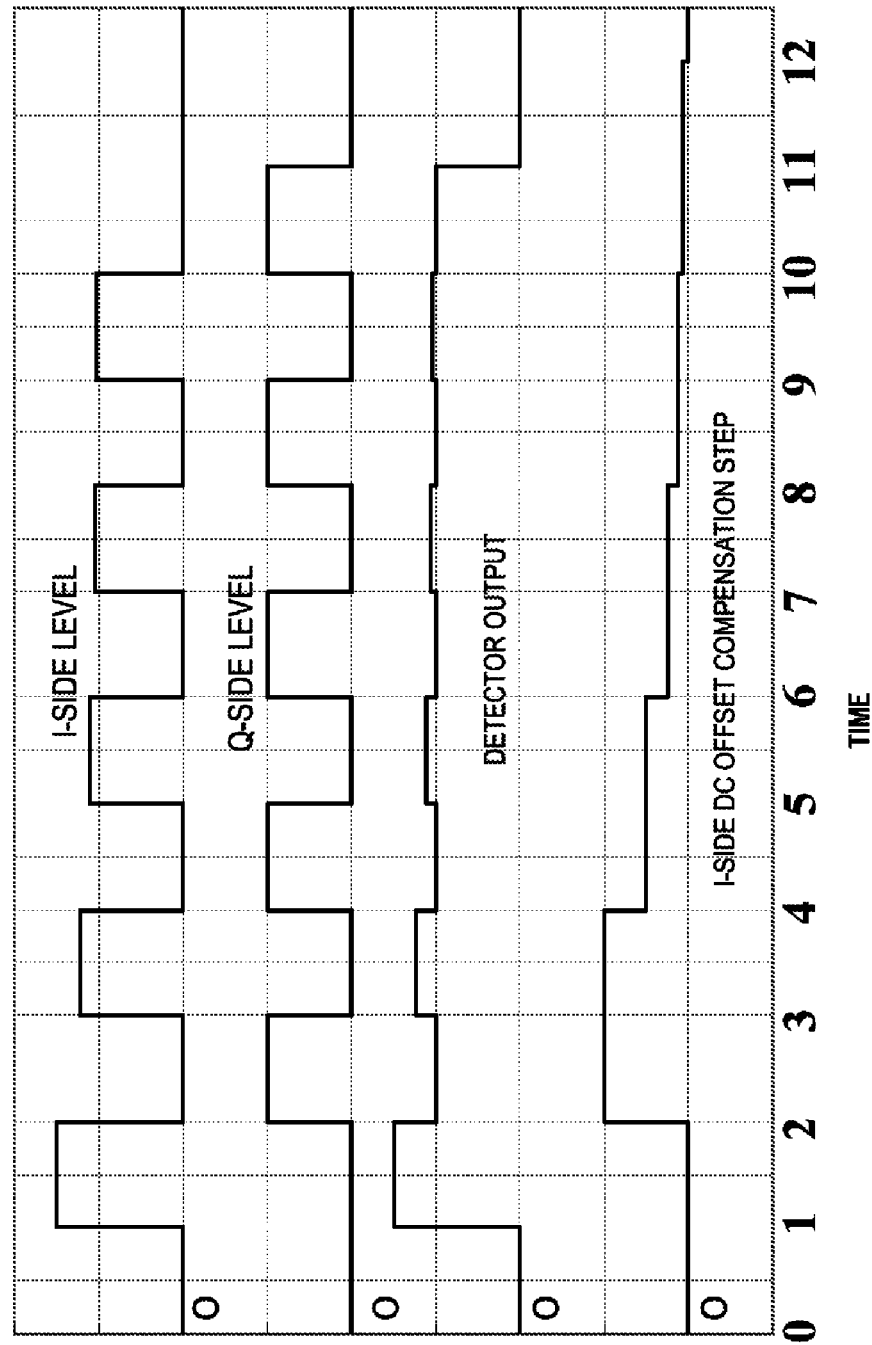
FIG. 20 is a diagram showing examples of signal waveforms in a second example of the present invention.

The above-mentioned series of operations will be shown in FIG. 20. FIG. 20 shows the test signal of the in-phase component (I) and the test signal of the quadrature component (Q), an output of the detector 12, and a compensation amount updating step. The comparison unit 22 compares an output of the detector 12 from timing 2 to 3 with an output of the detector 12 from timing 3 to 4, and makes a magnitude determination. Next, the comparison unit 22 compares an output from timing 4 to 5 with an output from time points 5 to 6. Similar operations are then repeated. By adjusting the compensation amount of the first compensation unit 19 for each determination, a test signal amplitude (indicated by reference character k in FIG. 12) is adjusted. The compensation amount is gradually narrowed down. By repeating the above-mentioned operations a specified number of times, an output difference of the detector 12 is held within the certain error range. The adjustment value obtained at this point is held in the adjustment value holding unit 15. The adjustment value is set to the first adjustment value.

Figure 21:
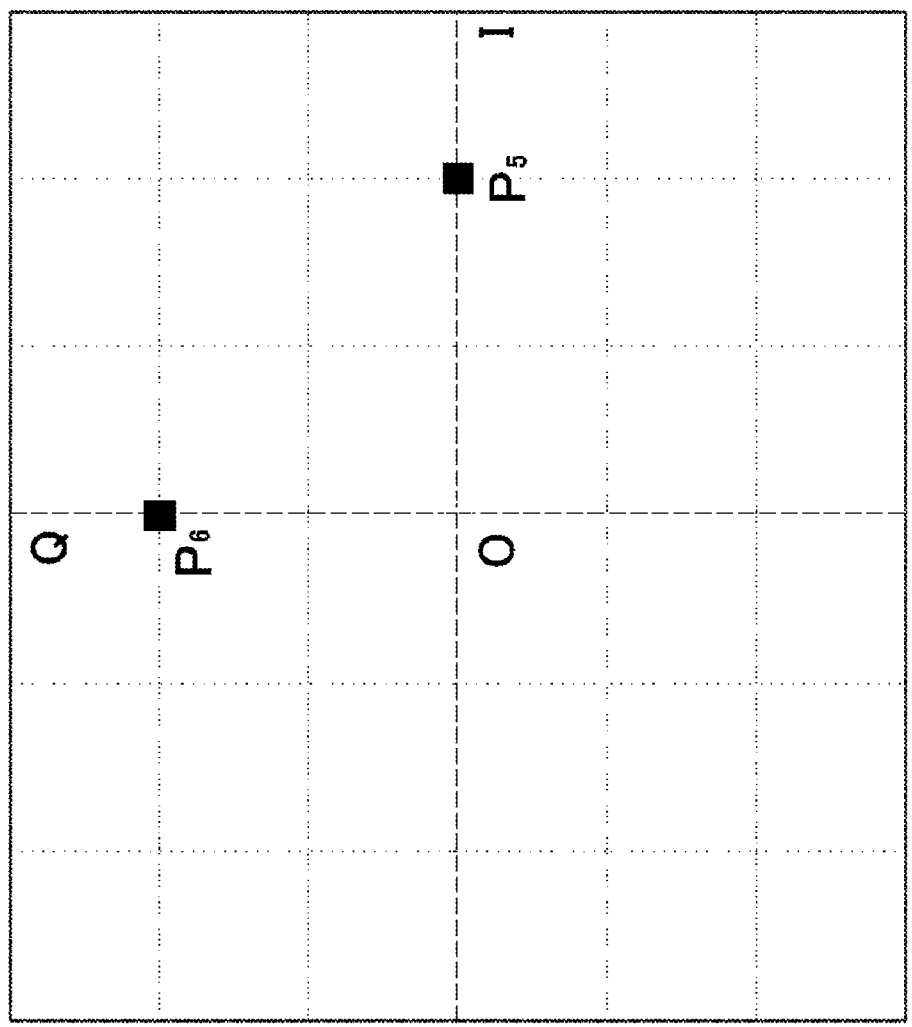
FIG. 21 is a diagram showing output examples of the orthogonal modulator in the second example of the present invention.
Figure 22:
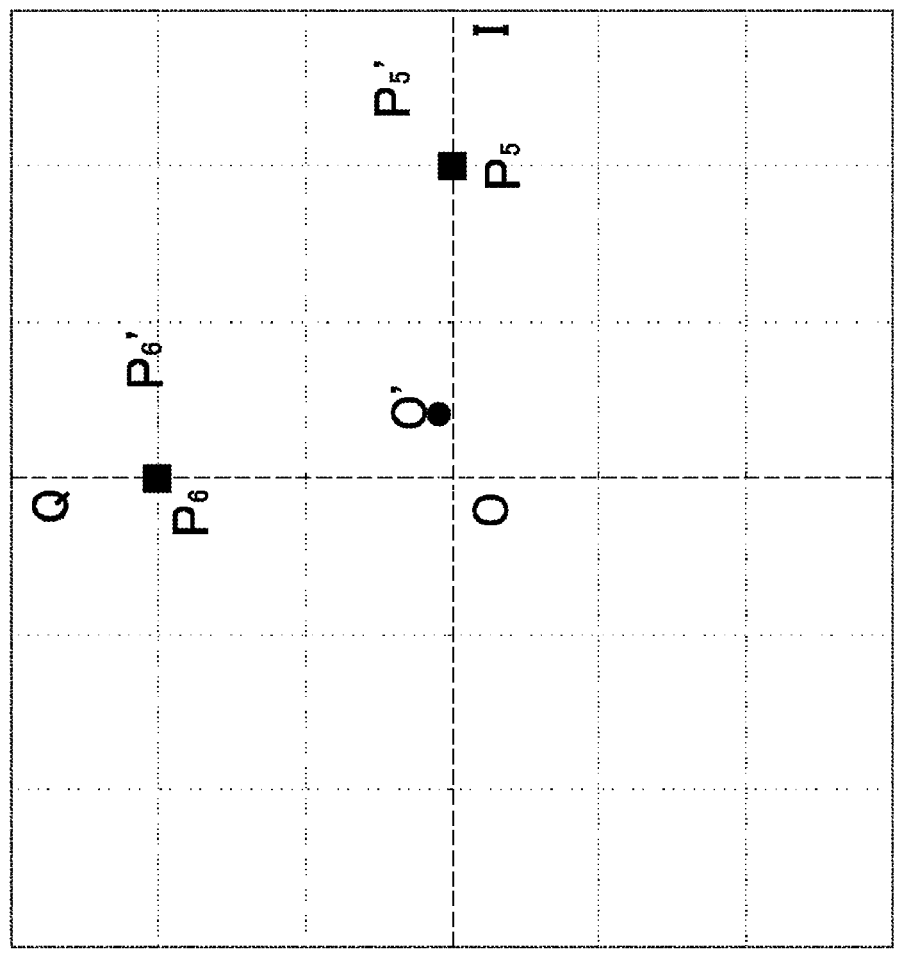
FIG. 22 is a diagram showing output examples of the orthogonal modulator in the second example of the present invention.

When the first adjustment value is obtained as described above, a DC offset normalized by baseband input level to the orthogonal modulator 11, or a carrier leakage normalized by output level of the orthogonal modulator 11 must be sufficiently suppressed. The reason for this suppression will be described below. FIG. 21 shows two points for calibration. It is herein assumed that there are no IQ phase error and no IQ amplitude error. A point $P_5$ in FIG. 21 is a point when the first test signal is received, while a point $P_6$ in FIG. 21 is a point when the second test signal is received. The distance from the point of origin to the point $P_5$ and the distance from the point of origin to the point $P_6$ are obtained by detecting envelopes of outputs of the orthogonal modulator 11. Based on a condition in which these distances are equal, a requirement where there is no IQ amplitude error is determined. In the example shown in FIG. 21, it is clear that this approach correctly functions. However, even if DC offset compensation has been performed, a DC offset normalized by input level to the orthogonal modulator 11 invariably remains in the orthogonal modulator 11. FIG. 22 shows a state in which this DC offset is present. In this case, it is assumed that there are no IQ phase error and no IQ amplitude error. The example in FIG. 22 is different from the example in FIG. 21 in that a positive DC offset is generated on each of the I and Q sides. For this reason, even if there is no input to the orthogonal demodulator 11, a carrier leakage represented by a point indicated as 0' in FIG. 22 occurs. Due to this DC offset, points $P_5$ and $P_6$ shown in FIG. 22 and used for calibration are respectively shifted to points $P_5'$ and $P_6'$ in directions where amplitudes of the first and second signals are increased. In this approach, the distance from the point of origin to the point $P_5'$ and the distance from the point of origin to the point $P_6'$ are determined by detecting envelopes of outputs of the orthogonal modulator 11, and a requirement where no IQ amplitude error is present is determined based on a condition in which these distances are equal. According to the example shown in FIG. 22, however, it is clear that the distance from the point of origin to the point $P_5'$ is longer than the distance from the point of origin to the point $P_6'$ though no IQ amplitude error is present. That is, when the DC offset is present in the orthogonal modulator 11, an error corresponding to the magnitude of the DC offset occurs.

Figure 23:
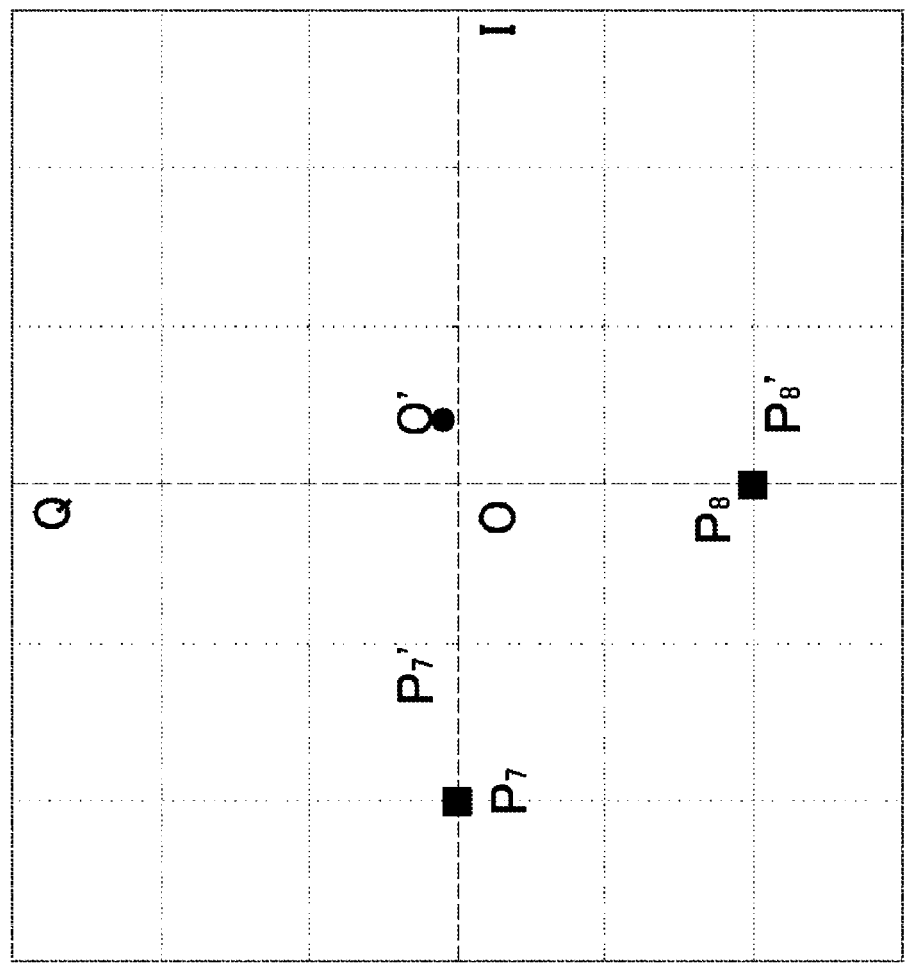
FIG. 23 is a diagram showing output examples of the orthogonal modulator in the second example of the present invention.

Then, consider a case where, when a DC offset of the same amount as in the example in FIG. 22 is present, an adjustment value is determined by changing the polarities of the test signals. FIG. 23 shows a state where the polarities of the test signals have been changed. In this case as well, it is assumed that there are no IQ phase error and no IQ amplitude error. This example is different from the example in FIG. 22 in that, due to the DC offset, two points $P_7$ and $P_8$ shown in FIG. 22 and used for calibration are shifted to point $P_7'$ and $P_8'$ in directions where amplitudes of the first and second test signals are reduced. In this case, the distance from the point of origin to the point $P_7'$ and the distance from the point of origin to the point $P_8'$ are determined by detecting envelopes of outputs of the orthogonal modulator 11, and a requirement where no DC offset is present is determined based on a condition in which these distances are equal. According to the example shown in FIG. 23, the distance from the point of origin to the point $P_8'$ is longer than the distance from the point of origin to the point $P_7'$. That is, when there is the DC offset of the orthogonal modulator 11, an error in a direction opposite to that in the case of FIG. 22, corresponding to the magnitude of the DC offset occurs. By changing the polarities of the test signals in this manner, the direction where the error appears can be changed. An adjustment value obtained by changing the polarities of the test signals as described above is set to a second adjustment value. The above adjustment will be described below by using expressions.

Assume that vectors of an output of the orthogonal modulator 11 at a time of receiving a test signal are expressed as described above. Assume that the test signal on the in-phase side (I) and the test signal on the Q-side are respectively indicated by $x_1$ and $x_2$. Then, compensation for an amplitude mismatch is to determine k that satisfies an expression of $$\|x_1\|=k\|x_2\|.$$

There are four combinations of the test signals having different polarities. Herein, the following four combinations of the test signals having different polarities are set to:

| | First Signal | Second Signal |
|---|---|---|
| (1) | $(V_{TST}, 0)$ | $(0, V_{TST})$ |
| (2) | $(V_{TST}, 0)$ | $(0, -V_{TST})$ |
| (3) | $(-V_{TST}, 0)$ | $(0, V_{TST})$ |
| (2) | $(-V_{TST}, 0)$ | $(0, -V_{TST})$ |

Then, values that have been converged using these signals are respectively set to $k_1$, $k_2$, $k_3$, and $k_4$. Then, those values satisfy the following relationships:

$$\|x_1+x_0\|=\|k_1x_2+x_0\|$$

$$\|x_1+x_0\|=\|-k_2x_2+x_0\|$$

$$\|-x_1+x_0\|=\|k_3x_2+x_0\|$$

$$\|-x_1+x_0\|=\|-k_4x_2+x_0\|$$

Using these expressions, $$k=(k_1+k_2+k_3+k_4)/4$$

can be obtained. That is, each adjustment value is determined by changing the signs/order of the test signals. Then, a value obtained by computing a mean of respective held adjustment values by the compensation value derivation unit 16 indicates an adjustment amount for an I/Q amplitude mismatch where an error due to the DC offset is reduced.

Further, the following signals obtained by inverting the input order of these four sets of the test signals used for IQ amplitude mismatch compensation are employed:

| | First Signal | Second Signal |
|---|---|---|
| (5) | $(0, V_{TST})$ | $(V_{TST}, 0)$ |
| (6) | $(0, -V_{TST})$ | $(V_{TST}, 0)$ |
| (7) | $(0, V_{TST})$ | $(-V_{TST}, 0)$ |
| (8) | $(0, -V_{TST})$ | $(-V_{TST}, 0)$ |

Then, a mean of adjustment values at a time of using a total of the eight sets of the test signals is employed. A compensation value that also suppresses an error due to the offset of the comparison unit 22 can be derived, as in the DC offset compensation described above.

The operations described above are performed by the sequence in FIGS. 17 and 18, as in the first example.

Figure 19:
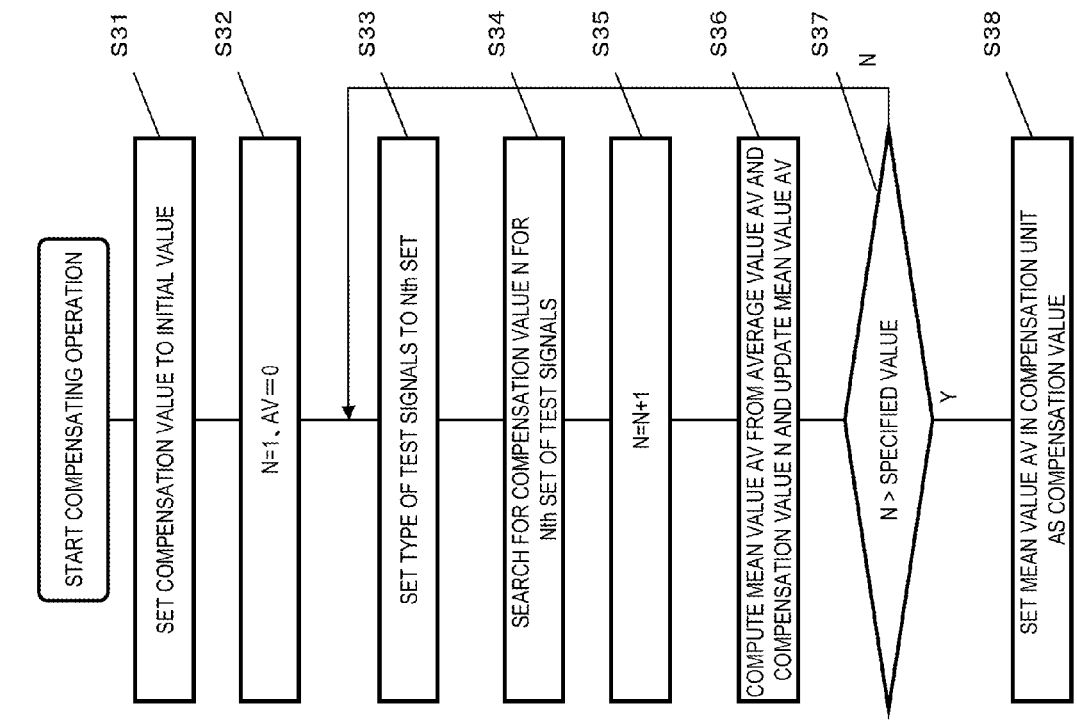
FIG. 19 is a diagram showing an example of an execution sequence in the first example of the present invention.

As in the first example, whenever each adjustment value is derived, the adjustment value held so far may be updated, as shown in FIG. 19, without deriving the compensation value after all the adjustment values have been held in the adjustment value holding unit 15.

Third Example

As a third example of a signal processing apparatus of the present invention, the case of IQ phase mismatch compensation will be described, with reference to FIG. 3.

A test signal generation unit 10 generates a first test signal in which an in-phase component (I) and a quadrature component (Q) are respectively ($V_{TST}$, $V_{TST}$), where $V_{TST}$ is a DC voltage value. Then, the envelope of an output obtained by orthogonally modulating the first test signal by an orthogonal modulator 11 is detected by a detector 12, and a result of the detection is held in a sample-and-hold circuit 21. Next, the test signal generation unit 10 generates a second test signal in which an in-phase component (I) and a quadrature component (Q) are respectively ($V_{TST}$, $-V_{TST}$). Then, the envelope of an output obtained by orthogonally modulating the second test signal by the orthogonal modulator 11 is detected by the detector 12. Then, a result of the detection is compared with the result of the detection corresponding to the first test signal held in the sample-and-hole circuit 21 by a comparison unit 22.

Next, based on information on a magnitude relation obtained by the comparison unit 22, a control unit 14 determines whether to adjust a compensation value to increase a DC level on an in-phase component (I) side or whether to adjust the compensation value to reduce the DC level on the in-phase component (I) side so as to balance strengths of both of the first and second test signals. The control unit 14 adjusts a compensation amount of a first compensation unit 19, based on a result of the determination. Then, the operation proceeds to a next comparison operation. By repeating a plurality of comparison operations described above while gradually decreasing the compensation amount, the control unit 14 controls a difference between the output amplitude of the orthogonal modulator 11 at the time of reception of the first test signal and the output amplitude of the orthogonal modulator 11 at the time of reception of the second test signal to be within an error range assumed in advance. The control unit 14 thereby obtains a final first adjustment value. The first adjustment value is held in an adjustment value holding unit 15.

Figure 24:
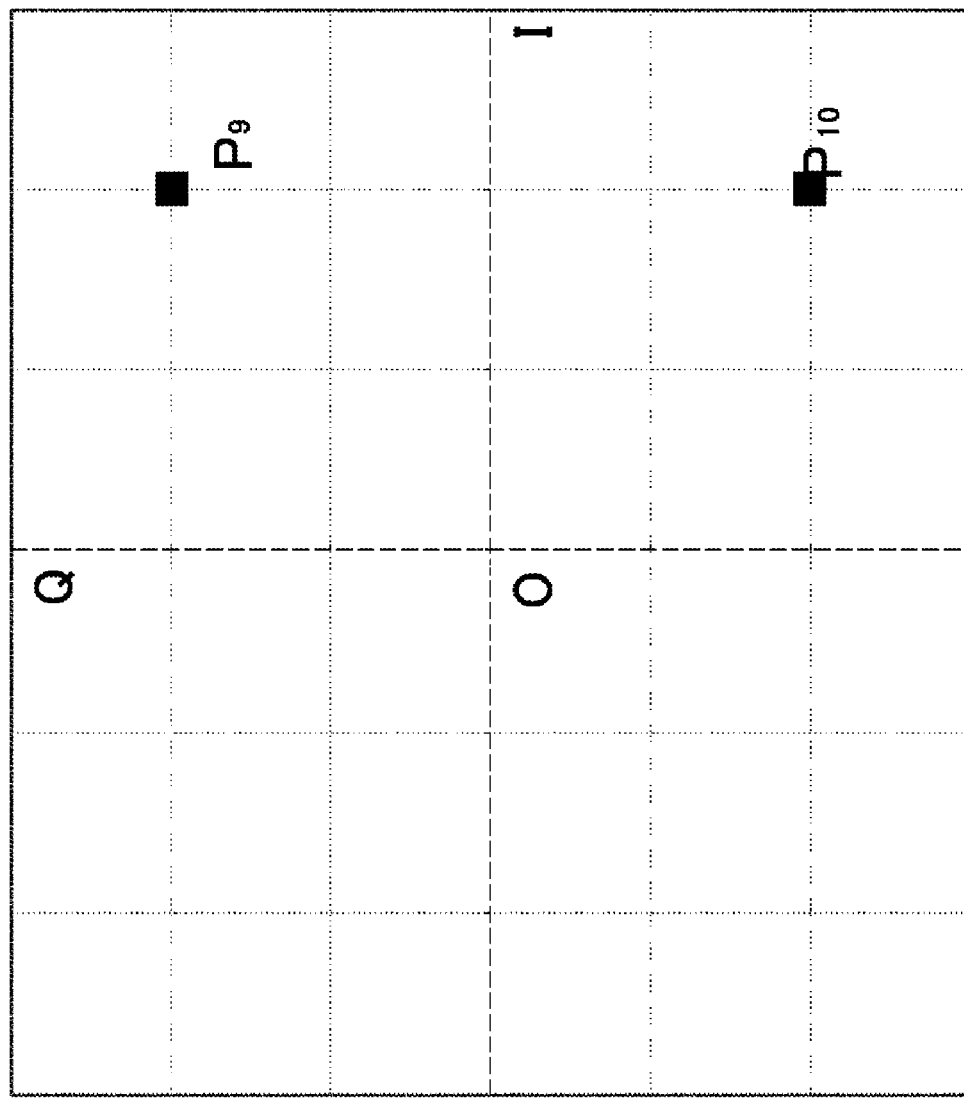
FIG. 24 is a diagram showing output examples of the orthogonal modulator in a third example of the present invention.
Figure 25:
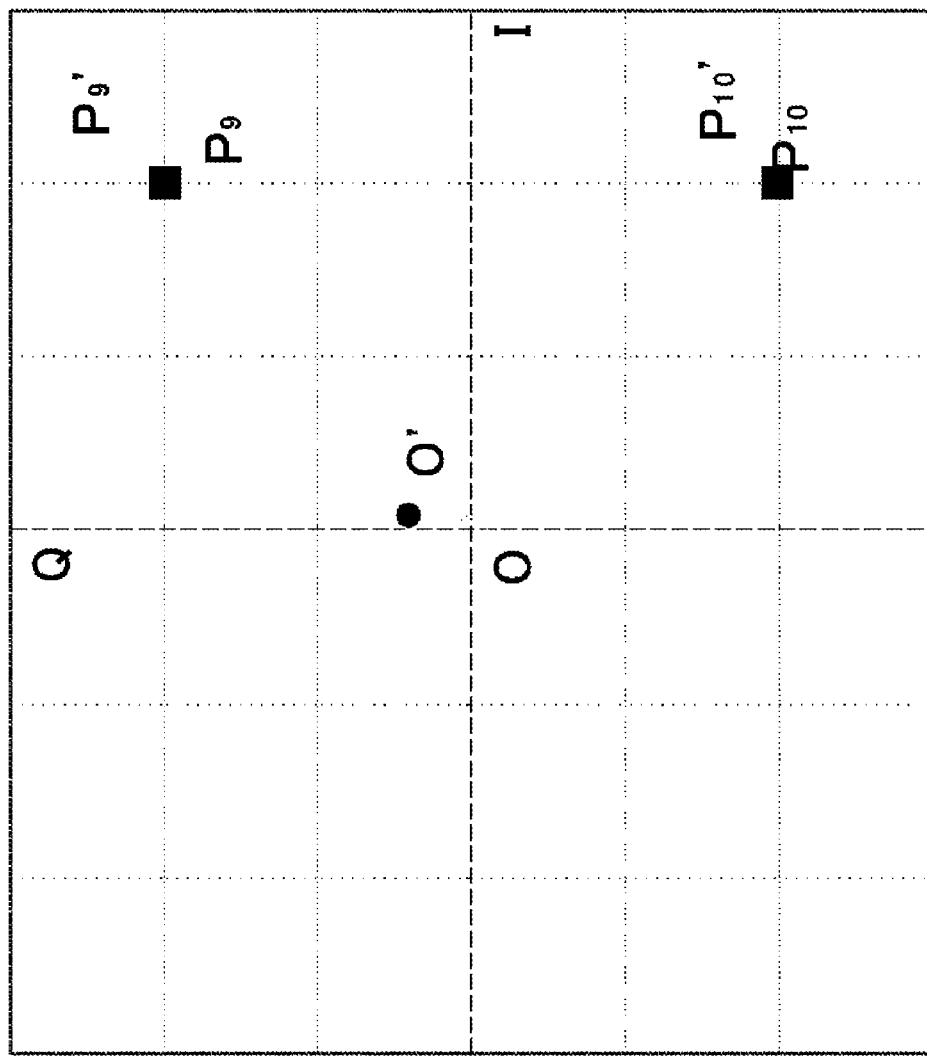
FIG. 25 is a diagram showing output examples of the orthogonal modulator in the third example of the present invention.

When the first adjustment value is obtained as described above, a DC offset normalized by baseband input level to the orthogonal modulator 11, or a carrier leakage normalized by output level of the orthogonal modulator 11 must be sufficiently suppressed. The reason for this suppression will be described below. FIG. 24 shows two points for calibration. It is herein assumed that there are no IQ phase error and no IQ amplitude error. A point $P_9$ in FIG. 24 is a point when the first test signal is received, while a point $P_{10}$ in FIG. 24 is a point when the second test signal is received. The distance from the point of origin to the point $P_9$ and the distance from the point of origin to the point $P_{10}$ are obtained by detecting envelopes of outputs of the orthogonal modulator 11. Based on a condition in which these distances are equal, a requirement where there is no IQ amplitude error is determined. In the example shown in FIG. 24, it is clear that the approach used so far correctly functions. However, even if DC offset compensation has been performed, a DC offset normalized by input level to the orthogonal modulator invariably remains in the orthogonal modulator. FIG. 25 shows a state where the DC offset is present. In this case, it is assumed that there are no IQ phase error and no IQ amplitude error. The example in FIG. 25 is different from the example in FIG. 24 in that a positive DC offset is generated on an I side, and that a negative DC offset is generated on a Q side. For this reason, even if there is no input to the orthogonal demodulator 11, a carrier leakage represented by a point indicated as 0' in FIG. 25 occurs. Due to this DC offset, a point $P_9$ shown in FIG. 25 and used for calibration is shifted to a point $P_9'$ in a direction where the amplitude of the first test signal is increased, and a point $P_{10}$ shown in FIG. 25 and used for calibration is shifted to a point $P_{10}'$ in a direction where the amplitude of the second signal is reduced. In this approach, the distance from the point of origin to the point $P_9'$ and the distance from the point of origin to the point $P_{10}'$ are determined by detecting envelopes of outputs of the orthogonal modulator 11, and a requirement where no IQ amplitude error is present is determined based on a condition where these distances are equal. According to the example shown in FIG. 25, however, it is clear that the distance from the point of origin to the point $P_9'$ is longer than the distance from the point of origin to the point $P_{10}'$ though no IQ amplitude error is present. That is, when the DC offset is present in the orthogonal modulator 11, an error corresponding to the magnitude of the DC offset occurs.

Figure 26:
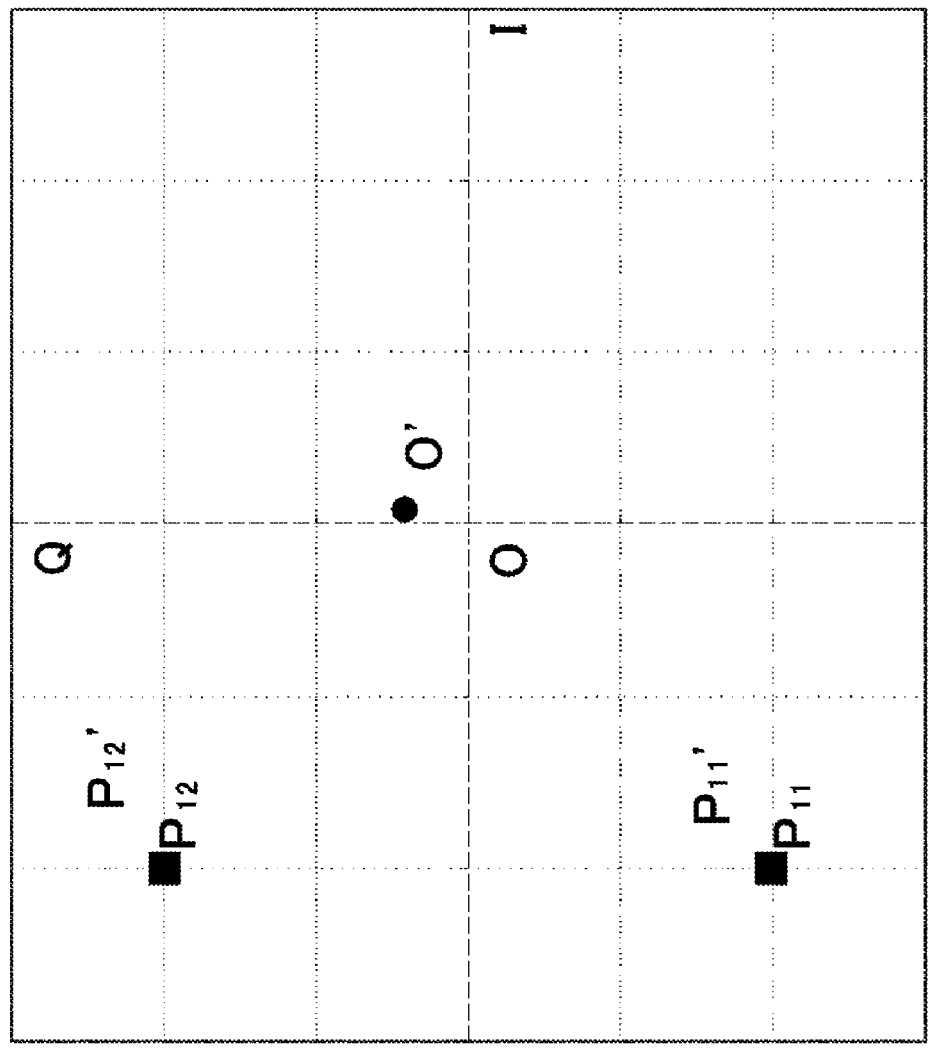
FIG. 26 is a diagram showing output examples of the orthogonal modulator in the third example of the present invention.
Figure 28:
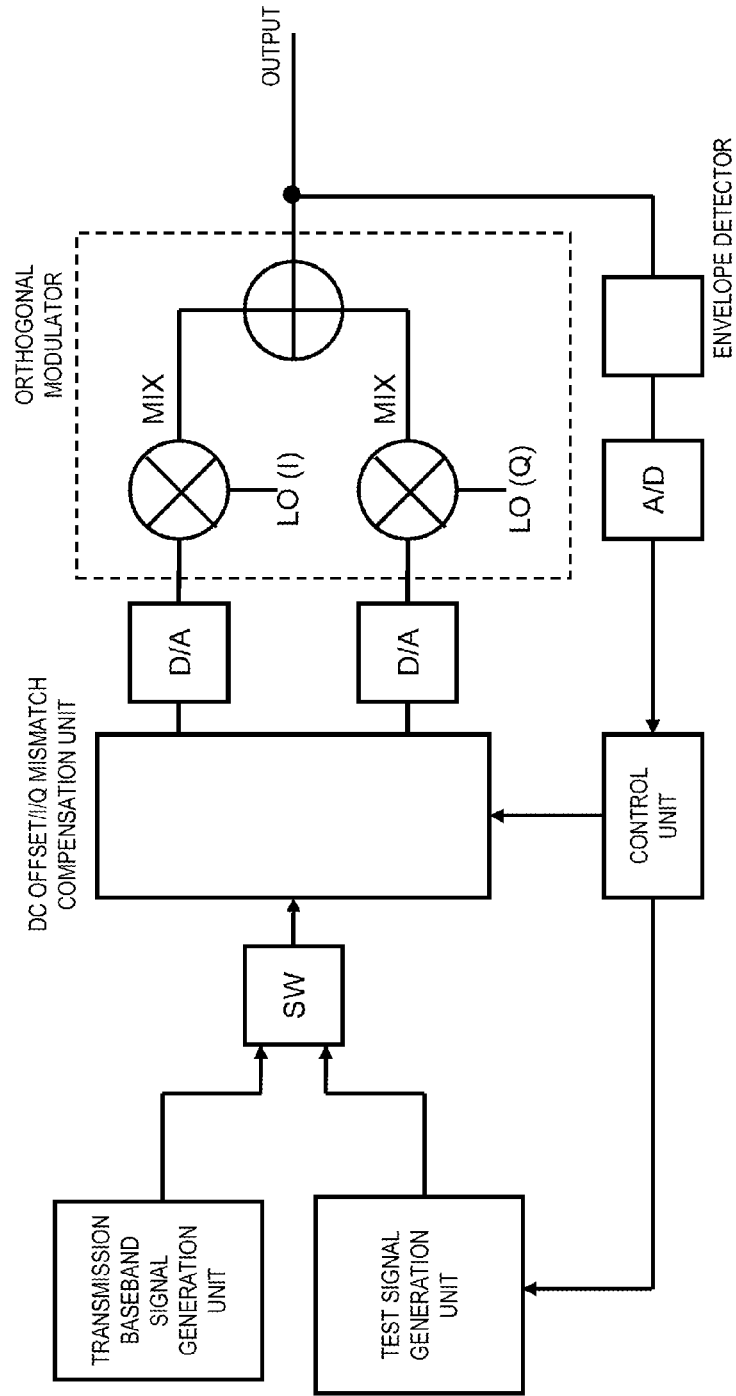
FIG. 28 is a diagram showing a configuration example of a signal compensation system of a related art.
Figure 29:
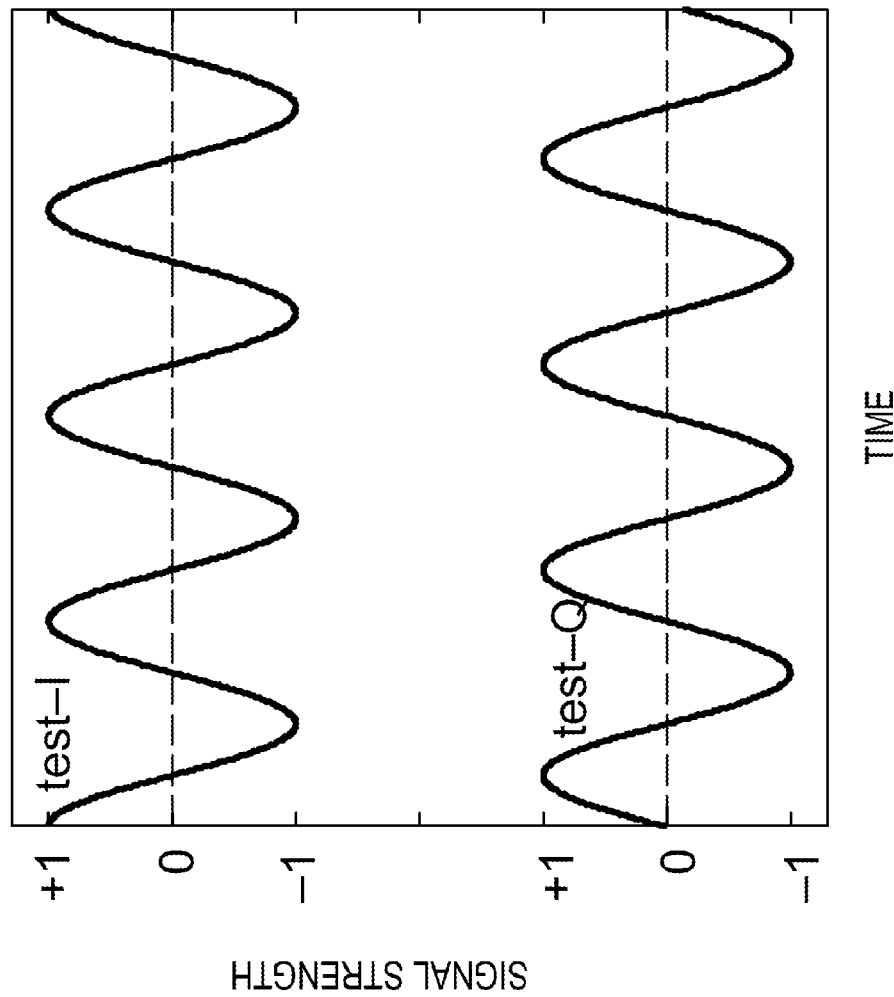
FIG. 29 is a graph showing examples of a test signal of the related art.
Figure 30:
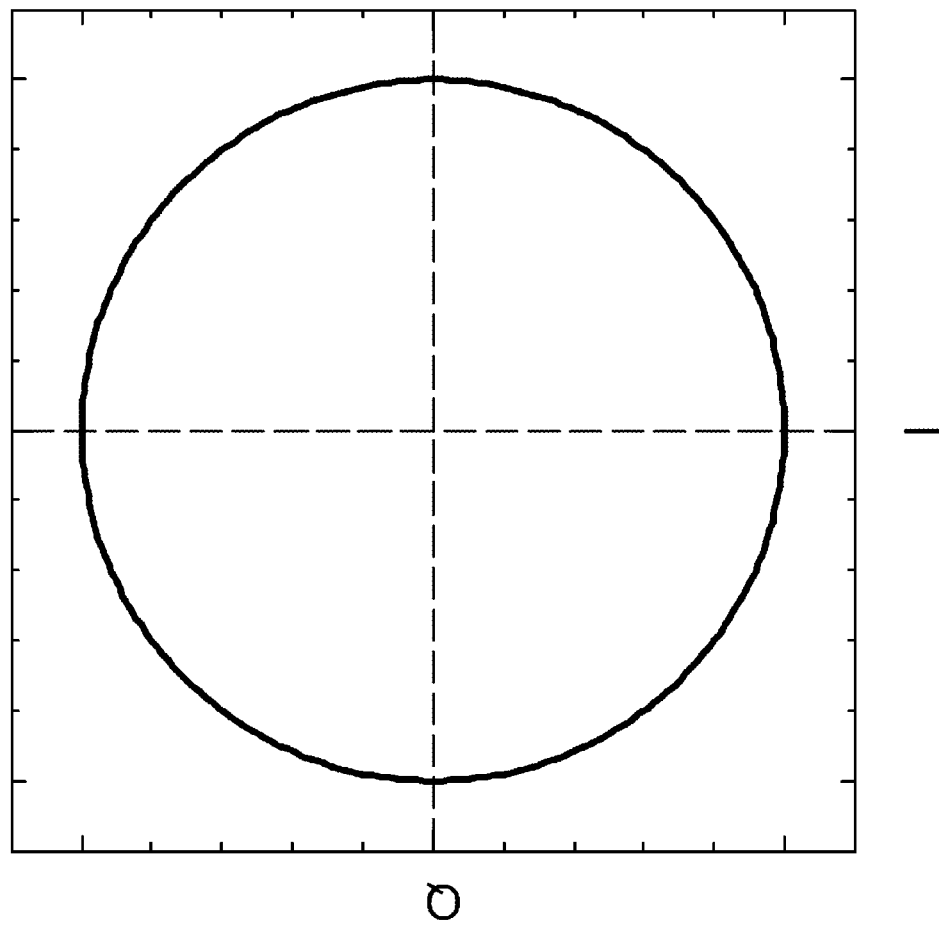
FIG. 30 is a diagram showing a constellation example of the signal compensation system of the related art.
Figure 31:
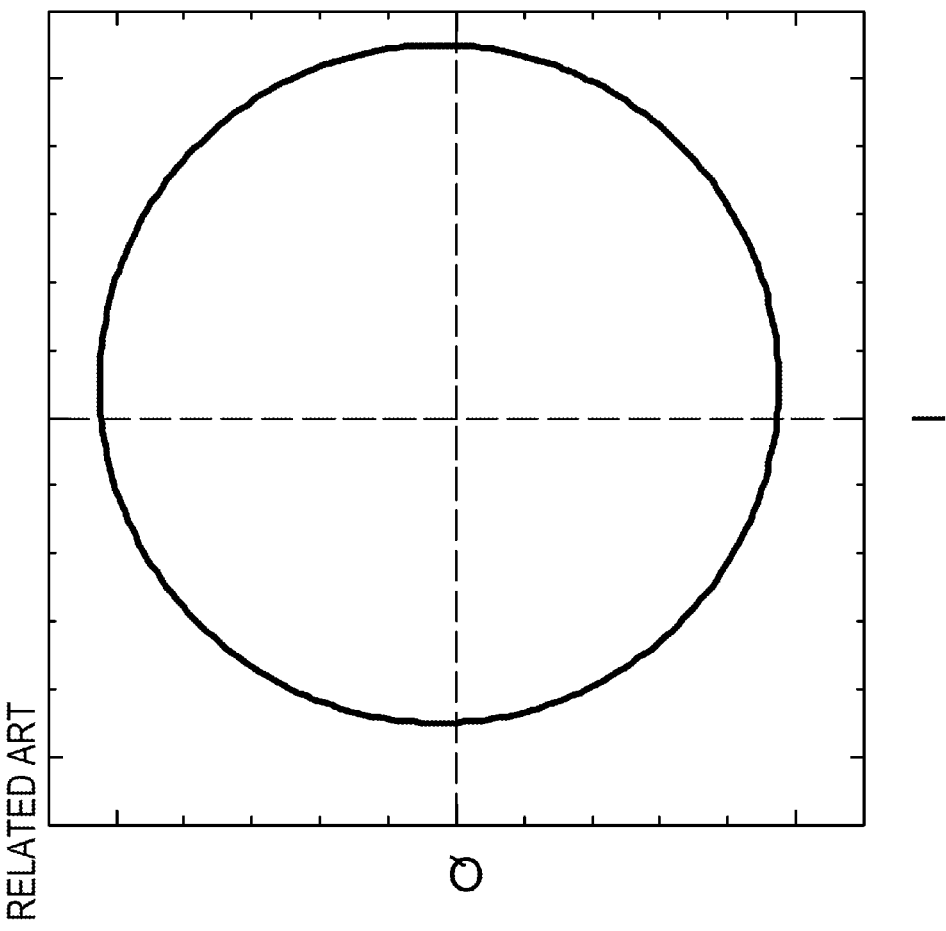
FIG. 31 is a constellation example when a DC offset is present in the signal compensation system of the related art.
Figure 32:
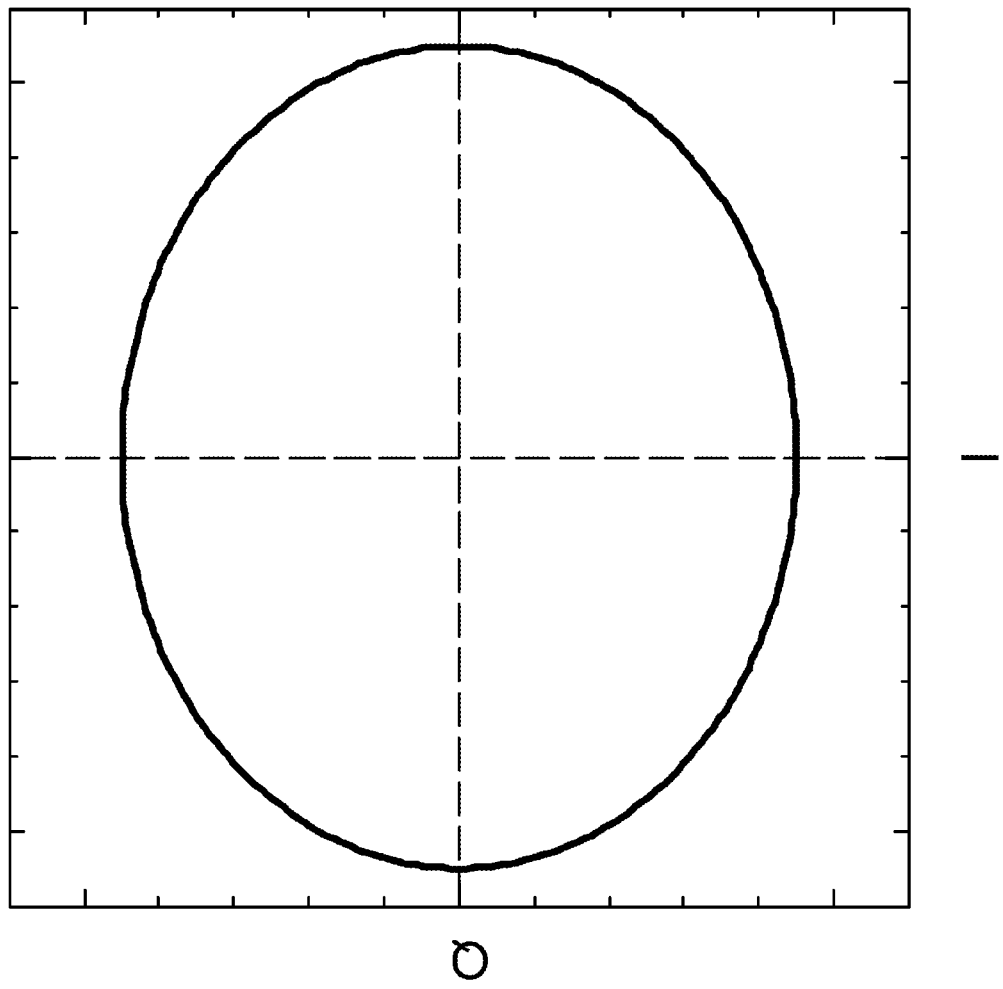
FIG. 32 is a diagram showing a constellation example when an IQ amplitude mismatch is present in the signal compensation system of the related art.
Figure 33:
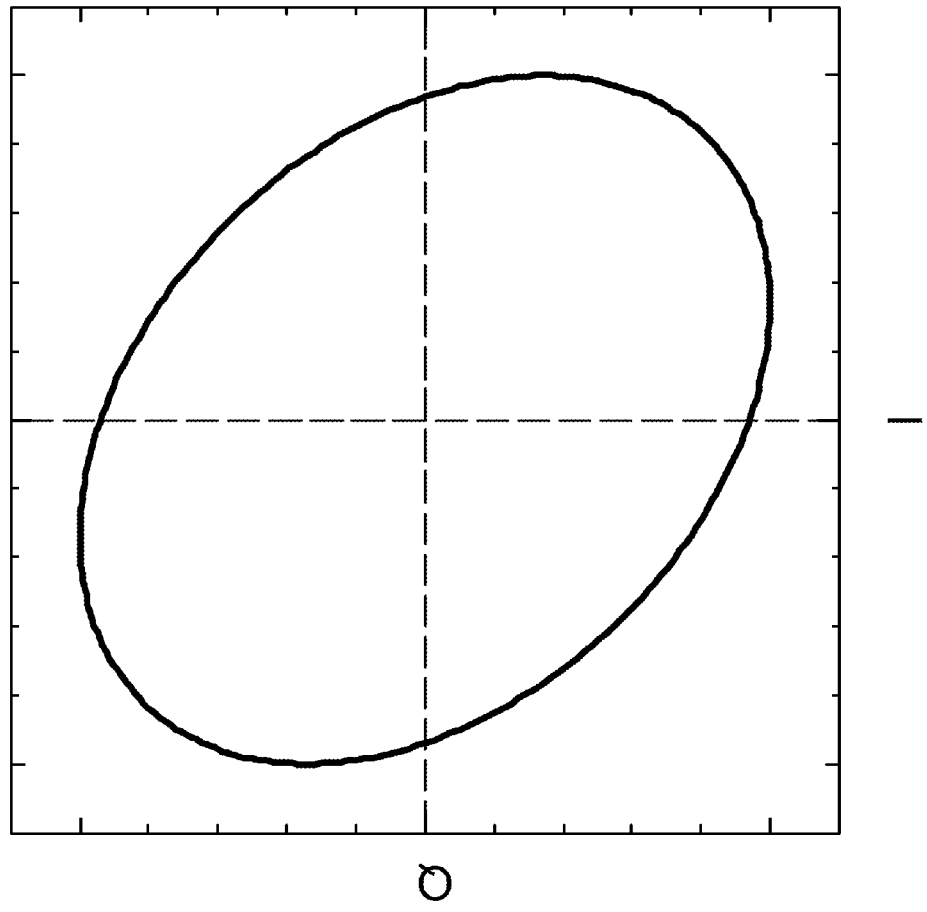
FIG. 33 is a diagram showing a constellation example when an IQ phase mismatch is present in the signal compensation system of the related art.

Then, consider a case where, when a DC offset of the same amount as in the example in FIG. 25 is present, an adjustment value is determined by changing the polarities of the test signals. FIG. 26 shows a state where the polarities of the test signal have been changed. In this case as well, it is assumed that there are no IQ phase error and no IQ amplitude error. This example is different from the example in FIG. 25 in that, due to the DC offset, a point $P_{11}$ shown in FIG. 25 and used for calibration is shifted to a direction in which the amplitude of the first signal is reduced, and a point $P_{12}$ shown in FIG. 25 and used for calibration is shifted to a direction in which the amplitude of the second test signal is increased. The points $p_{11}$ and $p_{12}$ are shifted to point $P_{11}'$ and $P_{12}'$. In this case, the distance from the point of origin to the point $P_{11}'$ and the distance from the point of origin to the point $P_{12}'$ are determined by detecting envelopes of outputs of the orthogonal modulator 11, and a requirement where no DC offset is present is determined based on a condition in which these distances are equal. According to the example shown in FIG. 26, the distance from the point of origin to the point $P_{11}'$ is longer than the distance from the point of origin to the point $P_{12}'$. That is, when there is the DC offset of the orthogonal modulator 11, an error in a direction opposite to that in the case of FIG. 25, corresponding to the magnitude of the DC offset, occurs. By changing the polarities of the test signals in this manner, the direction where the error appears can be changed. The adjustment value obtained by changing the polarities of the test signals as described above is set to a second adjustment value. The above adjustment will be described below by using expressions.

Assume that vectors of an output of the orthogonal modulator 11 at a time of receiving a test signal are indicated as described above. Then, compensation for an amplitude mismatch is to determine A (or θ, sin θ) that satisfies an expression of $(A^2 x_1) \cdot x_2 = 0$ when a matrix A is set to

|cos θ sin θ|

|sin θ cos θ|.

Four combinations of the test signals having different polarities are herein set as follows:

|  | First Signal | Second Signal |
| --- | --- | --- |
| (1) | $(V_{TST}, V_{TST})$ | $(V_{TST}, -V_{TST})$ |
| (2) | $(V_{TST}, V_{TST})$ | $(V_{TST}, V_{TST})$ |
| (3) | $(-V_{TST}, -V_{TST})$ | $(V_{TST}, -V_{TST})$ |
| (4) | $(-V_{TST}, -V_{TST})$ | $(-V_{TST}, V_{TST})$ |

Then, values that have been converged using these signals are respectively set to $A_1, A_2, A_3,$ and $A_4$. Using these expressions, $A = (A_1 + A_2 + A_3 + A_4)/4$ can be obtained.

That is, each adjustment value is determined by changing the signs/order of the test signals. Then, a value obtained by computing a mean of respective held adjustment values by the compensation value derivation unit 16 indicates an adjustment amount for an I/Q phase mismatch, where an error due to the DC offset is reduced.

Further, the following signals obtained by inverting the input order of these four sets of the test signals used for IQ phase mismatch compensation are employed:

|  | First Signal | Second Signal |
| --- | --- | --- |
| (5) | $(V_{TST}, V_{TST})$ | $(V_{TST}, V_{TST})$ |
| (6) | $(V_{TST}, V_{TST})$ | $(-V_{TST}, V_{TST})$ |

-continued

| | First Signal | Second Signal |
|---|---|---|
| (7) | $(-V_{TST}, V_{TST})$ | $(V_{TST}, V_{TST})$ |
| (8) | $(-V_{TST}, -V_{TST})$ | $(-V_{TST}, V_{TST})$ |

Then, a mean of adjustment values at a time of using a total of the eight sets of the test signals is employed. An adjustment value, by which an error due to the offset of the comparison unit 22 is also suppressed, can be derived, as in the DC offset compensation described above.

When the adjustment value is determined by changing the signs and/or order of the test signals as described above, the adjustment value based on the DC offset and the offset of the comparison unit 22 varies. For that reason, a mean of the adjustment values held in the adjustment value holding unit 15 is computed at the compensation value derivation unit 16. Then, by using the compensation value computed in this manner for a transmission baseband signal as well, a DC offset and amplitude/phase mismatches on the I and Q sides can be solved. Improvement in modulation accuracy can be thereby achieved.

The above operations are performed by the sequence in FIGS. 17 and 18, as in the first and second examples.

As in the first and second examples, whenever each adjustment value is derived, the adjustment value held so far may be updated, as shown in FIG. 19, without deriving the compensation value after all the adjustment values have been held in the adjustment value holding unit 15.

Fourth Example

Typically, the signal compensating operation of the signal processing apparatus and the signal processing method of the present invention is performed by the sequence in FIG. 8. That is, in respective signal compensating steps of a DC offset, an IQ amplitude mismatch, and an IQ phase mismatch, respective adjustment values that have varied, as shown in FIG. 27, are held in the adjustment value holding unit 15. Then, a compensation value is derived from all the held adjustment values by the compensation value derivation unit. However, the respective signal compensating steps of a DC offset, an IQ amplitude mismatch, and an IQ phase mismatch do not necessarily need to be performed by the sequence in FIG. 8. The order of the respective signal compensating operations may be appropriately counterchanged. To take an example, the steps of compensating for IQ phase and amplitude mismatches may be performed before the step of compensating for a DC offset in order to suppress the influence of a residual DC offset.

The respective signal compensating operations of a DC offset, an IQ amplitude mismatch, and an IQ phase mismatch shown in FIG. 8 may be performed by excluding one or two signal compensating operations. To take an example, when a communication system to which the apparatus is to be applied determines a generally specified value for a DC offset, the specified value can be achieved without performing particular DC offset compensation. The signal compensating operation of an IQ amplitude mismatch of the present invention does not be influenced by a residual DC offset. Thus, an IQ amplitude or an IQ phase mismatch can be compensated for without performing the signal compensating operation of a DC offset. Further, as another example, the apparatus may be configured so that an IQ amplitude mismatch is negligible even if no adjustment is made. In such a case, IQ phase mismatch compensation can be performed without performing IQ amplitude mismatch compensation. As still another example, when a communication system to which the apparatus is to be applied may be able to achieve a specified value for an IQ phase mismatch even if no adjustment is made, IQ phase mismatch compensation can be omitted.

The signal compensating operation of the signal processing apparatus and the signal processing method of the present invention is typically performed by changing the signs and order of the test signals from the test signal generation unit 10, as shown in FIG. 9. When a compensation value derived from a plurality of the eight sets of the test signals shown in each of the second and third examples is held in an assumed error range, adjustment values do not need to be obtained for all the eight sets of the test signals to derive the compensation value.

The waveform of a test signal in the signal processing apparatus of the present invention is simplified as a rectangular wave. Thus, the circuit for test signal generation can be simplified. The need for additionally increasing hardware is thereby eliminated. A simple comparator can capture and compare outputs of the detector. Thus, the signal processing apparatus can be implemented by using simple hardware without employing a highly accurate AD converter.

Exemplary Embodiments (Further Exemplary Embodiment 1)

A signal processing apparatus comprising:

a means that supplies a first test signal set and a second test signal set to an orthogonal modulator, as test signals which are for testing the orthogonal modulator, the first test signal set including first and second signals having a predetermined relationship therebetween, the second test signal set including first and second test signals having predetermined relationships respectively with the first and second test signals of the first test signal set; and a means that derives respective adjustment values from detection results of outputs produced by the orthogonal modulator responsive to inputs of the first and second test signals of the first signal set and detection results of outputs produced by the orthogonal modulator responsive to inputs of the first and second test signals of the second test signal set, and that derives a compensation value for compensating for at least one of a DC offset and an IQ mismatch of the orthogonal modulator, based on the adjustment values.

(Further Exemplary Embodiment 2)

The signal processing apparatus according to Further exemplary embodiment 1, comprising:

a test signal generation unit that generates a test signal comprising an in-phase component and a quadrature component and provides the test signal to the orthogonal modulator, the test signal generation unit generating the first test signal set including the first and second test signals having a predetermined phase relationship to each other, and supplying the first signal and the second signal to the orthogonal modulator in this stated order, the test signal generation unit generating the second signal set including the first and second test signals, and supplying the first test signal and the second test signal to the orthogonal modulator in this stated order, in-phase and quadrature components of the first and second test signals of the second set respectively having predetermined relationships with in-phase and quadrature components of the first and second test signals of first second set;

a detector that receives an output of the orthogonal modulator and detects an envelope of the output of the orthogonal modulator;

a comparison means that compares detection results by the detector detecting orthogonal modulation outputs of the first and second test signals by the orthogonal modulator; and a means that obtains an adjustment value, based on a result of comparison of the detection results of the orthogonal modulation outputs of the first and second test signals of the first signal set, obtains another adjustment value, based on a result of comparison of the detection results of the orthogonal modulation outputs of the first and second test signals of the second signal set, and derives the compensation value for compensating for at least one of the DC offset, an IQ amplitude mismatch, and an IQ phase mismatch of the orthogonal modulator from the adjustment values respectively obtained for the first and second test signal sets.

(Further Exemplary Embodiment 3)

The signal processing apparatus according to Further exemplary embodiment 2, wherein the first test signal and the second test signal are orthogonal to each other or have phases reversed to each other, and at least one of the first and second test signals has an in-phase component and a quadrature component, at least one component thereof having a different value and/or a different polarity, between the first test signal set and the second test signal set.

(Further Exemplary Embodiment 4)

The signal processing apparatus according to Further exemplary embodiment 2 or 3, wherein at least one of a DC offset, an amplitude, and a phase of an input to the orthogonal modulator is adjusted so that the detection results of the outputs of the orthogonal modulator for the first and second test signals after comparison are made equal to obtain the respective adjustment value.

(Further Exemplary Embodiment 5)

The signal processing apparatus according to any one of Further exemplary embodiments 2 to 4, wherein the compensation value is obtained by averaging the adjustment values respectively obtained for the first and second test signal sets.

(Further Exemplary Embodiment 6)

The signal processing apparatus according to ant one of Further exemplary embodiments 2 to 5, wherein the comparison means comprises:

a sample-and-hold circuit that holds the detection result of the output of the orthogonal modulator for the first test signal; and a comparator that compares a value held in the sample-and-hold circuit and the detection result of the output of the orthogonal modulator for the second signal.

(Further Exemplary Embodiment 7)

The signal processing apparatus according to ant one of Further exemplary embodiments 2 to 5, wherein the comparison means comprises:

a storage unit that stores a result of AD conversion of a detection signal of the output of the orthogonal modulator for the first test signal; and a decision unit that compares a value held in the storage unit and a result of AD conversion of a detection signal of the output of the orthogonal modulator for the second test signal.

(Further Exemplary Embodiment 8)

A signal processing apparatus, comprising:

a test signal generation unit that generates a test signal;

a detector that detects an envelope of an output obtained by orthogonally modulating the test signal by the orthogonal modulator;

a comparison-decision unit that carries out comparison and decision about detection signals detected by the detector and makes decision about the detection signals;

a control unit that derives an adjustment value from a result of the comparison and decision by the comparison-decision unit;

an adjustment value holding unit that holds the adjustment value derived by the control unit; and a compensation value derivation unit that derives a compensation value from the adjustment value held in the adjustment value holding unit, the test signal generation unit generating a first test signal $(I_1, Q_1)$ and a second test signal $(I_2, Q_2)$ that has the predetermined relationship with the first test signal and supplies the first and second test signal to the orthogonal modulator, the detector detecting envelopes of the first and second test signals modulated by the orthogonal modulator, the comparison-decision unit comparing a first detection signal corresponding to the first test signal and a second detection signal corresponding to the second test signal and making decision about the first and second detection signals, the first and second detection signals being obtained by detection of the detector, the control unit deriving a first adjustment value from a result of the comparison and decision by the comparison-decision unit, the adjustment value holding unit holding the first adjustment value, the test signal generation unit generating the second set of the test signals and supplying the second set of the test signals to the orthogonal modulator; the second set of the test signals comprising in-phase components (I) having a predetermined relationship with in-phase components (I) of the first set of the test signals and quadrature components (Q) having a predetermined relationship with quadrature components (Q) of the first set of the test signals, the detector detecting an envelope of an output of the orthogonal modulator corresponding to the first test signal of the second set and an envelope of an output of the orthogonal modulator corresponding to the second test signal of the second set, the comparison-decision unit comparing the first detection signal corresponding to the first test signal of the second set and the second detection signal corresponding to the second test signal of the second set, the first and second detection signal being detected by the detector, the control unit deriving a second adjustment value from a result of the comparison and decision by the comparison-decision unit, the adjustment value holding unit holding the second adjustment value, the adjustment value derivation unit deriving the compensation value from the first adjustment value and the second adjustment value held in the adjustment value holding unit, the signal processing apparatus further comprising an estimation unit that estimates the DC offset and the IQ mismatch of the orthogonal modulator based on the compensation value.

(Further Exemplary Embodiment 9)

The signal processing apparatus according to Further exemplary embodiment 8, further comprising:

a transmission baseband signal generation unit that generates signal components of each I channel and Q channel from a transmission signal; and a first compensation unit that receives and compensates for a transmission baseband signal generated by the transmission baseband signal generation unit, and supplies the compensated signal to the orthogonal modulator;

the first test signal and the second test signal being directly supplied to the orthogonal modulator;

the first compensation unit receiving the compensation value derived by the compensation value derivation unit and compensating for the transmission baseband signal.

(Further Exemplary Embodiment 10)

The signal processing apparatus according to Further exemplary embodiment 8, further comprising:

a transmission baseband signal generation unit that generates signal components of each I channel and Q channel from a transmission signal; and a first compensation unit that receives and compensates for a transmission baseband signal generated by the transmission baseband signal generation unit and supplies the compensated signal to the orthogonal modulator, the first test signal and the second test signal being indirectly supplied to the orthogonal modulator, the first compensation unit receiving the compensation value derived by the compensation value derivation unit and compensating for the transmission baseband signal.

(Further Exemplary Embodiment 11)

The signal processing apparatus according to Further exemplary embodiment 10, comprising:

third and fourth digital-to-analog converters each of which converts an output of the first compensation unit to an analog signal;

fifth and sixth digital-to-analog converters each of which converts the test signal to an analog signal;

a second switch means that receives respective outputs of the third digital-to-analog converter and the fifth digital-to-analog converter and supplies one of the outputs of the third and fifth digital-to-analog converters to an in-phase component input of the orthogonal modulator; and a third switch means that receives respective outputs of the fourth digital-to-analog converter and the sixth digital-to-analog converter and supplies one of the outputs of the fourth and sixth digital-to-analog converters to a quadrature component input of the orthogonal modulator.

(Further Exemplary Embodiment 12)

The signal processing apparatus according to Further exemplary embodiment 8, further comprising:

a transmission baseband signal generation unit that generates signal components of each I channel and Q channel from a transmission signal; and a first compensation unit that receives and compensates for a transmission baseband signal generated by the transmission baseband signal generation unit and supplies the compensated signal to the orthogonal modulator, the first test signal and the second test signal being indirectly supplied to the orthogonal modulator through the first compensation unit;

the first compensation unit receiving the compensation value derived by the compensation value derivation unit and compensating for the transmission baseband signal.

(Further Exemplary Embodiment 13)

The signal processing apparatus according to Further exemplary embodiment 12, comprising:

a first switch means that receives the transmission baseband signal and the test signal and outputs one of the transmission baseband signal and test signal to the first compensation unit;

a first digital-to-analog converter that converts an in-phase component (I) from the first compensation unit to an analog signal and outputs the analog signal to the orthogonal modulator; and a second digital-to-analog converter that converts a quadrature component (Q) from the first compensation unit to an analog signal and outputs the analog signal to the orthogonal modulator.

(Further Exemplary Embodiment 14)

The signal processing apparatus according to Further exemplary embodiment 8, further comprising:

a transmission baseband signal generation unit that generates signal components of each I channel and Q channel from a transmission signal;

a first compensation unit that receives and compensates for a transmission baseband signal generated by the transmission baseband signal generation unit and supplies the compensated signal to the orthogonal modulator; and a second compensation unit that receives and compensates for the first test signal and the second test signal, and supplies the compensated first and second signals to the orthogonal modulator, the first compensation unit receiving the compensation value derived by the compensation value derivation unit and compensating for the transmission baseband signal.

(Further Exemplary Embodiment 15)

The signal processing apparatus according to Further exemplary embodiment 14, comprising:

third and fourth digital-to-analog converters each of which converts an output of the first compensation unit to an analog signal;

fifth and sixth digital-to-analog converters each of which converts the test signal passed through the second compensation unit to an analog signal;

a second switch means that receives respective outputs of the third digital-to-analog converter and the fifth digital-to-analog converter and supplies one of the outputs of the third and fifth digital-to-analog converters to an in-phase component input of the orthogonal modulator; and a third switch means that receives respective outputs of the fourth digital-to-analog converter and the sixth digital-to-analog converter and supplies one of the outputs of the fourth and sixth digital-to-analog converters to a quadrature component input of the orthogonal modulator.

(Further Exemplary Embodiment 16)

The signal processing apparatus according to any one of Further exemplary embodiments 8 to 15, wherein the second test signal ($I_2$, $Q_2$) is orthogonal to the first test signal ($I_1$, $Q_1$), or has a phase reversed to a phase of the first test signal ($I_1$, $Q_1$).

(Further Exemplary Embodiment 17)

The signal processing apparatus according to any one of Further exemplary embodiments 8 to 16, wherein the control unit adjusts at least one of DC offsets, amplitudes, and phases of one or more inputs to the orthogonal modulator so that the first and second detection signals corresponding to the first set of test signals obtained by detection of the detector are equal, thereby deriving the first adjustment value, and adjusts at least one of DC offsets, amplitudes, and phases of one or more inputs to the orthogonal modulator so that the first and second detection signals corresponding to the second set of test signals obtained by detection of the detector are equal, thereby deriving the second adjustment value.

(Further Exemplary Embodiment 18)

The signal processing apparatus according to any one of Further exemplary embodiments 8 to 17, wherein the second set of test signals is obtained by changing at least one of values and polarities of the in-phase components (I) and the quadrature components (Q) of the first set of test signals.

(Further Exemplary Embodiment 19)

The signal processing apparatus according to any one of Further exemplary embodiments 8 to 18, wherein the comparison-decision unit includes:

a sample-and-hold circuit that holds the first detection signal obtained by detection of the detector; and a comparator that compares the second detection signal detected by the detector and the first detection signal held in the sample-and-hold circuit.

(Further Exemplary Embodiment 20)

The signal processing apparatus according to Further exemplary embodiment 19, wherein the comparator compares a voltage value of the first detection signal and a voltage value of the second detection signal in time series manner, and decides which one of levels of the voltage values of the first and second detection signals is higher.

(Further Exemplary Embodiment 21)

The signal processing apparatus according to any one of Further exemplary embodiments 8 to 18, wherein the comparison-decision unit includes:

an analog-to-digital conversion unit that converts the first detection signal obtained by detection of the detector to a digital signal;

a storage unit that stores the first detection signal converted to the digital signal by the analog-to-digital conversion unit; and a decision unit that compares the second detection signal converted to a digital signal by the analog-to-digital conversion unit with the first detection signal stored in the storage unit.

(Further Exemplary Embodiment 22)

The signal processing apparatus according to Further exemplary embodiment 1, comprising:

a first circuit that sequentially supplies the first test signal $(I_1, Q_1)$ and the second test signal $(I_2, Q_2)$ having a predetermined relationship with the first test signal to the orthogonal modulator;

a second circuit that detects an output of the orthogonal modulator and then makes comparison about a first set of a first detection signal corresponding to the first test signal and a second detection signal corresponding to the second test signal, the first circuit supplying to the orthogonal modulator the second set of the test signals obtained by changing at least one of values and polarities of in-phase components and quadrature components of the first set of the test signals comprising the first test signal and the second signals, the second circuit detecting an output of the orthogonal modulator and makes comparison about a second set of a first detection signal and a second detection signal corresponding to the second set of the test signals;

a third circuit that derives a first compensation value for the orthogonal modulator from the first detection signal and the second detection signal of the first set, derives a second compensation value for the orthogonal modulator from the first detection signal and the second detection signal of the second set, and derives a third compensation value from the first and second compensation values; and a fourth circuit that compensates for at least one of the DC offset, an amplitude mismatch, and a phase mismatch of the orthogonal modulator, using the third compensation value.

(Further Exemplary Embodiment 23)

The signal processing apparatus according to Further exemplary embodiment 22, wherein the second test signal $(I_2, Q_2)$ is orthogonal to the first test signal $(I_1, Q_1)$, or has a phase reversed to a phase of the first test signal $(I_1, Q_1)$.

(Further Exemplary Embodiment 24)

The signal processing apparatus according to Further exemplary embodiment 22 or 23, wherein the second test of the test signals is obtained by changing at least one of the values and the polarities of the in-phase components (I) and the quadrature components (Q) of the first set of the test signals.

(Further Exemplary Embodiment 25)

The signal processing apparatus according to any one of Further exemplary embodiments 8 to 24, wherein the in-phase components (I) of the first and second test signals have an equal absolute value and opposite signs, the quadrature components (Q) of the first and second test signals are equal, and a DC offset of the in-phase component (I) is compensated for by the test signals.

(Further Exemplary Embodiment 26)

The signal processing apparatus according to Further exemplary embodiment 25, wherein with a DC voltage value being indicated by $V_{TST}$, the in-phase components (I) and the quadrature components (Q) of the first and second test signals of the first and second sets are respectively set to:

the first set: $(V_{TST}, 0)$, $(-V_{TST}, 0)$ the second set: $(-V_{TST}, 0)$, $(V_{TST}, 0)$, and the DC offset of the in-phase component (I) is compensated for by the first and second sets.

(Further Exemplary Embodiment 27)

The signal processing apparatus according to any one of Further exemplary embodiments 8 to 24, wherein the quadrature components (I) of the first test signal and the second test signal have an equal absolute value and opposite signs, the in-phase components (Q) of the first test signal and the second test signal are equal, and a DC offset of the in-phase component (I) is compensated for by the test signals.

(Further Exemplary Embodiment 28)

The signal processing apparatus according to Further exemplary embodiment 27, wherein with a DC voltage value being indicated by $V_{TST}$, the in-phase components (I) and the quadrature components (Q) of the first and second test signals are respectively set to:

the first set: $(0, V_{TST})$, $(0, -V_{TST})$ the second set: $(0, -V_{TST})$, $(0, V_{TST})$, and a DC offset of the quadrature component (Q) is compensated for by the first and second sets.

(Further Exemplary Embodiment 29)

The signal processing apparatus according to any one of Further exemplary embodiments 8 to 24, wherein the in-phase component (I) of the first test signal has a same absolute value as the quadrature component (Q) of the second test signal, the quadrature component (Q) of the first test signal has a same absolute value as the in-phase component (I) of the second test signal, and the amplitude mismatch and the DC offset are compensated for by the test signals.

(Further Exemplary Embodiment 30)

The signal processing apparatus according to Further exemplary embodiment 29, wherein the first and second test signals of the first and second sets are generated, and the first and second test signals of third to eight sets are generated, and with a DC voltage value being indicated by $V_{TST}$, the in-phase components (I) and the quadrature components (Q) of the first and second test signals of the first and second sets, and in-phase components (I) and quadrature components (Q) of the first and second signals of the third to eight sets are respectively set to:

the first set: $(V_{TST}, 0)$, $(0, V_{TST})$ the second set: $(V_{TST}, 0)$, $(0, -V_{TST})$, the third set: $(-V_{TST}, 0)$, $(0, V_{TST})$ the fourth set: $(-V_{TST}, 0)$, $(0, -V_{TST})$ the fifth set: $(0, V_{TST})$, $(V_{TST}, 0)$ the sixth set: $(0, -V_{TST})$, $(V_{TST}, 0)$ the seventh set: $(0, V_{TST})$, $(-V_{TST}, 0)$ the eighth set: $(0, -V_{TST})$, $(-V_{TST}, 0)$, and the amplitude mismatch and/or the DC offset are compensated for by a plurality of the sets selected from among the first to eighth sets.

(Further Exemplary Embodiment 31)

The signal processing apparatus according to any one of Further exemplary embodiments 8 to 24, wherein the in-phase component (I) of the first test signal has a same absolute value as the quadrature component (Q) of the first test signal, the quadrature component (Q) of the second test signal has a same absolute value as the in-phase component (I) of the second test signal, and the amplitude mismatch and the DC offset are compensated for by the test signals.

(Further Exemplary Embodiment 32)

The signal processing apparatus according to Further exemplary embodiment 31, wherein the first and second test signals of the first and the second sets, and the first and second test signals of third to eight sets are generated, and with a DC voltage value being indicated by $V_{TST}$, the in-phase components (I) and the quadrature components (Q) of the first and second test signals of the first and second sets, and in-phase components (I) and quadrature components (Q) of the first and second signals of the third to eight sets are respectively set to:

the first set: $(V_{TST}, V_{TST})$, $(V_{TST}, -V_{TST})$
the second set: $(V_{TST}, V_{TST})$, $(-V_{TST}, V_{TST})$,
the third set: $(-V_{TST}, -V_{TST})$, $(V_{TST}, -V_{TST})$
the fourth set: $(-V_{TST}, -V_{TST})$, $(-V_{TST}, V_{TST})$
the fifth set: $(V_{TST}, V_{TST})$, $(V_{TST}, -V_{TST})$
the sixth set: $(V_{TST}, V_{TST})$, $(-V_{TST}, V_{TST})$
the seventh set: $(-V_{TST}, -V_{TST})$, $(V_{TST}, -V_{TST})$
the eighth set: $(-V_{TST}, -V_{TST})$, $(-V_{TST}, V_{TST})$, and the phase mismatch and/or the DC offset are compensated for by a plurality of the sets selected from among the first to eighth sets.

(Further Exemplary Embodiment 33)

A transmission apparatus comprising the signal processing apparatus as set forth in any one of Further exemplary embodiments 1 to 32.

(Further Exemplary Embodiment 34)

A signal processing method comprising:

supplying to an orthogonal modulator a first test signal set and a second test signal set to an orthogonal modulator as test signals for testing the orthogonal modulator, the first test signal set including first and second test signals having a predetermined relationship, the second test signal set including first and second test signals respectively being in predetermined relationships with the first and second test signals of the first test signal set; and obtaining respective adjustment values from detection results of outputs of the orthogonal modulator for inputs of the first and second test signals of the first signal set and detection results of outputs of the orthogonal modulator for inputs of the first and second test signals of the second test signal set, and deriving a compensation value for compensating for at least one of a DC offset and an IQ mismatch of the orthogonal modulator, based on the adjustment values.

(Further Exemplary Embodiment 35)

The signal processing method according to Further exemplary embodiment 34, wherein the first test signal and the second test signal are orthogonal to each other or have phases reversed to each other, and at least one of the first and second test signals of the second set has an in-phase and/or a quadrature component having a different value and/or polarity with respect to the first set.

(Further Exemplary Embodiment 36)

The signal processing method according to Further exemplary embodiment 34 or 35, wherein at least one of offsets, amplitudes, and phases of one or more inputs to the orthogonal modulator is adjusted so that the detection results of the outputs of the orthogonal modulator for the first and second test signals after comparison are equal, thereby obtaining the respective adjustment value.

(Further Exemplary Embodiment 37)

The signal processing method according to any one of Further exemplary embodiments 34 to 36, wherein the adjustment values respectively obtained for the first and second test signal sets are averaged to determine the compensation value.

(Further Exemplary Embodiment 38)

The signal processing method according to Further exemplary embodiment 34, comprising the steps of:

generating the first test signal $(I_1, Q_1)$ and the second test signal $(I_2, Q_2)$ that has the predetermined relationship with the first test signal and sequentially supplying the first and second test signal to the orthogonal modulator;

detecting envelopes of the first and second test signals modulated by the orthogonal modulator;

comparing a first detection signal corresponding to the first test signal with a second detection signal corresponding to the second test signal and making decision about the first and second detection signals, the first and second detection signals being obtained by detection of the detection step;

deriving a first adjustment value from a result of the comparison and decision by the comparison and decision step;

generating the second set of the test signals and supplying the second set of the test signals to the orthogonal modulator; the second set of the test signals comprising in-phase components (I) having a predetermined relationship with in-phase components (I) of the first set of the test signals and quadrature components (Q) having a predetermined relationship with quadrature components (Q) of the first set of the test signals;

detecting an envelope of an output of the orthogonal modulator corresponding to the first test signal of the second set and an envelope of an output of the orthogonal modulator corresponding to the second test signal of the second set;

comparing the first detection signal corresponding to the first test signal of the second set with the second detection signal corresponding to the second test signal of the second set, the first and second detection signal being obtained by detection of the detection step;

deriving a second adjustment value from a result of the comparison and decision by the comparison and decision step;

deriving the compensation value from the first adjustment value and the second adjustment value; and estimating the DC offset and the IQ mismatch of the orthogonal modulator based on the compensation value.

(Further Exemplary Embodiment 39)

The signal processing method according to Further exemplary embodiment 38, wherein the second test signal $(I_2, Q_2)$ is orthogonal to the first test signal $(I_1, Q_1)$ or has a phase reversed to a phase of the first test signal $(I_1, Q_1)$.

(Further Exemplary Embodiment 40)

The signal processing method according to Further exemplary embodiment 38 or 39, wherein the second set of the test signals is obtained by changing at least one of values and polarities of the in-phase components (I) and the quadrature components (Q) of the first set of the test signals.

(Further Exemplary Embodiment 41)

The signal processing method according to any one of Further exemplary embodiments 38 to 40, wherein with a DC voltage value being indicated by $V_{TST}$, the in-phase components (I) and the quadrature components (Q) of the first and second test signals are respectively set to:

the first set: $(V_{TST}, 0), (-V_{TST}, 0)$ the second set: $(-V_{TST}, 0), (V_{TST}, 0)$, and a DC offset of the in-phase component (I) is compensated for by the first and second sets.

(Further Exemplary Embodiment 42)

The signal processing method according to any one of Further exemplary embodiments 38 to 40, wherein with a DC voltage value being indicated by $V_{TST}$, the in-phase components (I) and the quadrature components (Q) of the first and second test signals are respectively set to:

the first set: $(0, V_{TST}), (0, -V_{TST})$ the second set: $(0, -V_{TST}), (0, V_{TST})$, and a DC offset of the quadrature component (Q) is compensated for by the first and second sets.

(Further Exemplary Embodiment 43)

The signal processing method according to any one of Further exemplary embodiments 38 to 40, wherein the first and second test signals of the first and the second sets are generated, and the first and second test signals of third to eight sets are generated, and with a DC voltage value being indicated by $V_{TST}$, the in-phase components (I) and the quadrature components (Q) of the first and second test signals of the first and second sets, and in-phase components (I) and quadrature components (Q) of the first and second signals of the third to eight sets are respectively set to:

the first set: $(V_{TST}, 0), (0, V_{TST})$ the second set: $(V_{TST}, 0), (0, -V_{TST})$, the third set: $(-V_{TST}, 0), (0, V_{TST})$ the fourth set: $(-V_{TST}, 0), (0, -V_{TST})$ the fifth set: $(0, V_{TST}), (V_{TST}, 0)$ the sixth set: $(0, -V_{TST}), (V_{TST}, 0)$ the seventh set: $(0, V_{TST}), (-V_{TST}, 0)$ the eighth set: $(0, -V_{TST}), (-V_{TST}, 0)$, and an amplitude mismatch and/or the DC offset are compensated for by a plurality of the sets selected from among the first to eighth sets.

(Further Exemplary Embodiment 44)

The signal processing method according to any one of Further exemplary embodiments 38 to 40, wherein the first and second test signals of the first and the second sets are generated, and the first and second test signals of third to eight sets are generated, and with a DC voltage value being indicated by $V_{TST}$, the in-phase components (I) and the quadrature components (Q) of the first and second test signals of the first and second sets and in-phase components (I) and quadrature components (Q) of the first and second test signals of the third to eight sets are respectively set to:

the first set: $(V_{TST}, V_{TST}), (V_{TST}, -V_{TST})$ the second set: $(V_{TST}, V_{TST}), (-V_{TST}, V_{TST})$, the third set: $(-V_{TST}, -V_{TST}), (V_{TST}, -V_{TST})$ the fourth set: $(-V_{TST}, -V_{TST}), (-V_{TST}, V_{TST})$ the fifth set: $(V_{TST}, V_{TST}), (V_{TST}, -V_{TST})$ the sixth set: $(V_{TST}, V_{TST}), (-V_{TST}, V_{TST})$ seventh set: $(-V_{TST}, -V_{TST}), (V_{TST}, -V_{TST})$ eighth set: $(-V_{TST}, -V_{TST}), (-V_{TST}, V_{TST})$, and a phase mismatch and/or the DC offset are compensated for by a plurality of the sets selected from among the first to eighth sets.

(Further Exemplary Embodiment 45)

A signal processing method comprising at least a plurality of steps sequentially carried out and selected from the steps of:

compensating for the DC offset by the signal processing method as set forth in further exemplary embodiment 41;

compensating for the DC offset by the signal processing method as set forth in further exemplary embodiment 42;

compensating for the amplitude mismatch and the DC offset by the signal processing method as set forth in further exemplary embodiment 43; and compensating for the phase mismatch and the DC offset by the signal processing method as set forth in further exemplary embodiment 44.

(Further Exemplary Embodiment 46)

A signal processing method including the steps of:

compensating for the DC offset by the signal processing method as set forth in further exemplary embodiment 41;

compensating for the DC offset by the signal processing method as set forth in further exemplary embodiment 42;

compensating for the amplitude mismatch and the DC offset by the signal processing method as set forth in further exemplary embodiment 43; and compensating for the phase mismatch and the DC offset by the signal processing method as set forth in further exemplary embodiment 44.

(Further Exemplary Embodiment 47)

A signal processing method of sequentially carrying out the steps of:

compensating for the DC offset by the signal processing method as set forth in further exemplary embodiment 41;

compensating for the DC offset by the signal processing method as set forth in further exemplary embodiment 42;

compensating for the amplitude mismatch and the DC offset by the signal processing method as set forth in further exemplary embodiment 43; and compensating for the phase mismatch and the DC offset by the signal processing method as set forth in further exemplary embodiment 44.

Disclosures of Patent Documents listed above are incorporated herein by reference. Modifications and adjustments of the exemplary embodiments and the examples are possible within the scope of the overall disclosure (including claims) of the present invention, and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

The invention claimed is:

1. A signal processing apparatus comprising:

a test signal generation unit that generates a first test signal set including first and second test signals, each of the first and second test signals comprising an in-phase component and a quadrature component, the first and second test signals having a predetermined phase relationship therebetween, the test signal generation unit supplying the first test signal and the second test signal of the first test signal set to an orthogonal modulator in this stated order, the test signal generation unit generating a second test signal set including first and second test signals, each of the first and second test signals comprising an in-phase component and a quadrature component, and supplying the first test signal and the second test signal of the second test signal set to the orthogonal modulator in this stated order, the in-phase and quadrature components of the first and second test signals of the second test signal set respectively having predetermined relationships with the in-phase and quadrature components of the first and second test signals of the first test signal set;

a detector that receives an output of the orthogonal modulator and detects an envelope of the output of the orthogonal modulator;

a comparison unit that compares detection results by the detector detecting orthogonal modulation outputs of the first and second test signals by the orthogonal modulator;

a control unit that derives first and second adjustment values respectively from detection results of outputs produced by the orthogonal modulator responsive to inputs of the first and second test signals of the first signal set and from detection results of outputs produced by the orthogonal modulator responsive to inputs of the first and second test signals of the second test signal set, the control unit obtaining the first adjustment value, based on a result of comparison of the detection results of the orthogonal modulation outputs of the first and second test signals of the first test signal set, the control unit obtaining the second adjustment value, based on a result of comparison of the detection results of the orthogonal modulation outputs of the first and second test signals of the second test signal set; and a compensation value derivation unit that derives the compensation value for compensating for at least one of the DC offset, an IQ amplitude mismatch, and an IQ phase mismatch of the orthogonal modulator from the first and second adjustment values respectively obtained by the control unit for the first and second test signal sets.

2. The signal processing apparatus according to claim 1, wherein the first test signal and the second test signal are orthogonal to each other or have phases reversed to each other, and at least one of the first and second test signals has an in-phase component and a quadrature component, at least one component thereof having a different value and/or a different polarity, between the first test signal set and the second test signal set.

3. The signal processing apparatus according to claim 1, wherein at least one of a DC offset, an amplitude, and a phase of an input to the orthogonal modulator is adjusted so that the detection results of the outputs of the orthogonal modulator for the first and second test signals after comparison are made equal to obtain the respective adjustment value.

4. The signal processing apparatus according to claim 1, wherein the compensation value is obtained by averaging the adjustment values respectively obtained for the first and second test signal sets.

5. The signal processing apparatus according to claim 1, wherein the comparison unit comprises:

a sample-and-hold circuit that holds the detection result of the output of the orthogonal modulator for the first test signal; and a comparator that compares a value held in the sample-and-hold circuit and the detection result of the output of the orthogonal modulator for the second signal.

6. The signal processing apparatus according to claim 1, wherein the comparison unit comprises:

a storage unit that stores a result of AD conversion of a detection signal of the output of the orthogonal modulator for the first test signal; and a decision unit that compares a value held in the storage unit and a result of AD conversion of a detection signal of the output of the orthogonal modulator for the second test signal.

7. A signal processing apparatus, comprising:

a test signal generation unit that generates a test signal;

a detector that detects an envelope of an output obtained by orthogonally modulating the test signal by the orthogonal modulator;

a comparison-decision unit that carries out comparison and decision about detection signals detected by the detector and makes decision about the detection signals;

a control unit that derives an adjustment value from a result of the comparison and decision by the comparison-decision unit;

an adjustment value holding unit that holds the adjustment value derived by the control unit; and a compensation value derivation unit that derives a compensation value from the adjustment value held in the adjustment value holding unit, the test signal generation unit generating a first test signal set including a first test signal ($I_1$, $Q_1$) and a second test signal ($I_2$, $Q_2$) that has the predetermined relationship with the first test signal and supplying the first and second test signals of the first test signal set to the orthogonal modulator, the detector detecting envelopes of the first and second test signals of the first test signal set modulated by the orthogonal modulator, the comparison-decision unit comparing a first detection signal corresponding to the first test signal of the first test signal set and a second detection signal corresponding to the second test signal of the first test signal set and making decision about the first and second detection signals, the first and second detection signals being obtained by detection of the detector, the control unit deriving a first adjustment value from a result of the comparison and decision by the comparison-decision unit, the adjustment value holding unit holding the first adjustment value, the test signal generation unit generating a second test signal set including first and second test signals and supplying the first and second test signals of the second test signal set to the orthogonal modulator; the first and second test signals of the second test signal set comprising in-phase components (I) having a predetermined relationship with in-phase components (I) of the first and second test signals of the first test signal set and quadrature components(Q) having a predetermined relationship with quadrature components (Q) of the first and second test signals of the first test signal set, the detector detecting an envelope of an output of the orthogonal modulator corresponding to the first test signal of the second test signal set and an envelope of an output of the orthogonal modulator corresponding to the second test signal of the second test signal set, the comparison-decision unit comparing a first detection signal corresponding to the first test signal of the second test signal set and a second detection signal corresponding to the second test signal of the second test signal set, the first and second detection signal being obtained by the detector, the control unit deriving a second adjustment value from a result of the comparison and decision by the comparison-decision unit, the adjustment value holding unit holding the second adjustment value, the adjustment value derivation unit deriving the compensation value from the first adjustment value and the second adjustment value held in the adjustment value holding unit, the signal processing apparatus further comprising an estimation unit that estimates a DC offset and an IQ mismatch of the orthogonal modulator based on the compensation value.

8. The signal processing apparatus according to claim 7, further comprising:

a transmission baseband signal generation unit that generates signal components of each I channel and Q channel from a transmission signal; and a first compensation unit that receives and compensates for a transmission baseband signal generated by the transmission baseband signal generation unit, and supplies the compensated signal to the orthogonal modulator;

the first test signal and the second test signal being directly supplied to the orthogonal modulator;

the first compensation unit receiving the compensation value derived by the compensation value derivation unit and compensating for the transmission baseband signal.

9. The signal processing apparatus according to claim 7, further comprising:

a transmission baseband signal generation unit that generates signal components of each I channel and Q channel from a transmission signal; and a first compensation unit that receives and compensates for a transmission baseband signal generated by the transmission baseband signal generation unit and supplies the compensated signal to the orthogonal modulator, the first test signal and the second test signal being indirectly supplied to the orthogonal modulator, the first compensation unit receiving the compensation value derived by the compensation value derivation unit and compensating for the transmission baseband signal.

10. A signal processing method comprising:

supplying a first test signal set and a second test signal set to an orthogonal modulator as test signals for testing the orthogonal modulator, the first test signal set including first and second test signals having a predetermined relationship the second test signal set including first and second test signals respectively having predetermined relationships with the first and second test signals of the first test signal set; and obtaining respective adjustment values from detection results of outputs of the orthogonal modulator for inputs of the first and second test signals of the first test signal set and detection results of outputs of the orthogonal modulator for inputs of the first and second test signals of the second test signal set, and deriving a compensation value for compensating for at least one of a DC offset and an IQ mismatch of the orthogonal modulator based on the adjustment values, wherein the method comprises:

generating the first test signal set including the first test signal $(I_1, Q_1)$ and the second test signal $(I_2, Q_2)$ that has the predetermined relationship with the first test signal and sequentially supplying the first and second signal of the first test signal set to the orthogonal modulator;

detecting an envelope of an output of the orthogonal modulator corresponding to the first test signal of the first test signal set and an envelope of an output of the orthogonal modulator corresponding to the second test signal of the first test signal set;

comparing a first detection signal corresponding to a first test signal with a second detection signal corresponding to a second test signal and making decision about the first and second detection signals, the first and second detection signals being obtained by the detection step;

deriving a first adjustment value from a result of the comparison and decision by the comparison and decision step;

generating a second test signal set including first and second test signals and supplying the first and second test signals of the second test signal set to the orthogonal modulator; the first and second test signals of the second test signal set comprising in-phase components (I) having a predetermined relationship with in-phase components (I) of the first and second test signals of the first test signal set and quadrature components (Q) having a predetermined relationship with quadrature components (Q) of the first and second test signals of the first test signal set;

detecting an envelope of an output of the orthogonal modulator corresponding to the first test signal of the second test signal set and an envelope of an output of the orthogonal modulator corresponding to the second test signal of the second test signal set;

comparing a first detection signal corresponding to the first test signal of the second test signal set with a second detection signal corresponding to the second test signal of the second test signal set, the first and second detection signal being obtained by the detection step;

deriving a second adjustment value from a result of the comparison and decision by the comparison and decision step;

deriving the compensation value from the first adjustment value and the second adjustment value; and estimating a DC offset and an IQ mismatch of the orthogonal modulator based on the compensation value.

11. The signal processing method according to claim 10, wherein the second test signal $(I_2, Q_2)$ of the first test signal set is orthogonal to the first test signal $(I_1, Q_1)$ of the first test signal set or has a phase reversed to a phase of the first test signal $(I_1, Q_1)$ of the first test signal set.

12. The signal processing method according to claim 10, wherein the second test signal set is obtained by changing at least one of values and polarities of the in-phase components (I) and the quadrature components (Q) of the first test signal set.

13. The signal processing method according to claim 10, wherein with a DC voltage value being indicated by $V_{TST}$, the in-phase components (I) and the quadrature components (Q) of the first and second test signals are respectively set to:
the first test signal set: $(V_{TST}, 0), (-V_{TST}, 0)$
the second test signal set: $(-V_{TST}, 0), (V_{TST}, 0)$, and
a DC offset of the in-phase component (I) is compensated for by the first and second test signal sets.

14. The signal processing method according to claim 10, wherein with a DC voltage value being indicated by $V_{TST}$, the in-phase components (I) and the quadrature components (Q) of the first and second test signals are respectively set to:
the first test signal set: $(0, V_{TST}), (0, -V_{TST})$
the second test signal set: $(0, -V_{TST}), (0, V_{TST})$, and
a DC offset of the quadrature component (Q) is compensated for by the first and second test signal sets.

15. The signal processing method according to claim 10, wherein the first and second test signals of the first and the second test signal sets are generated, and the first and second test signals of third to eight test signal sets are generated, and with a DC voltage value being indicated by $V_{TST}$, the in-phase components (I) and the quadrature components (Q) of the first and second test signals of the first and second test signal sets, and in-phase components (I) and quadrature components (Q) of the first and second signals of the third to eight test signal sets are respectively set to:
the first test signal set: $(V_{TST}, 0), (0, V_{TST})$
the second test signal set: $(V_{TST}, 0), (0, -V_{TST})$,
the third test signal set: $(-V_{TST}, 0), (0, V_{TST})$
the fourth test signal set: $(-V_{TST}, 0), (0, -V_{TST})$
the fifth test signal set: $(0, V_{TST}), (V_{TST}, 0)$
the sixth test signal set: $(0, -V_{TST}), (V_{TST}, 0)$
the seventh test signal set: $(0, V_{TST}), (-V_{TST}, 0)$
the eighth test signal set: $(0, -V_{TST}), (-V_{TST}, 0)$, and
an amplitude mismatch and/or the DC offset are compensated for by a plurality of the sets selected from among the first to eighth test signal sets.

* * * * *